United States Patent
Kita et al.

[11] Patent Number: 6,165,075
[45] Date of Patent: Dec. 26, 2000

[54] CONSTANT VELOCITY UNIVERSAL JOINT

[75] Inventors: Kanji Kita, Utsunomiya; Kazunori Miyata, Shimodate; Satoru Kudo, Utsunomiya; Takeshi Kayano, Tochigi-ken, all of Japan

[73] Assignee: Honda Giken Kogyo Kabushiki Kaisha, Tokyo, Japan

[21] Appl. No.: 09/021,442

[22] Filed: Feb. 10, 1998

[30] Foreign Application Priority Data

| Feb. 10, 1997 | [JP] | Japan | 9-026993 |
| Feb. 10, 1997 | [JP] | Japan | 9-026994 |
| Feb. 28, 1997 | [JP] | Japan | 9-046268 |
| Feb. 28, 1997 | [JP] | Japan | 9-046277 |
| May 13, 1997 | [JP] | Japan | 9-122377 |

[51] Int. Cl.[7] ................... F16D 3/20
[52] U.S. Cl. .............. 464/111; 464/905; 464/120; 464/122
[58] Field of Search ................ 464/111, 112, 464/120, 122, 125, 905

[56] References Cited

U.S. PATENT DOCUMENTS

| 1,582,997 | 5/1926 | McGee . | |
| 2,760,359 | 8/1956 | Wildhaber . | |
| 3,381,497 | 5/1968 | Allen . | |
| 4,167,860 | 9/1979 | Sakaguchi . | |
| 4,192,154 | 3/1980 | Nakamura et al. | 464/111 |
| 4,379,706 | 4/1983 | Otsuka et al. | 464/111 |
| 4,747,803 | 5/1988 | Kimata . | |
| 4,773,890 | 9/1988 | Iwasaki et al. | 464/111 |
| 4,828,534 | 5/1989 | Orain | 464/111 |
| 4,881,923 | 11/1989 | Orain | 464/111 |
| 5,125,873 | 6/1992 | Welschof . | |
| 5,254,038 | 10/1993 | Schneider . | |
| 5,290,202 | 3/1994 | Orain | 464/111 |
| 5,348,512 | 9/1994 | Hodge . | |
| 5,395,289 | 3/1995 | Damian | 464/111 |
| 5,397,271 | 3/1995 | Poulin | 464/111 |
| 5,772,517 | 6/1998 | Guimbretiere | 464/111 |
| 5,797,799 | 8/1998 | Deschatrettes et al. | 464/111 |
| 5,827,121 | 10/1998 | Bando et al. | 464/111 |
| 5,895,322 | 4/1999 | Neviani | 464/111 |
| 5,935,009 | 8/1999 | Hosdez et al. | 464/111 |

FOREIGN PATENT DOCUMENTS

| 0034073A1 | 1/1981 | European Pat. Off. . |
| 0477074A1 | 9/1991 | European Pat. Off. . |
| 853688 | 3/1940 | France . |
| 1228149 | 8/1960 | France . |
| 2172580 | 9/1973 | France . |
| 2580751 | 10/1986 | France . |
| 4205654 | 7/1993 | Germany . |
| 19600798 | 8/1996 | Germany . |
| 168416 | 7/1991 | Japan . |
| 674243 | 3/1994 | Japan . |
| 774649 | 8/1995 | Japan . |
| 2199638 | 7/1988 | United Kingdom . |
| 2256256 | 12/1992 | United Kingdom . |
| 2291692 | 1/1996 | United Kingdom . |
| WO9116549 | 10/1991 | WIPO . |

OTHER PUBLICATIONS

Patent Abstracts of Japan; vol. 15, No. 366 (M–1158), Sep. 13, 1991 & JP 03 144118 A (NTN), Jun. 19, 1991; abstract.
Patent Abstracts of Japan; vol. 18, No. 550 (M–1690), Oct. 20, 1994 & JP 06 193644 A (NTN), Jul. 15, 1994; abstract.
Patent Abstracts of Japan; vol. 15, No. 407 (M–1169), Oct. 17, 1991 & JP 03 168416 A (NTN), Jul. 22, 1991; abstract.

*Primary Examiner*—Lynne H. Browne
*Assistant Examiner*—John R. Cottingham
*Attorney, Agent, or Firm*—Birch, Stewart, Kolasch & Birch, LLP

[57] ABSTRACT

A constant velocity universal joint comprises a plurality of trunnions which are formed to be spherical, sliding surfaces which extend in a flat configuration along an axial direction of an outer cup, and pairs of slipper members having one side surfaces which are formed with recesses for making contact with spherical surfaces of the trunnions and the other side surfaces which are formed with flat surfaces to make contact with the sliding surfaces, wherein the pair of slipper members are provided slidably with respect to the sliding surface and the spherical surface of the trunnion.

7 Claims, 55 Drawing Sheets

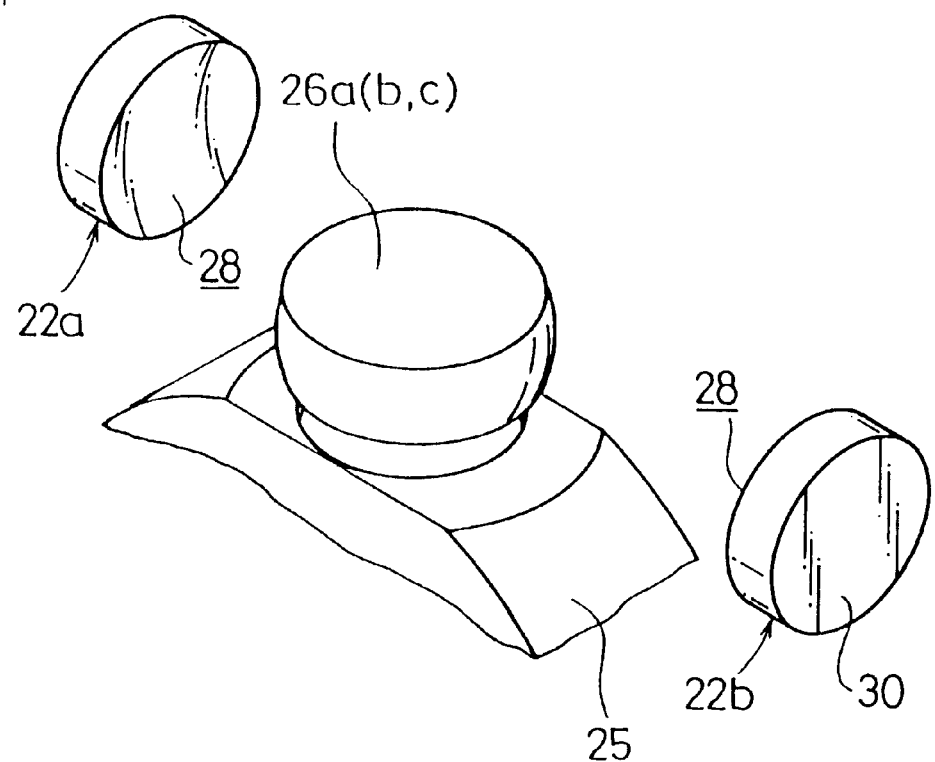

F I G. 22
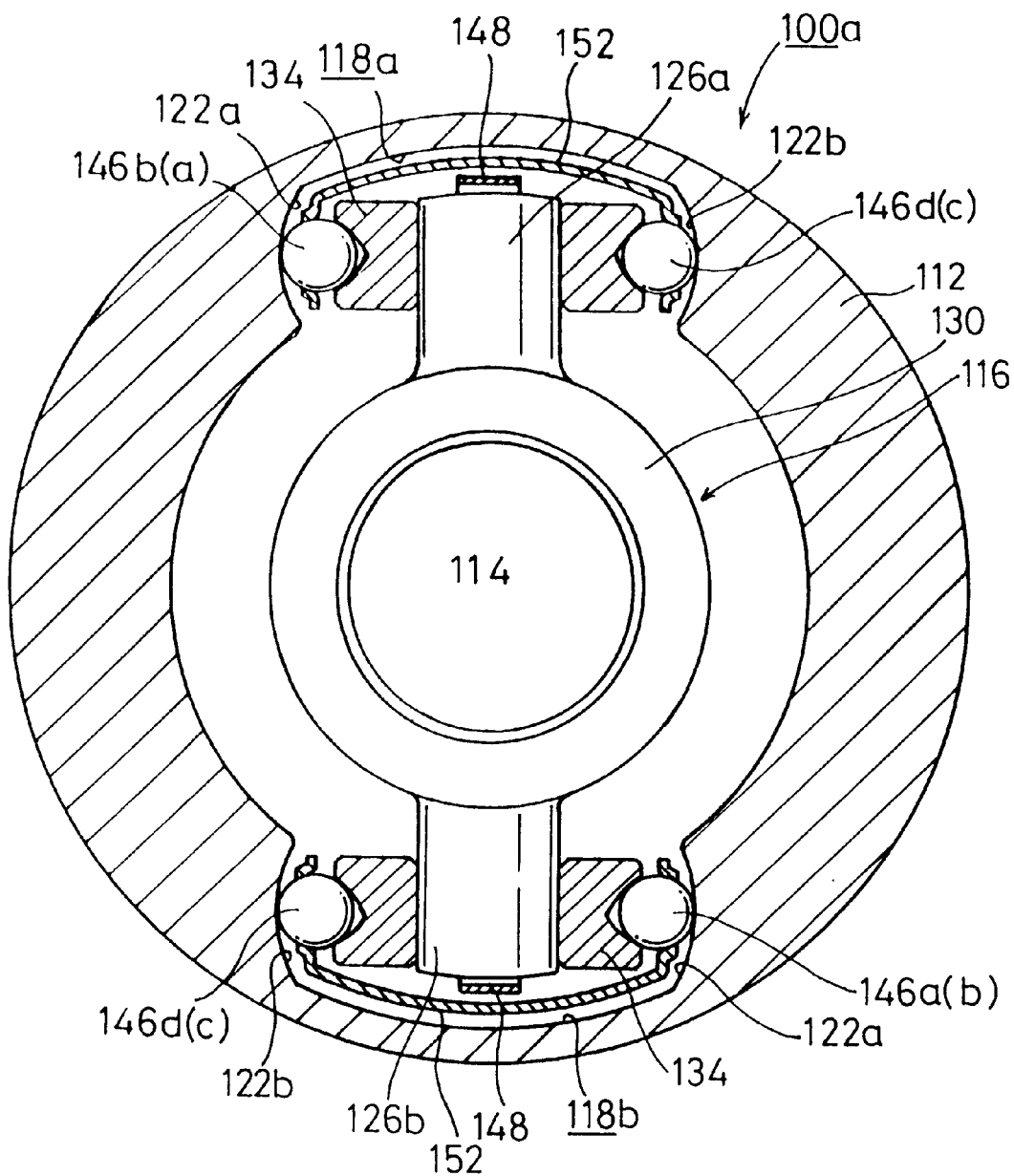

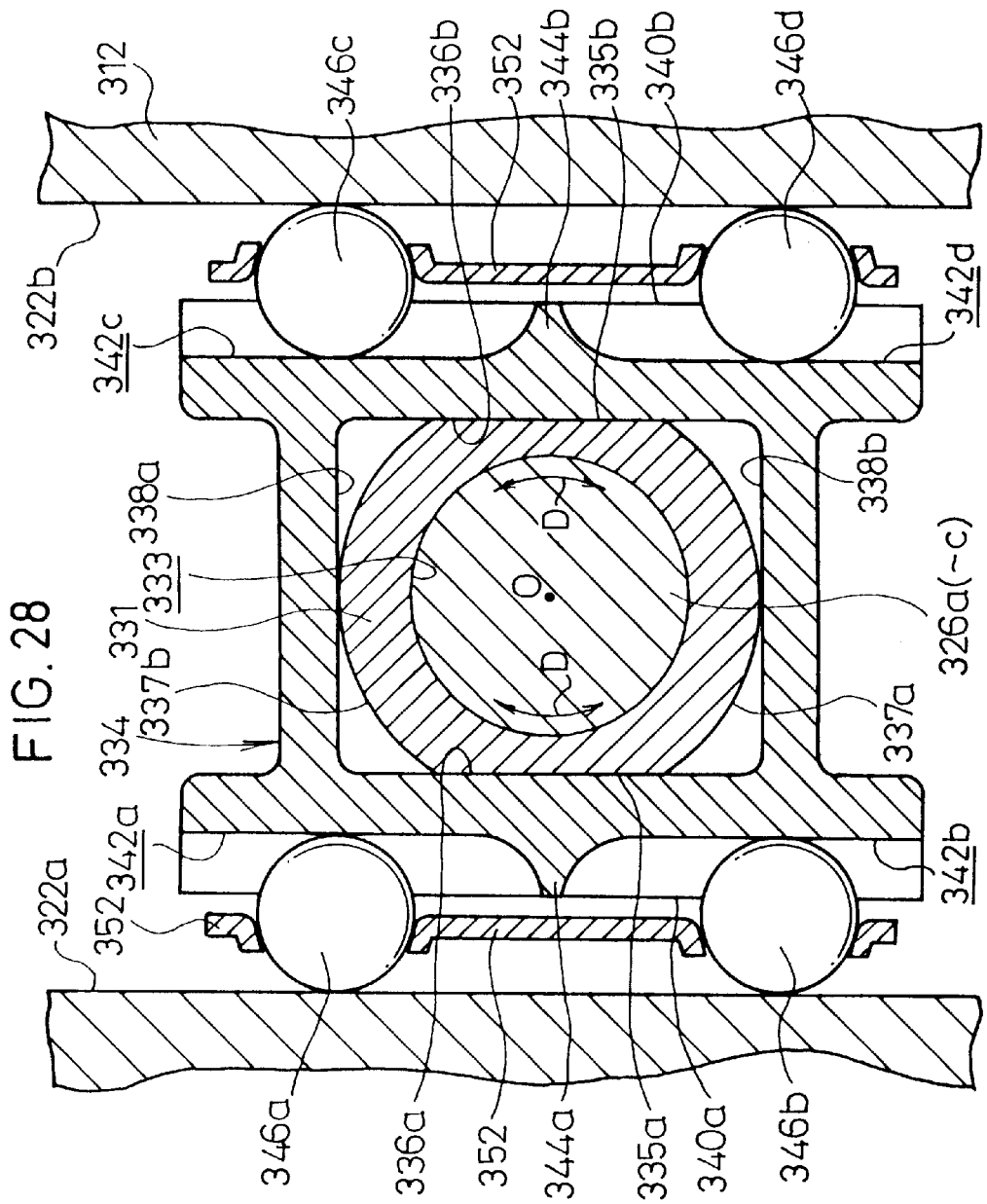

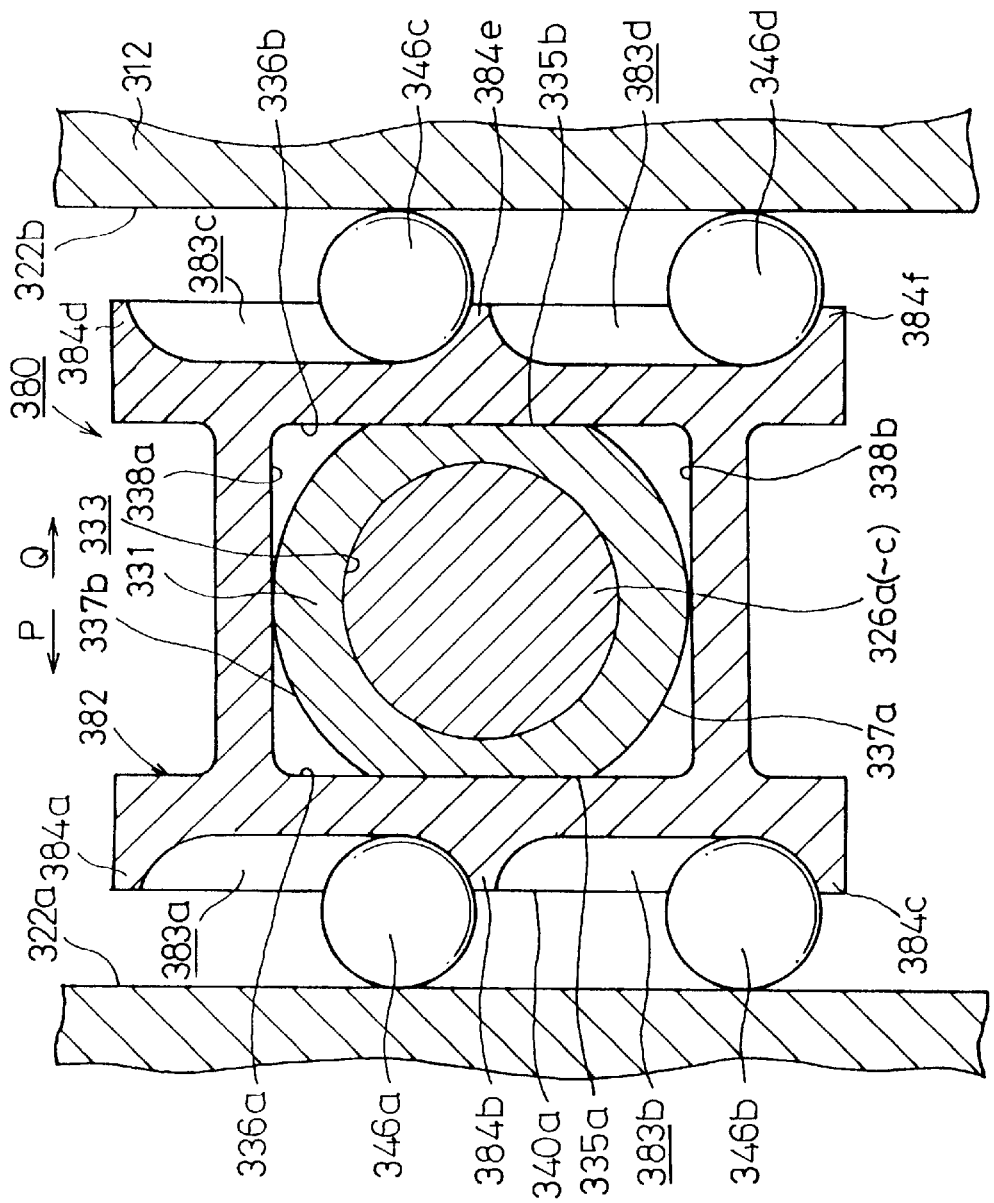

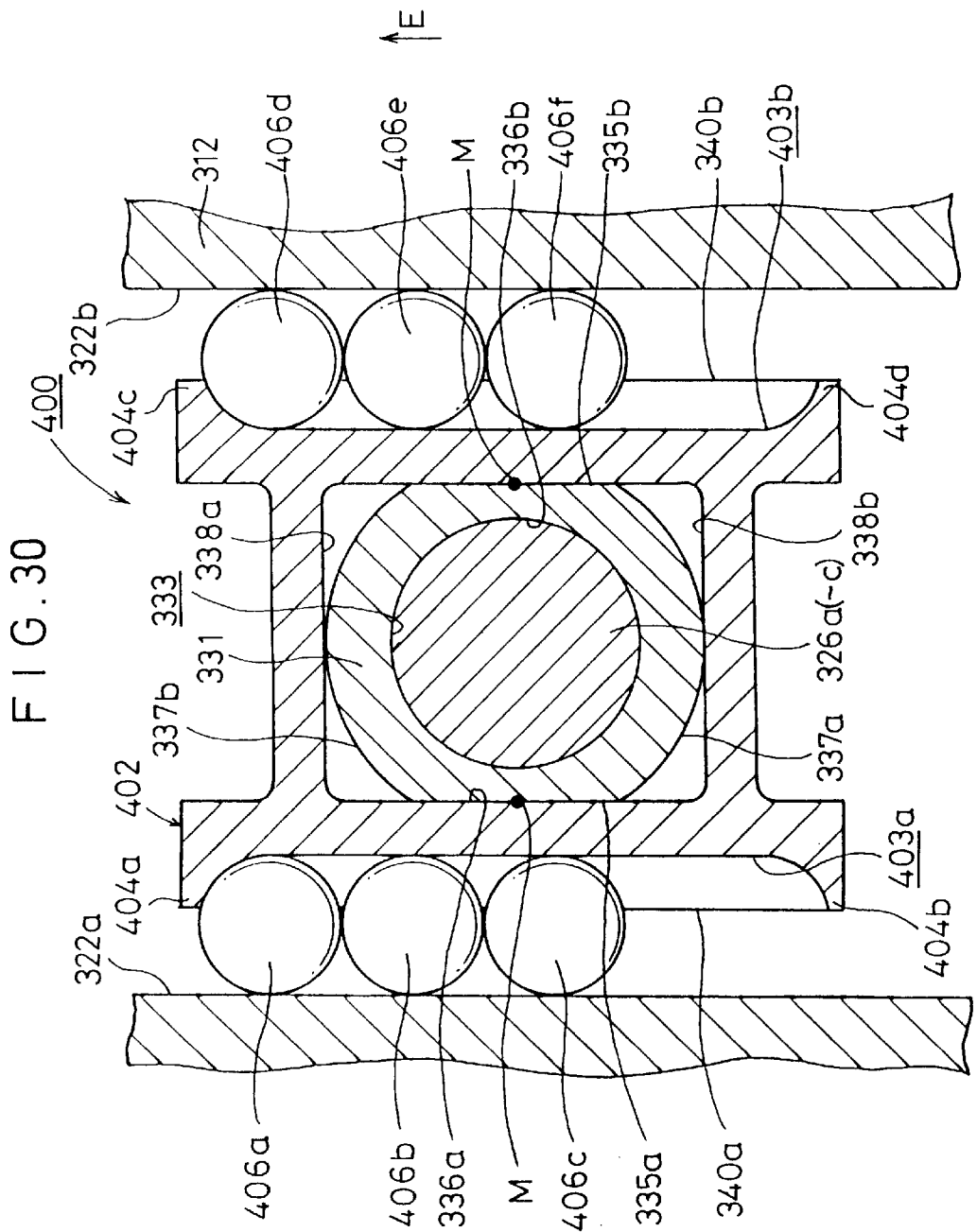

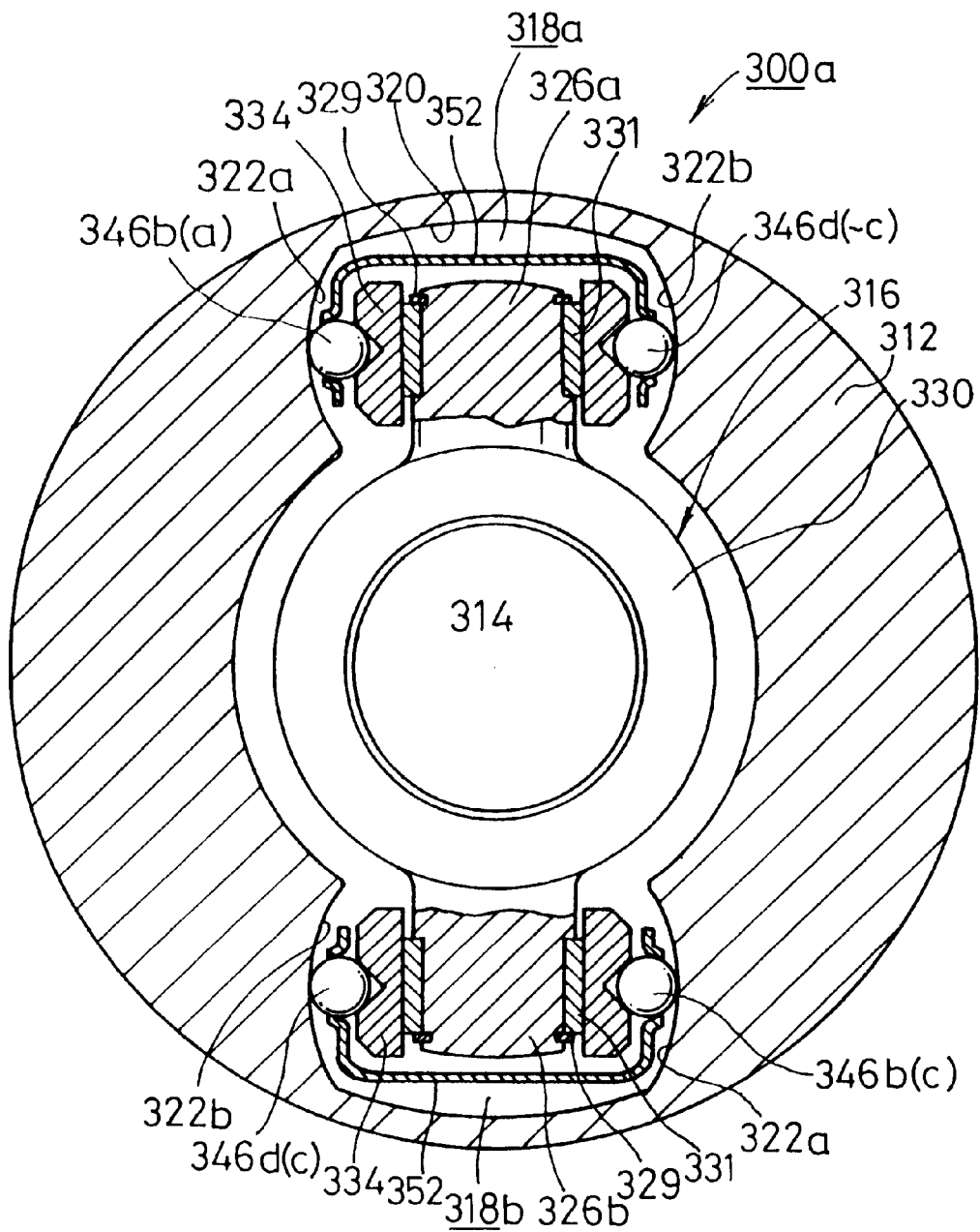

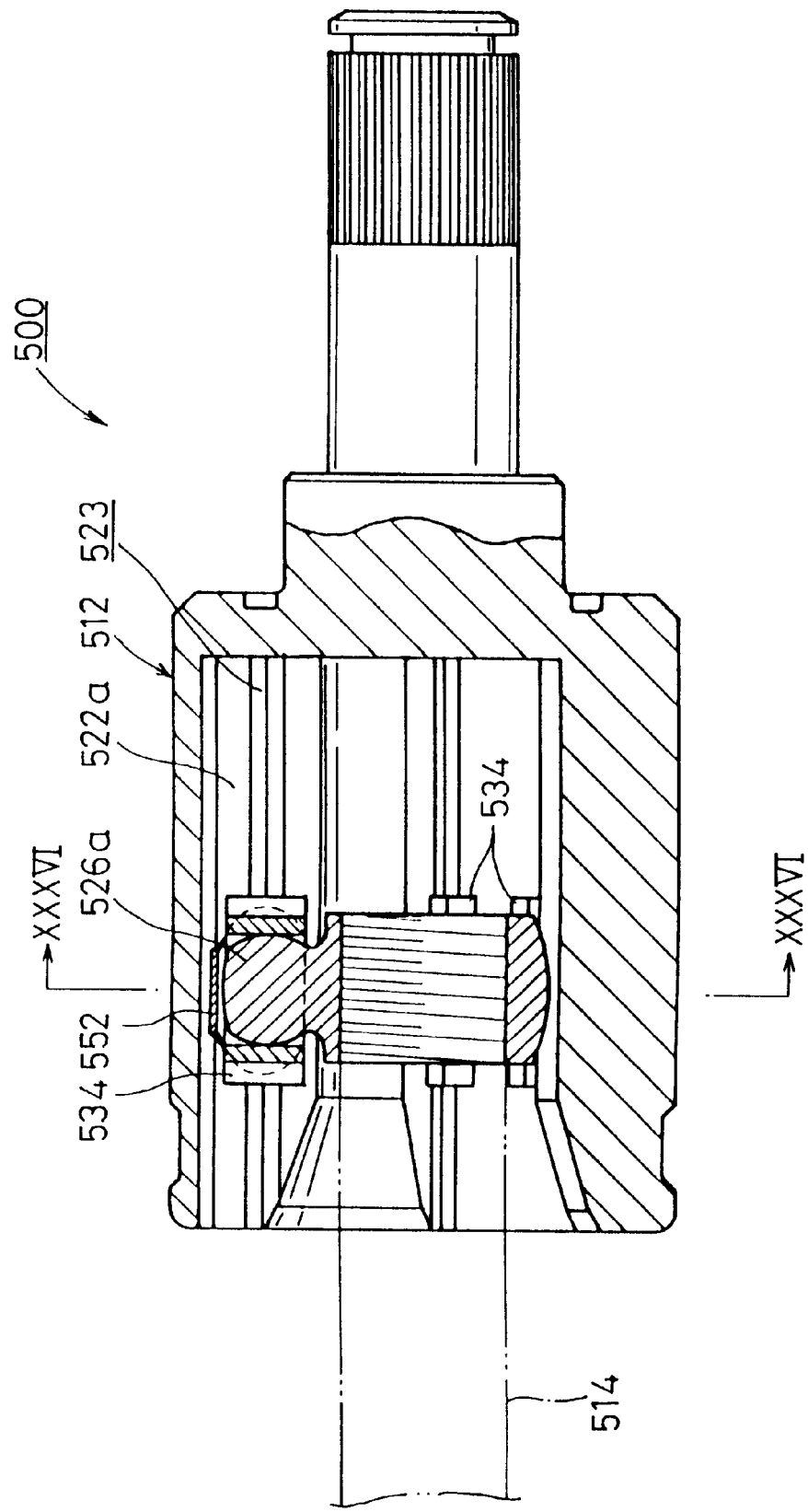

F I G. 38
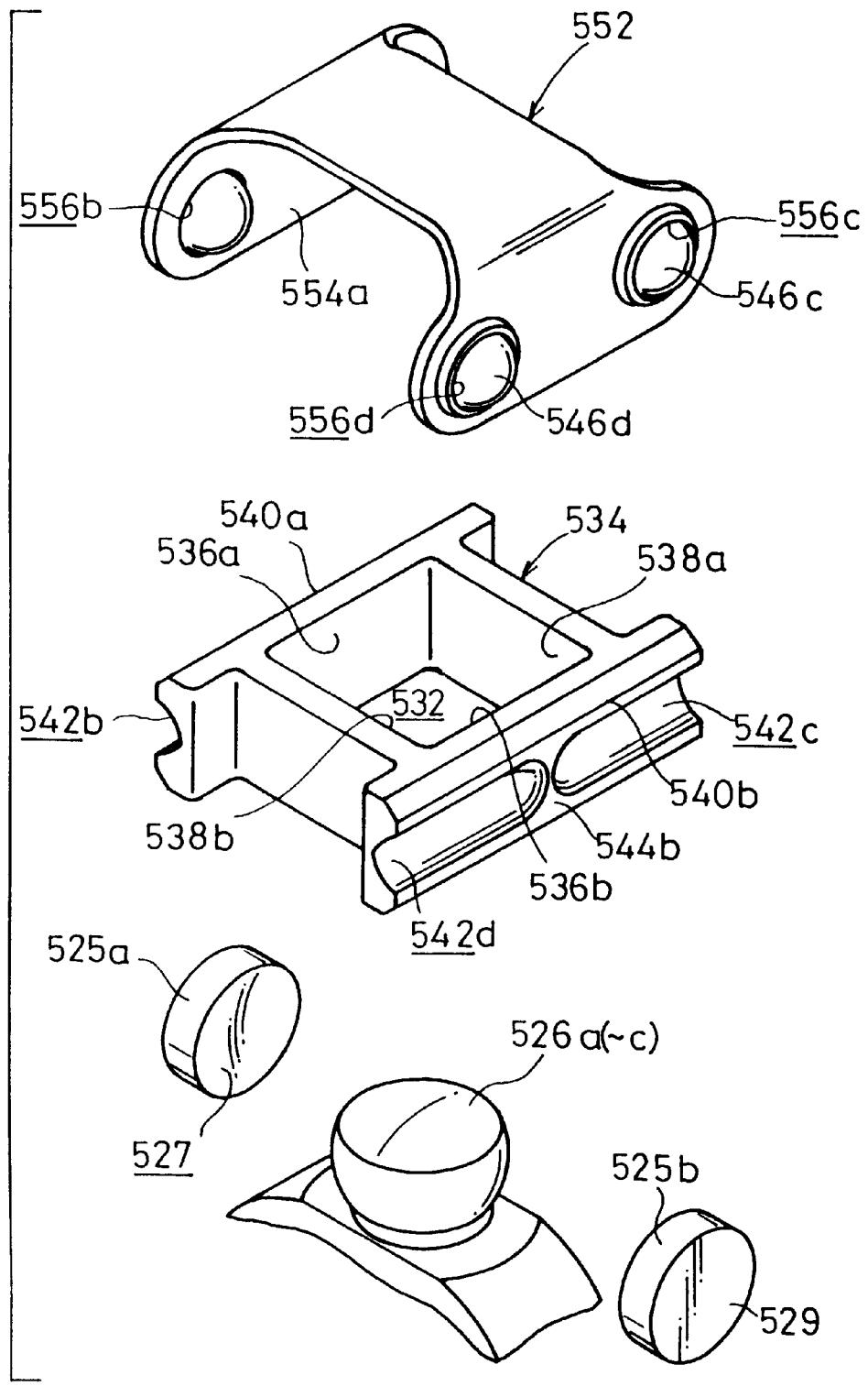

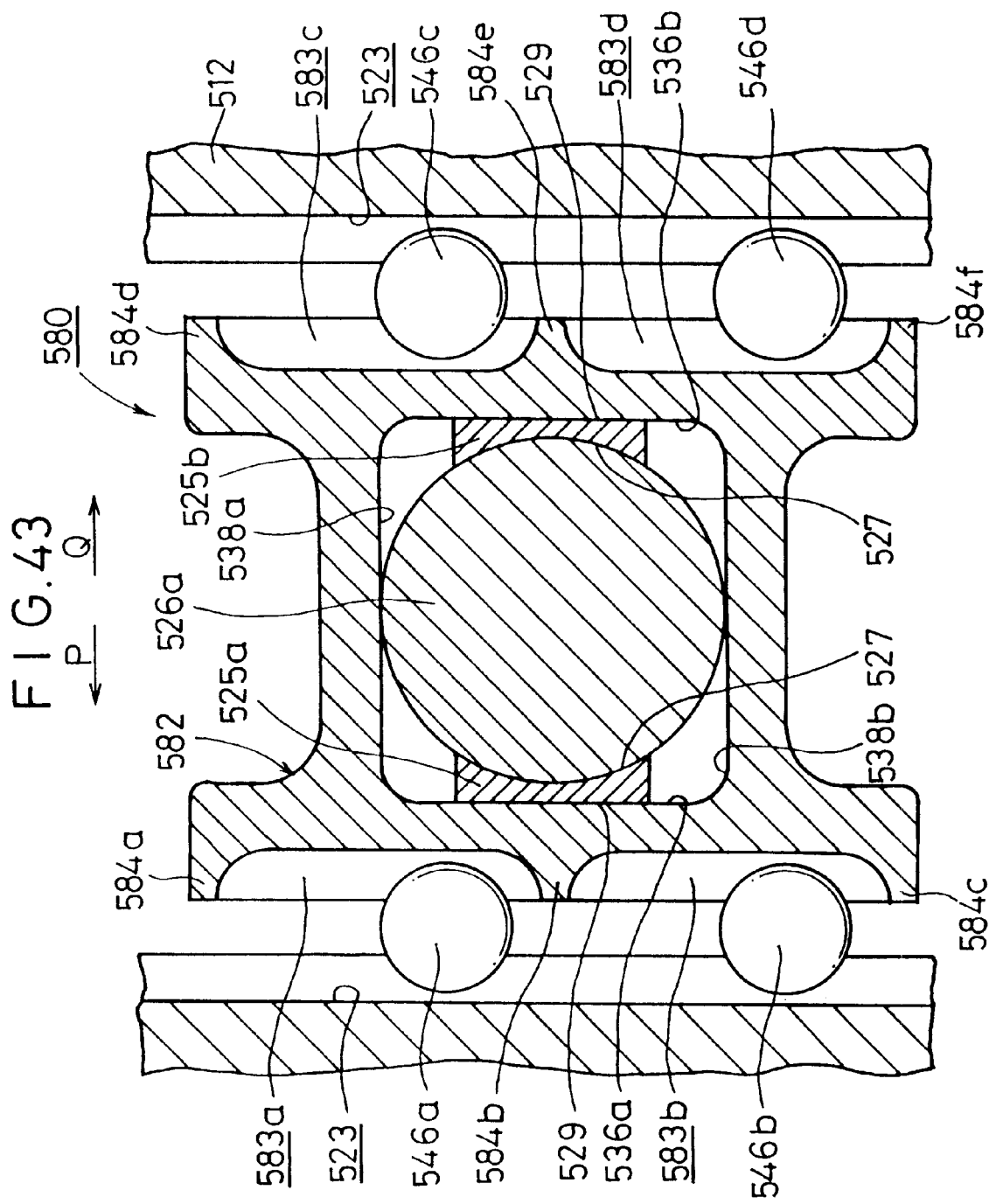

F I G. 53
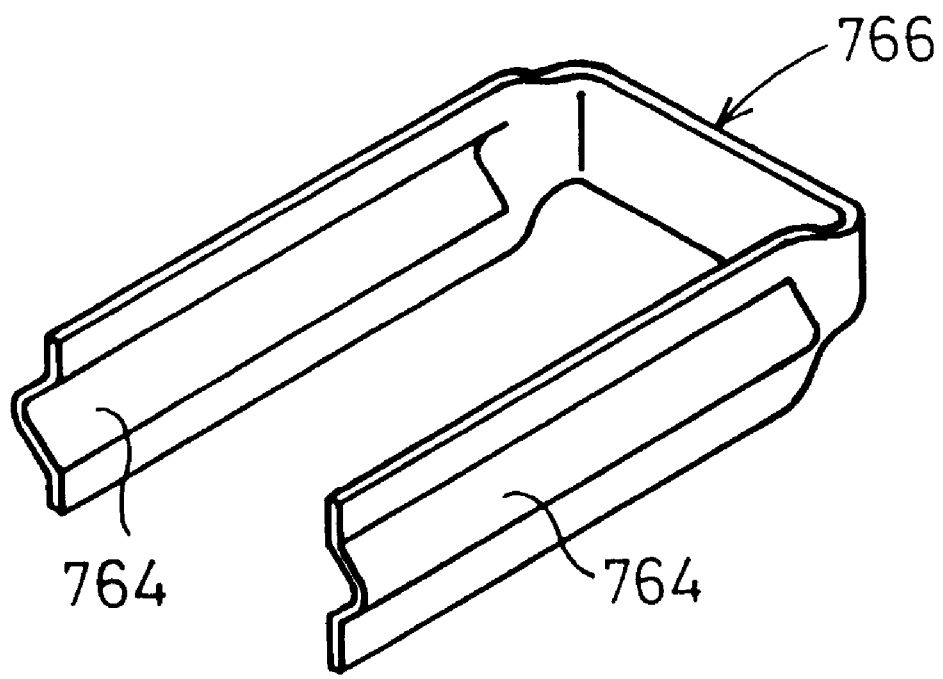

CONSTANT VELOCITY UNIVERSAL JOINT

BACKGROUND OF THE INVENTION

1. Field of the Invention

The present invention relates to a constant velocity universal joint for coupling a driving shaft and a driven shaft, to be used, for example, for a driving force-transmitting section of an automobile.

2. Description of the Related Art

A constant velocity universal joint has been hitherto used for a driving force-transmitting section of an automobile in order to transmit a rotary power or a torque of a driving shaft to respective axles through a driven shaft.

A constant velocity universal joint concerning the conventional technique is known, for example, as illustrated in FIG. 55, in which three track grooves 2 are formed along the axial direction on an inner surface of an outer wheel 1. Leg shafts 4, which protrude in the radial direction, are provided on a tripod member 3 which is arranged inside the outer wheel 1. A spherical roller 6 is fitted rotatably and slidably in the axial direction to an outer circumferential surface of each of the leg shafts 4 via a plurality of needle bearings 5. The spherical roller 6 is allowed to engage with a roller guide surface 7 disposed on both sides of the track groove 2.

However, in the case of the constant velocity universal joint concerning the conventional technique as described above, when a high load is applied in a state in which the tripod member 3 is inclined by a predetermined angle with respect to the axis of the outer wheel 1, then the force to press the roller guide surface 7 by the spherical roller 6, i.e., the surface pressure exerted on the roller guide surface 7 is increased, because each of the spherical rollers 6 linearly contacts with the roller guide surface 7 of the track groove 2. As a result, oil film breakage occurs at the contact surface between the spherical roller 6 and the roller guide surface 7, and lubrication failure occurs. Further, the following inconveniences take plate. That is, the lubrication failure causes formation of small holes on the surface of the spherical roller 6, i.e., so-called pits are generated. In other cases, irregularities are formed on the surface of the spherical roller 6, i.e., so-called adhesive wear occurs.

On the other hand, in the case of the constant velocity universal joint concerning the conventional technique as described above, when the tripod member 3 is inclined by a predetermined angle with respect to the axis of the outer wheel 1, a relationship is given as shown in FIG. 56, in which each of the spherical rollers 6 obliquely intersects the roller guide surface 7 of the cylindrical track groove 2 with each other. In such a state, it is impossible to allow the spherical roller 6 to perform proper rolling motion.

That is, the spherical roller 6 Intends to perform rolling motion in the direction indicated by an arrow A or an arrow B shown in FIG. 55, while the track groove 2 is cylindrical and it extends substantially in parallel to the axis of the outer wheel 1. Therefore, the spherical roller 6 is moved while being restricted by the track groove 2. As a result, a thrust force in the axial direction is induced by the slippage which is caused between the roller guide surface 7 of the track groove 2 and the spherical roller 6. The induced thrust force is increased in proportion to the increase of the angle of inclination of the tripod member 3 with respect to the outer wheel 1. It is feared to be difficult to smoothly transmit the rotary power of the driving shaft to the driven shaft. It is noted that a frictional resistance is generated by the reciprocating motion effected by the spherical roller 6 along the roller guide surface 7. In this context, the induced thrust force refers to a load resulting from the frictional resistance.

In order to solve the problem as described above, a constant velocity universal joint is known, which is disclosed, for example, in Japanese Laid-Open Patent Publication No. 3-168416. In this constant velocity universal joint, three ball grooves are formed in the axial direction at the inside of an outer wheel. Three pairs of balls are held in the respective ball grooves by the aid of holders respectively. A tripod member is incorporated into the inside of the outer wheel. Three leg shafts extending in the radial direction, which are arranged between the adjacent pairs of balls, are provided on the tripod member. Each of the leg shafts is formed with a spherical surface. A ball guide, which is formed with a spherical recess for engaging with the spherical surface, is provided between the spherical surface and the balls.

However, in the case of the constant velocity universal joint disclosed in Japanese Laid-Open Patent Publication No. 3-168416, when the operating angle between the first shaft provided at the closed end of the outer wheel and the second shaft provided on the tripod member is increased, there is a fear of occurrence of vibration in the direction of rotation and so-called beat sound resulting from backlash. The beat sound described above refers to a sound generated by looseness in the direction of rotation. Further, there is a fear that the following inconveniences may occur. That is, the balls tend to be disengaged from the holder upon assembly, it is difficult to retain the balls in the ball guide, a high technique is required for assembling, the assembling time is prolonged, and the operation efficiency is lowered.

A three-plane constant velocity joint is disclosed in Japanese Laid-Open Patent Publication No. 6-74243. In this case, an inner joint member is inserted into the inside of an outer joint member, and trunnions are provided on the inner joint member. Each of the trunnions is provided with a plurality of spherical balls. The spherical balls are constructed so that they are rollable along side walls which constitute a longitudinal chamber formed in the outer joint member. The spherical balls are held on the trunnion by the aid of a positioning spring installed to the trunnion.

However, also in the case of the three-plane constant velocity joint disclosed in Japanese Laid-Open Patent Publication No. 6-74243, when the operating angle between the outer joint member and the inner joint member is increased, there is a fear of occurrence of vibration in the direction of rotation and so-called beat sound resulting from backlash. Further, it is difficult to retain the spherical balls on the trunnion upon assembling. It is feared that the efficiency of the assembling operation is lowered.

Another constant velocity universal joint concerning the conventional technique is known, which is constructed, for example, as illustrated in FIG. 57. In this case, a pair of track surfaces 2a, 2b, which are opposed to one another and which have a circular arc-shaped cross-section, are formed in the axial direction on an inner wall surface of an outer joint member 1a. An inner joint member 3a, which is disposed between the pair of track surfaces 2a, 2b, is arranged in an internal hollow space of the outer joint member 1a. Further, a plurality of ball members 9 are provided rollably along the track surfaces 2a, 2b by the aid of a retainer 8 (see Japanese Patent Publication No. 7-74649).

However, in the case of the constant velocity universal joint concerning the conventional technique, when the spacing distance S between the pair of track surfaces 2a, 2b is smaller than a predetermined value, a large load is exerted on the ball members 9 which roll along the pair of track surfaces 2a, 2b. On the other hand, when the spacing distance S between the pair of track surfaces 2a, 2b is larger than a predetermined value, looseness occurs due to the gap between the ball members 9 and the pair of track surfaces 2a, 2b. As described above, the constant velocity universal joint concerning the conventional technique involves the inconvenience that the durability and the vibration characteristics are deteriorated by any dimensional error depending on the machining accuracy for the pair of track surfaces 2a, 2b which are formed on the inner wall surface of the outer joint member 1 in the mutually opposing manner.

Further, it is necessary that the pair of track surfaces 2a, 2b of the outer joint member 1 on which the ball members 9 roll have a hardness not subjected to plasticization caused by the contact surface pressure generated between the track surfaces 2a, 2b and the ball members 9. For this reason, it is necessary to apply a heat treatment to the pair of track surfaces 2a, 2b, which results in an inconvenience that the production cost becomes expensive.

SUMMARY OF THE INVENTION

A general object of the present invention is to Provide a constant velocity universal joint which makes it possible to reduce the induced thrust force so that the driving force may be still more smoothly transmitted from one transmission shaft to the other transmission shaft.

A principal object of the present invention is to provide a constant velocity universal joint which makes it possible to avoid occurrence of vibration in the direction of rotation and beat sound resulting from backlash even when the operating angle between one transmission shaft and the other transmission shaft is increased.

Another object of the present invention is to provide a constant velocity universal joint which makes it possible to stabilize lubrication performance and avoid occurrence of pits and adhesive wear.

Still another object of the present invention is to provide a constant velocity universal joint which makes it possible to shorten the assembling time and improve the operation efficiency by reliably holding ball members upon assembling without any disengagement of the ball members.

Still another object of the present invention is to provide a constant velocity universal joint in which the spacing distance between a pair of mutually opposing rolling surfaces is not affected by any dimensional error.

Still another object of the present invention is to provide a constant velocity universal joint which makes it possible to reduce the production cost by omitting the heat treatment step which would be otherwise required for rolling surfaces of an outer member.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 shows a perspective view illustrating a trunnion and a pair of slipper members engaging with the trunnion.

FIG. 22 shows a cross-sectional view illustrating application of the constant velocity universal joint shown in FIG. 11 to a bipod type.

FIG. 28 shows a sectional view taken along a line XXVIII—XXVIII shown in FIG. 25.

FIG. 29 shows a sectional view illustrating a constant velocity universal joint according to a seventh embodiment of the present invention.

FIG. 30 shows a sectional view illustrating a constant velocity universal joint according to an eighth embodiment of the present invention.

FIG. 34 shows a cross-sectional view illustrating application of the constant velocity universal joint shown in FIG. 24 to a bipod type.

FIG. 35 shows a longitudinal sectional view taken along an axial direction of a constant velocity universal joint according to a ninth embodiment of the present invention.

FIG. 38 shows a partial magnified exploded perspective view illustrating the constant velocity universal joint shown in FIG. 36.

FIG. 43 shows a sectional view illustrating a constant velocity universal joint according to a tenth embodiment of the present invention.

FIG. 53 shows a perspective view illustrating a plate spring for constructing the constant velocity universal joint shown in FIG. 52.

DESCRIPTION OF THE PREFERRED EMBODIMENTS

Figure 1:
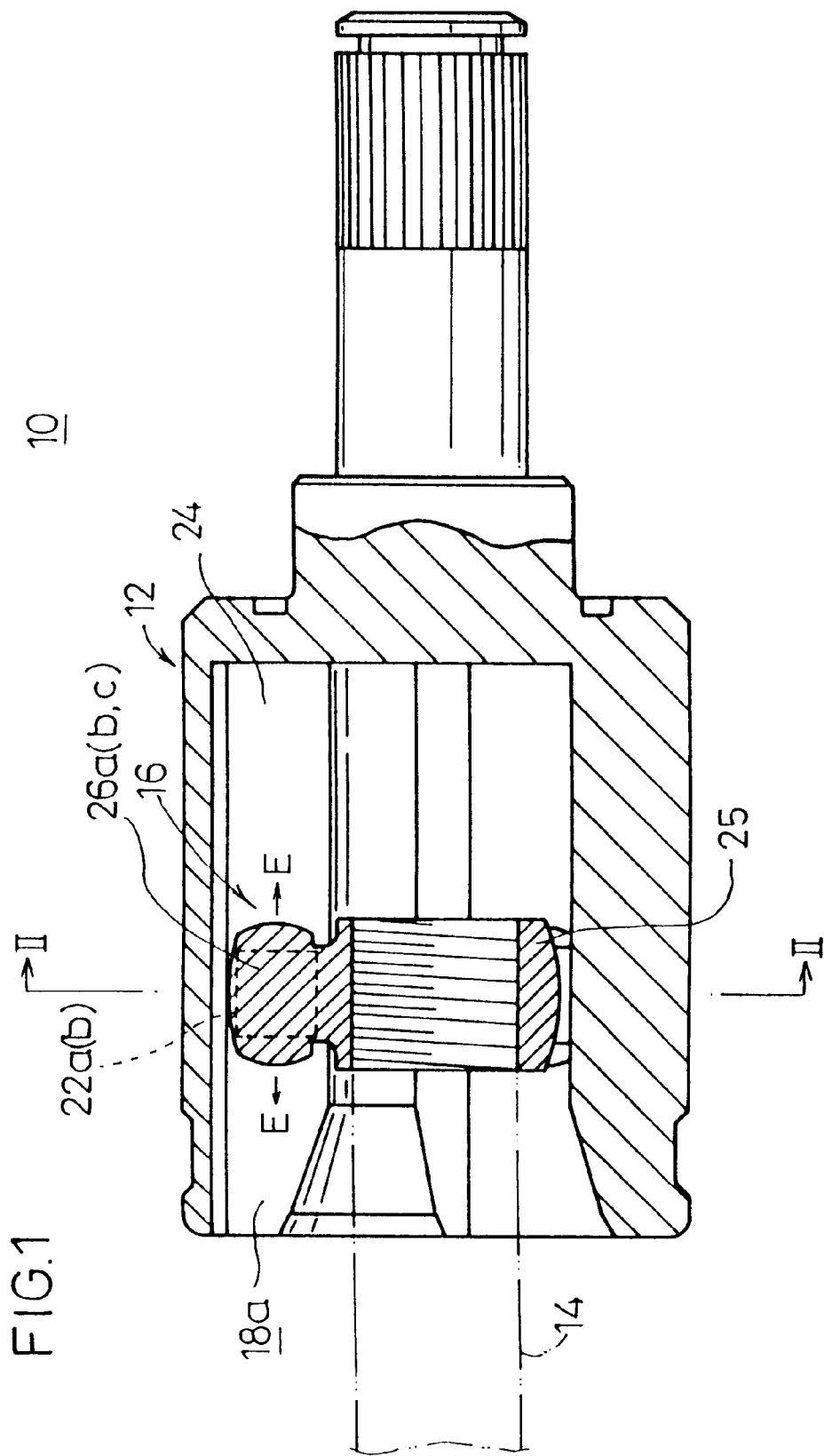
FIG. 1 shows a longitudinal sectional view taken along an axial direction of a constant velocity universal joint according to a first embodiment of the present invention.
Figure 2:
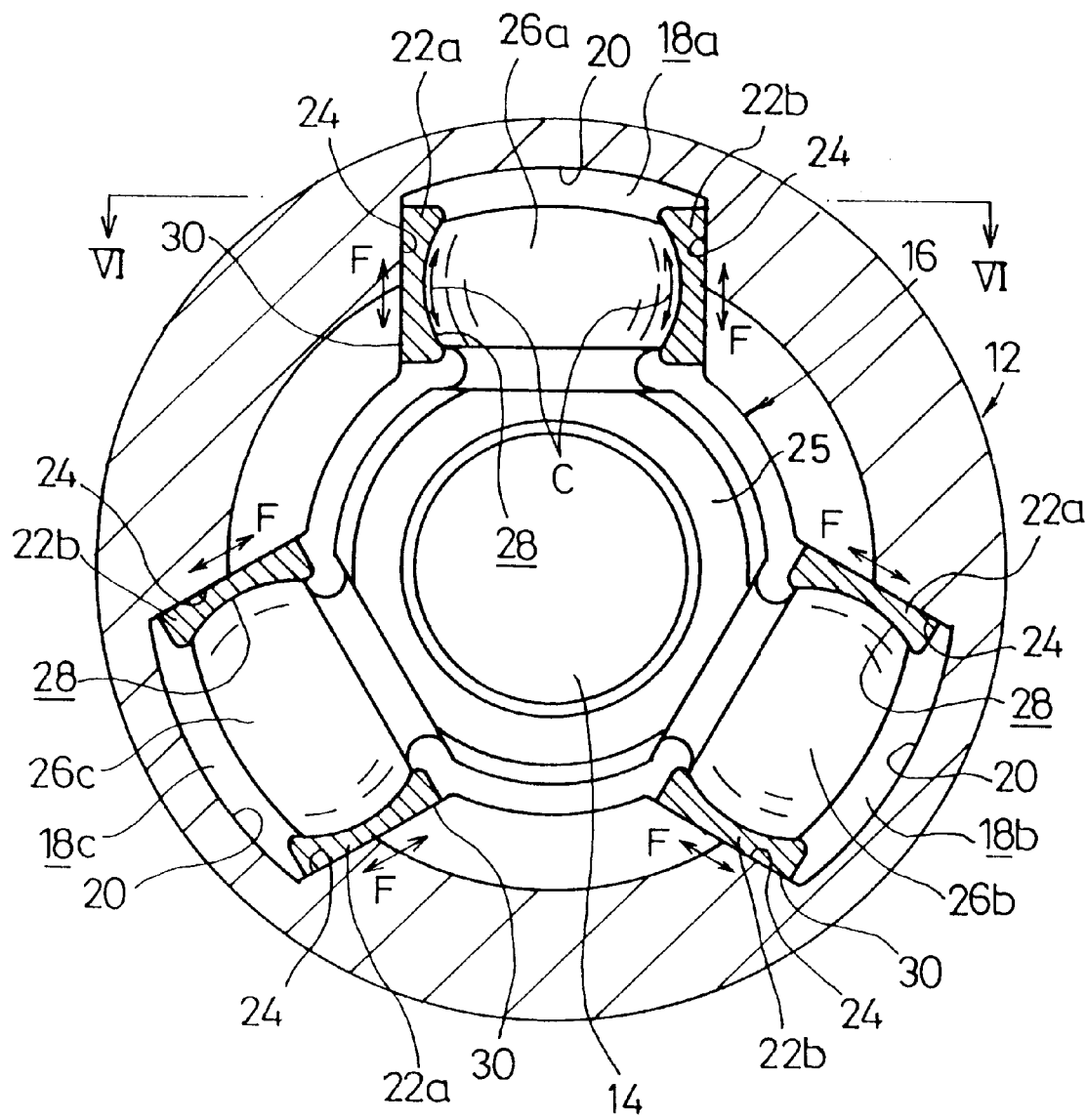
FIG. 2 shows a sectional view taken along a line II—II shown in FIG. 1.

In FIGS. 1 and 2, reference numeral 10 indicates a constant velocity universal joint according to a first embodiment of the present invention. The constant velocity universal joint 10 is basically comprises a cylindrical outer cup (outer member) 12 having an opening and integrally coupled to one end of an unillustrated first shaft, and an inner member 16 fixedly fixedly secured to one end of a second shaft 14 and accommodated in a hole of the outer cup 12.

As shown in FIG. 2, three guide grooves 18a to 18c, which extend along the axial direction and which are spaced apart from each other by 120 degrees about the center of the axis, are formed on an inner circumferential surface of the outer cup 12. Each of the guide grooves 18a to 18c comprises a curved section 20 which is formed to have a curved cross section, and sliding surfaces (flat surface sections) 24 which are formed mutually opposingly on both sides of the curved section 20 for sliding slipper members 22a, 22b thereon as described later on. The sliding surface 24 is formed to have a flat configuration which extends along the axial direction of the outer cup 12.

A ring-shaped spider 25 is externally fitted to the second shaft 14. Three trunnions 26a (26b, 26c), which expand toward the guide grooves 18a (18b, 18c) respectively and which are spaced apart from each other by 120 degrees about the center of the axis, are formed integrally on an outer circumferential surface of the spider 25. An outer surface of each of the trunnions 26a (26b, 26c) facing with the sliding surface 24 is formed to be spherical.

A pair of slipper members (gliding members) 22a, 22b, each of which has an identical shape, are interposed between the trunnion 26a (26b, 26c) and the sliding surface 24. The pair of slipper members 22a, 22b are formed to make surface-to-surface contact with the trunnion 26a (26b, 26c) and the sliding surface 24 respectively. As shown in FIG. 3, one side surface of the slipper member 22a, 22b, which makes surface-to-surface contact with the trunnion 26a (26b, 26c), is composed of a recess 28 having its inner wall surface which is formed to have a spherical configuration corresponding to the spherical surface of the trunnion 26a (26b, 26c). The other side surface, which makes surface-tosurface contact with the sliding surface 24, is formed to be a flat surface 30 corresponding to the sliding surface 24.

Figure 4A:
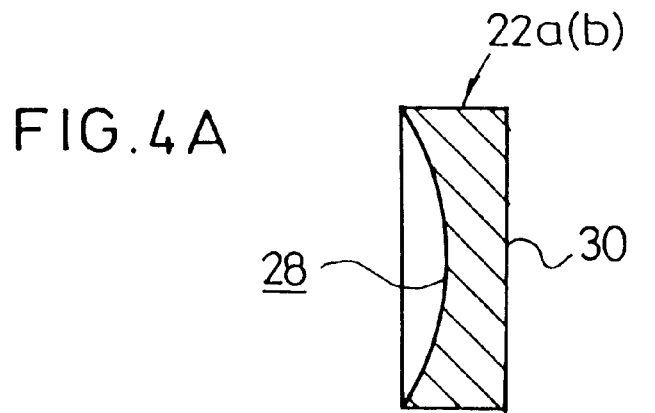
FIG. 4A to 4C show longitudinal sectional views illustrating modified embodiments of the slipper member shown in FIG. 3.
Figure 4B:
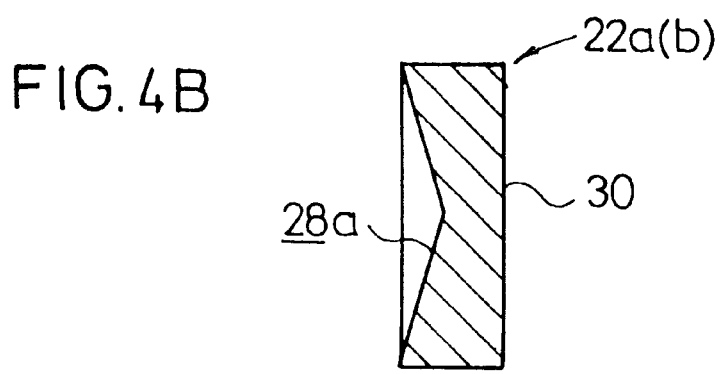
Figure 4C:
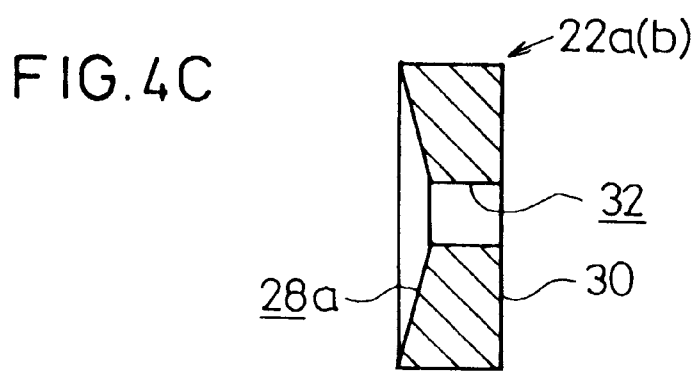

In this embodiment, the shape of the recess 28 of the slipper member 22a, 22b contacting with the trunnion 26a (26b, 26c) is not limited to the spherical surface formed to have a circular arc-shaped cross section (see FIG. 4A). It is allowable to form a recess 28a having a substantially v-shaped cross section to make line-to-line contact with the trunnion 26a (26b, 26c) (see FIG. 4B). Alternatively, a hole 32, which penetrate through the center of the recess 28 having the substantially v-shaped cross section as described above, may be formed (see FIG. 4C). The provision of the hole 32 is advantageous in that the concentration of stress is avoided, and lubricating oil can be easily poured and applied to the sliding surface of the trunnion 26a (26b, 26c) and the slipper member 22a, 22b.

Figure 5:
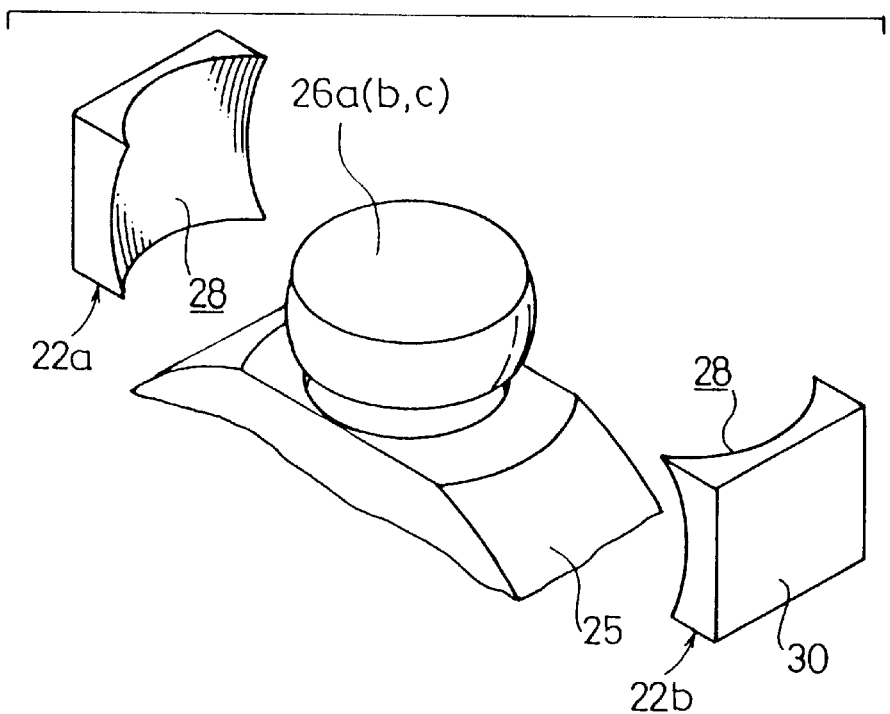
FIG. 5 shows a perspective view illustrating a modified embodiment of the slipper member shown in FIG. 3.

Preferably, the slipper member 22a, 22b may be formed to have the disk-shaped configuration as shown in FIG. 3 or a rectangular configuration as shown in FIG. 5, by using a material made of metal or resin.

The constant velocity universal joint 10 according to the first embodiment of the present invention is basically constructed as described above. Next, its operation, function, and effect will be explained.

When the unillustrated first shaft is rotated, then its rotary power is transmitted to the inner member 16 via the outer cup 12, and the second shaft 14 is rotated in a predetermined direction by the aid of the trunnions 26a to 26c formed to be spherical.

That is, the rotary power of the outer cup 12 is transmitted to the slipper members 22a, 22b which make displacement along the guide grooves 18a (18b, 18c), and it is further transmitted to the trunnions 26a (26b, 26c) which make surface-to-surface contact with the slipper members 22a, 22b. Thus, the second shaft 14, which is engaged with the trunnions 26a (26b, 26c), is rotated.

Figure 6:
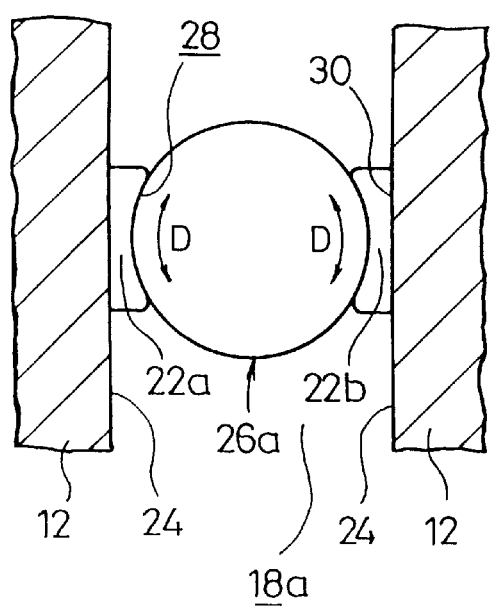
FIG. 6 shows a sectional view taken along a line VI-VI shown in FIG. 2.

During this process, when the second shaft 14 is inclined by a predetermined angle with respect to the outer cup 12 having the first shaft, the trunnion 26a (26b, 26c), which is formed to have the spherical configuration, makes sliding displacement by predetermined angles in the directions indicated by an arrow C (see FIG. 2) and an arrow D (see FIG. 6) along the recesses 28 of the spherical surfaces formed on one side surfaces of the slipper members 22a, 22b. Simultaneously with the sliding displacement of the trunnion 26a (26b, 26c), the slipper members 22a, 22b make sliding displacement along the sliding surfaces 24 via the flat surfaces 30 formed on the other side surfaces. In this embodiment, the slipper members 22a, 22b are provided slidably displaceably in all directions concerning the sliding surfaces 24 including the direction indicated by an arrow E (see FIG. 1) parallel to the axis of the sliding surfaces 24 and the direction indicated by an arrow F (see FIG. 2) perpendicular to the axis. Accordingly, the rotational motion of the first shaft is transmitted to the second shaft 14 without being affected by the angle of inclination of the second shaft 14 with respect to the outer cup 12.

As described above, in the first embodiment, the pair of slipper members 22a, 22b, which are slidably displaceable while making surface-to-surface contact with the trunnions 26a (26b, 26c) and the sliding surfaces 24, are interposed between the trunnions 26a (26b, 26c) and the sliding surfaces 24. Therefore, in the first embodiment, the surface pressure at the sliding section is lowered as compared with the conventional technique which is based on the linear contact with the sliding section. Thus, it is possible to stabilize the lubricating performance without causing any oil film breakage at the sliding section. As a result, it is possible to avoid, for example, occurrence of pits and adhesive wear resulting from lubrication failure.

Figure 7A:
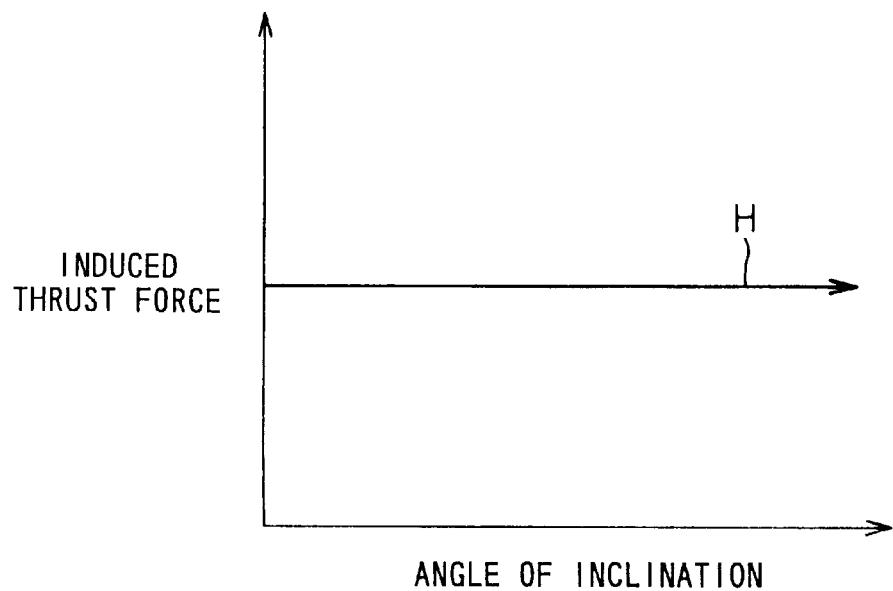
FIGS. 7A and 7B illustrate the relationship between the angle of inclination of the second shaft and the induced thrust force.
Figure 7B:
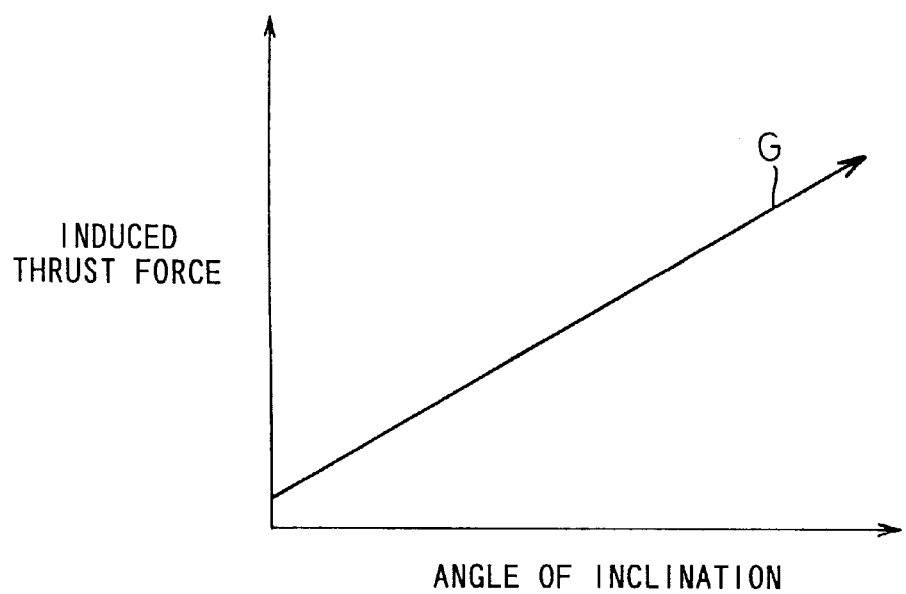

The relationship between the induced thrust force and the relative angle of inclination of the second shaft 14 with respect to the first shaft is shown in FIGS. 7A and 7B. The term "induced thrust force" described above refers to the load resulting from frictional resistance generated by the sliding displacement of the slipper members 22a, 22b along the guide grooves 18a to 18c.

As shown in FIG. 7B, in the case of a constant velocity universal joint concerning the conventional technique (straight line G), the induced thrust force is rapidly increased in accordance with the increase in the angle of inclination of the second shaft 14. On the contrary, as shown in FIG. 7A, in the case of the constant velocity universal joint 10 according to the first embodiment (straight line H), the induced thrust force is maintained to be approximately constant even when the angle of inclination is increased. Therefore, in the constant velocity universal joint 10 according to the first embodiment, the induced thrust force, which is generated resulting from the frictional resistance, is not increased rapidly even when the angle of inclination of the second shaft 14 with respect to the outer cup 12 is increased. Thus, it is possible to stabilize the induced thrust force.

Figure 8A:
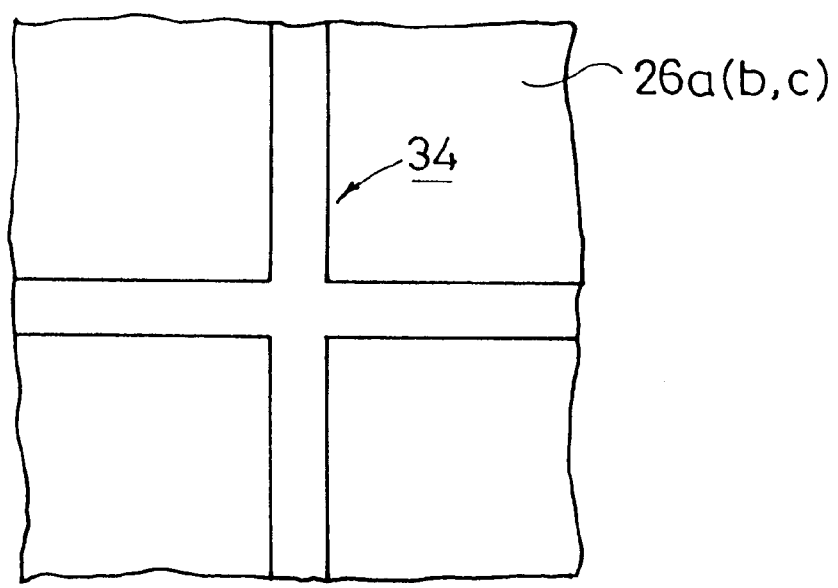
FIGS. 8A and 8B illustrate shapes of lubricating grooves formed on outer surfaces of the trunnions respectively.
Figure 8B:
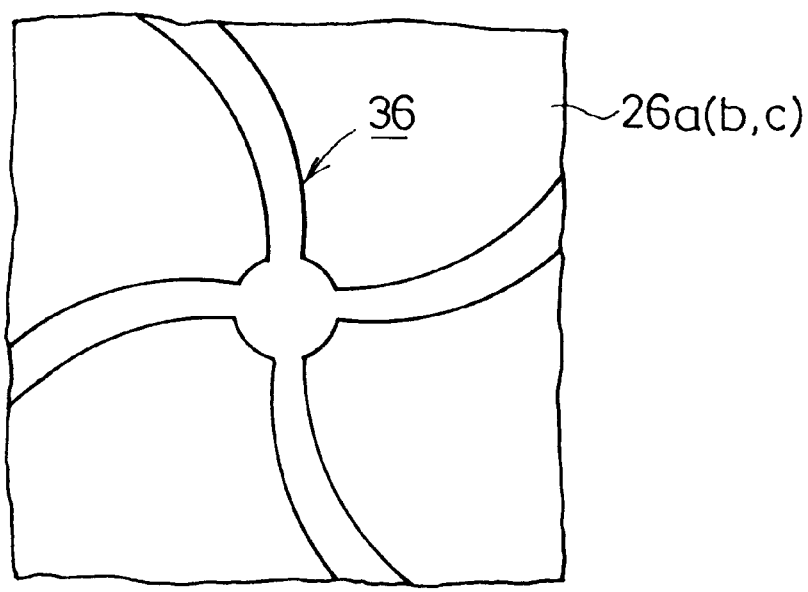
Figure 9:
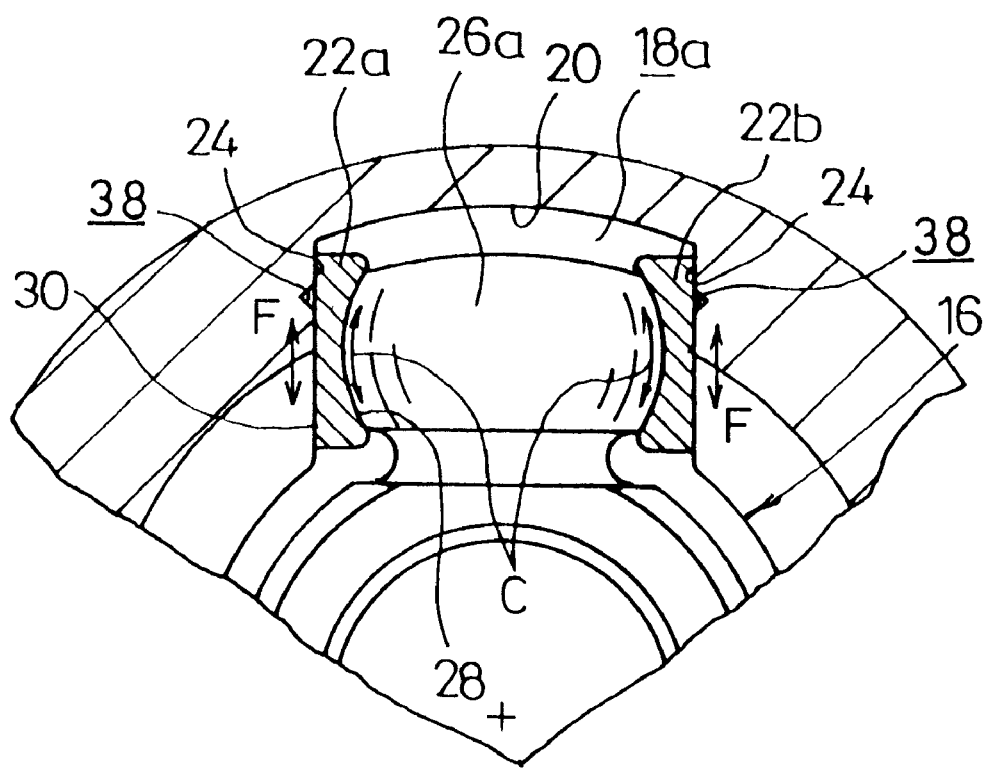
FIG. 9 shows a cross-sectional view, with partial omission, illustrating lubricating grooves formed on sliding surfaces of a guide groove.

In the first embodiment, for example, a plurality of lubricating grooves 34, which are arranged longitudinally and latitudinally, are formed to make intersection (see FIG. 8A), or lubricating grooves 36, which extend outwardly in a curved configuration, are formed in four directions (see FIG. 8B) on outer surfaces of the trunnions 26a (26b, 26c) which contact with the slipper members 22a, 22b. Thus, it is possible to further improve the lubricating performance at the sliding section between the trunnions 26a (26b, 26c) and the slipper members 22a, 22b. In this embodiment, the location of the lubricating grooves 34, 36 is not limited to the outer surfaces of the trunnions 26a (26b, 26c). The lubricating grooves 34, 36 may be formed on the spherical surfaces of the trunnions 26a (26b, 26c), the recesses 28 of the slipper members 22a, 22b which make surface-to-surface contact with the sliding surfaces 24 of the guide grooves 18a (18b, 18c), and the flat surfaces 30 respectively. Further, the lubricating performance may be improved by forming oil sumps such as dimples (not shown) on the outer surfaces of the trunnions 26a (26b, 26c). In addition, as shown in FIG. 9, at least one stripe of lubricating groove 38, which extends substantially in parallel to the axis of the outer cup 12, may be formed on the sliding surface 24 of the guide groove 18a (18b, 18c). The sectional configuration of the lubricating groove 38 may be V-shaped, circular arc-shaped, or rectangular. The lubricating groove 38 may be provided as a plurality of individuals.

Further, it is possible to reduce the coefficient of friction by applying a coating treatment to any one of or both of the surfaces of the trunnions 26a (26b, 26c) and-the slipper members 22a, 22b.

In the first embodiment, it is enough to provide only the pair of slipper members 22a, 22b, as compared with the conventional technique. Therefore, the first embodiment is advantageous in that the number of parts is decreased, and the production cost can be reduced.

Figure 10:
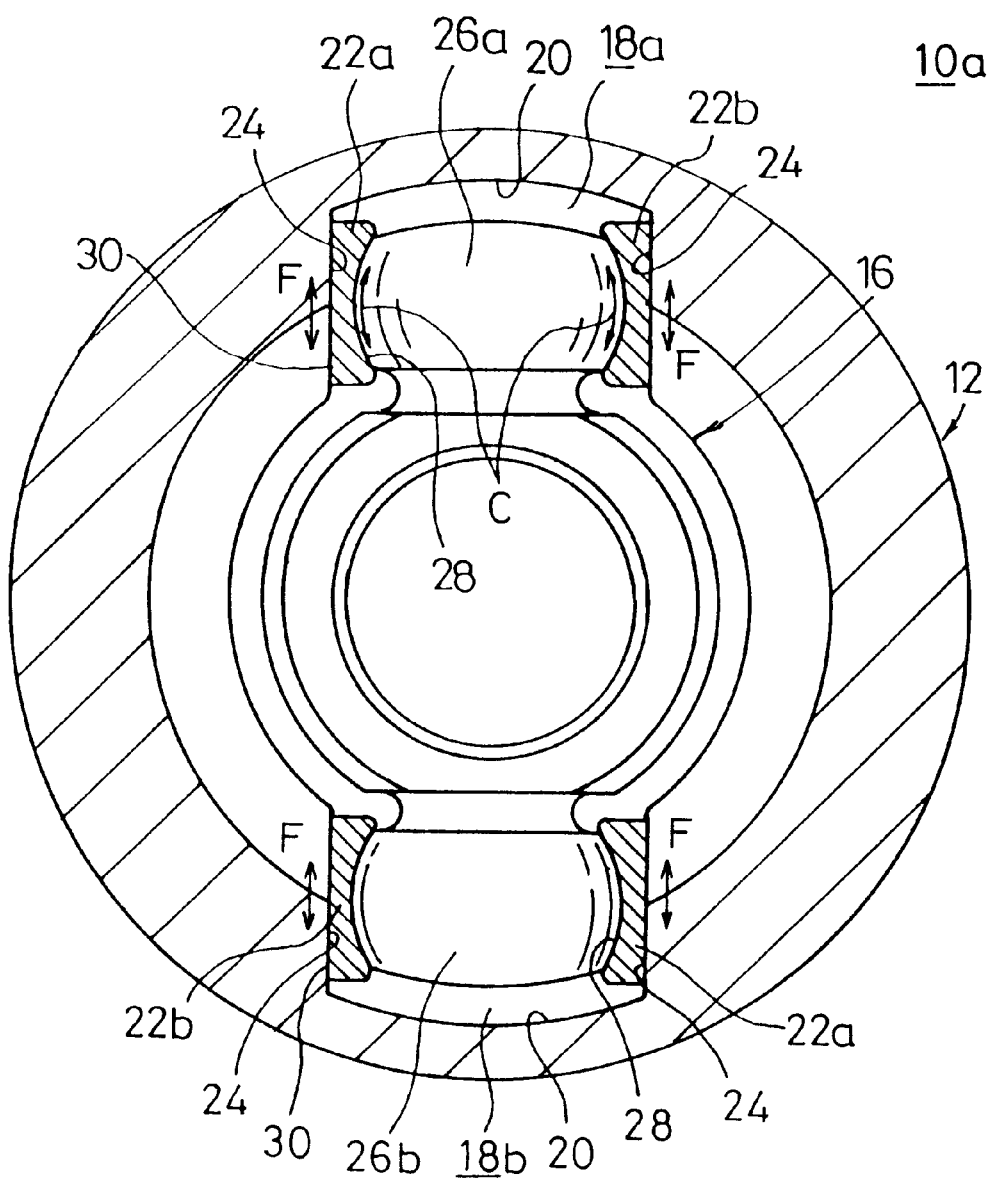
FIG. 10 shows a cross-sectional view illustrating application of the constant velocity universal joint shown in FIG. 2 to a bipod type.

The first embodiment has been explained with reference to the tripod type constant velocity universal joint 10 provided with the three trunnions 26a (26b, 26c). However, the present invention is not limited thereto. It is a matter of course that the present invention can be applied to a constant velocity universal joint 10*a* of the bipod type as shown in FIG. 10.

Figure 11:
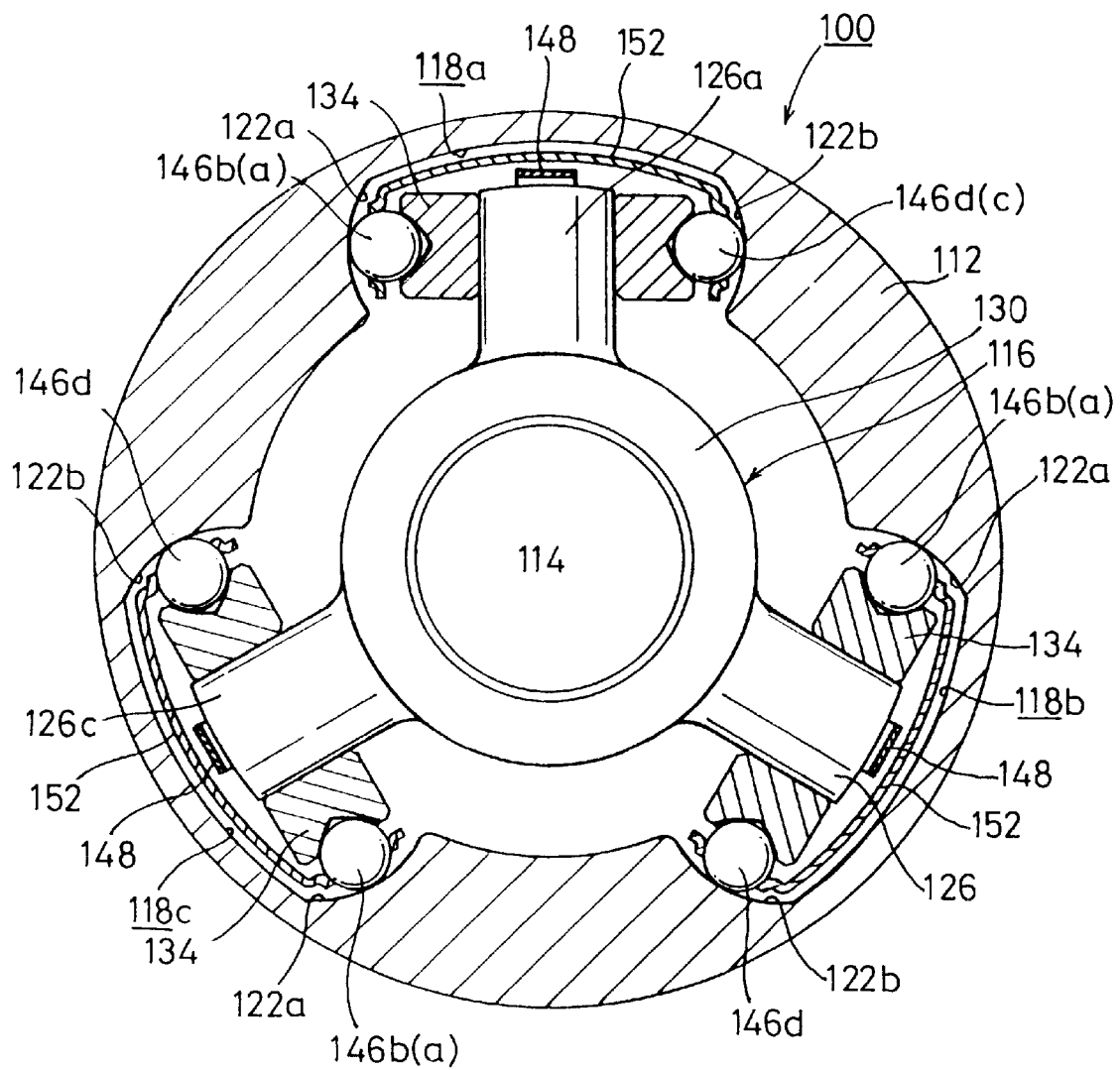
FIG. 11 shows a cross-sectional view Illustrating a constant velocity universal joint according to a second embodiment of the present invention.

Next, a constant velocity universal joint 100 according to a second embodiment of the present invention is shown in FIG. 11.

Figure 12:
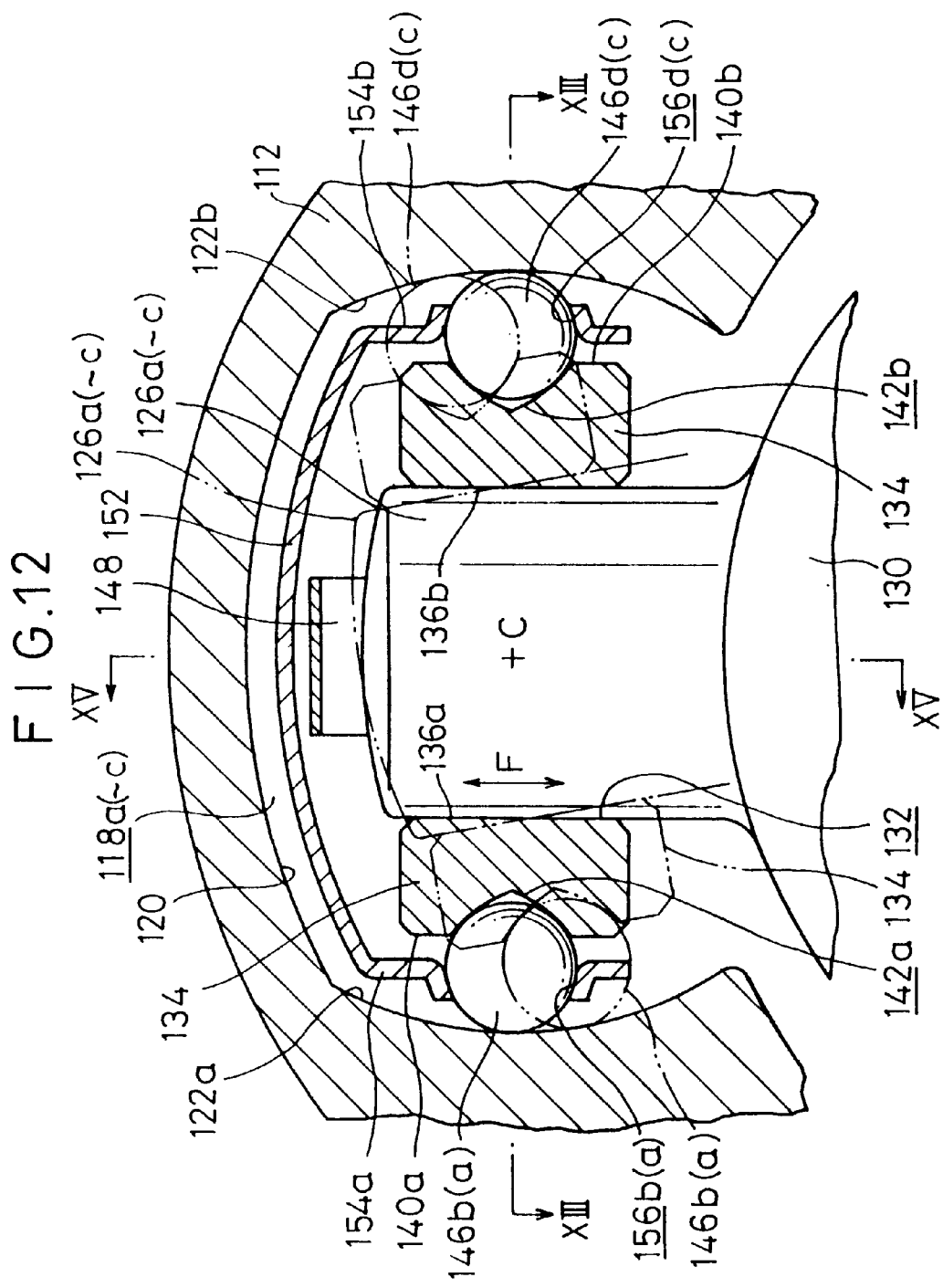
FIG. 12 shows a partial magnified view illustrating the constant velocity universal joint shown in FIG. 11.

The constant velocity universal joint 100 comprises a cylindrical outer cup (outer member) 112 having an opening and integrally coupled to one end of an unillustrated first shaft, and an inner member 116 fixedly secured to one end of a second shaft 114 and accommodated in a hole of the outer cup 112. Three guide grooves 118*a* to 118*c*, which extend in the axial direction and which are spaced apart from each other by 120° about the center of the axis respectively, are formed on an inner circumferential surface of the outer cup 112. As shown In FIG. 12, the guide groove 118*a* to 118*c* is composed of a ceiling section 120 which is curved along the outer circumference of the outer cup 112, and side curved sections 122*a*, 122*b* which are formed mutually opposingly on both sides of the ceiling section 120 and which are centered about a point C in each of the guide grooves 118*a* to 118*c*. The cross section of the ceiling section 120 is not limited to the curved configuration. The ceiling section 120 may be formed to have a flat configuration.

As shown in FIG. 11, a spider 130 Is externally fitted to the second shaft 114. Three trunnions 126*a* 126*c*, which extend toward the guide grooves 118*a* to 118*c* respectively and which are spaced apart from each other by 120° about the center of the axis of the second shaft 114, are formed to expand in a column-shaped configuration.

Figure 13:
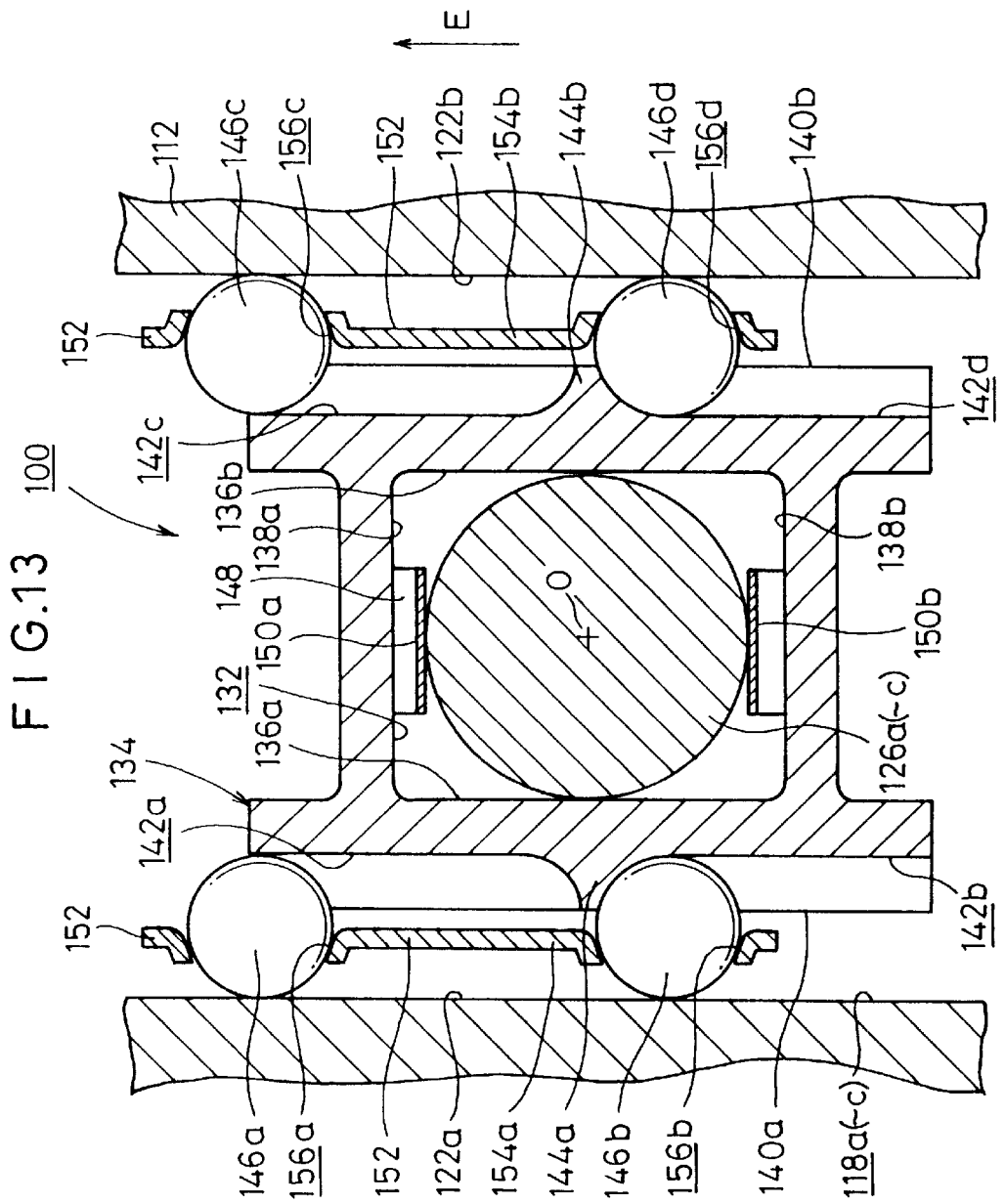
FIG. 13 shows a sectional view taken along a line XIII—XIII shown in FIG. 12.
Figure 14:
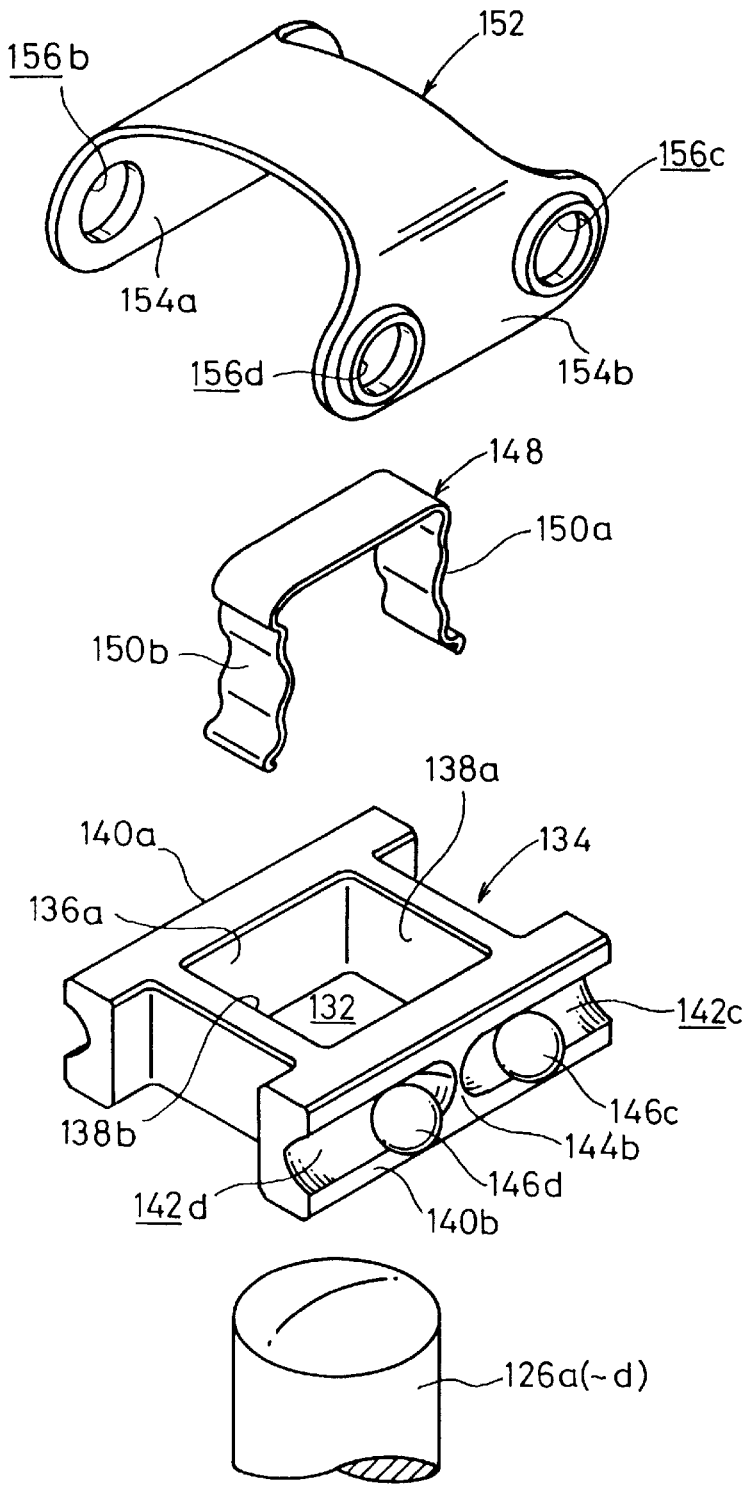
FIG. 14 shows a partial exploded perspective view illustrating the constant velocity universal joint shown In FIG. 12.

As shown in FIGS. 13 and 14, a holder 134, which has a configuration comprising two pairs of parallel planes crossing perpendicularly with each other so that a substantially rectangular parallel-piped open hollow space (a hole 132) is defined therein, is provided on the outer circumferential of the trunnion 126*a* to 126*c*. The trunnion 126*a* to 126*c* is provided to be insertable through the hole 132 having a quadrilateral cross section formed at a central portion of the holder 134. The holder 134 is provided as a plurality of individuals corresponding to the trunnions 126*a* to 126*c*, and each of the plurality of holders 134 is formed to have a substantially identical shape.

The hole 132 comprises a pair of abutting surfaces 136*a*, 136*b* which slide in a state of line-to-line contact with the outer circumferential surface of the trunnion 126*a* to 126*c*, and a pair of wall surfaces 138*a*, 138*b* which are provided perpendicularly to the abutting surfaces 136*a*, 136*b*. The pair of abutting surfaces 136*a*, 136*b* and the pair of wall surfaces 138*a*, 138*b* are formed mutually opposingly.

The holder 134 has a pair of outer wall sections 140*a*, 140*b*. Grooves 142*a*, 142*b*, which are parallel to the abutting surface 136*a*, 136*b*, are formed on one of the outer wall sections 140*a*. Grooves 142*c*, 142*d*, which are parallel to the abutting surface 136*a*, 136*b*, are formed on the other outer wall section 140*b*. Each of the grooves 142*a* to 142*d* is formed to have a V-shaped cross section. However, the groove surface thereof is formed to be slightly curved in order to reduce the surface pressure on ball members as described later on (see FIG. 12). The sectional configuration of the groove 142*a* to 142*d* is not limited to the V-shaped configuration. The groove 142*a* to 142*d* may be formed to have an elliptic configuration or a composite curve constructed by a plurality of curves having different radii of curvature.

Stoppers 144*a*, 144*b* for making separation between the grooves 142*a* and 142*b* and between the grooves 142*c* and 142*d* are formed at approximately central portions of the outer wall sections 140*a*, 140*b*. Ball members (rolling members) 146*a*, 146*b* are interposed rollably between the grooves 142*a*, 142*b* and the one side curved section 122*a*. Ball members 146*c*, 146*d* are interposed rollably between the grooves 142*c*, 142*d* and the other side curved section 122*b*.

As shown in FIG. 12, the ball member 146*a* to 146*d* is supported at two points on the curved groove surface of the groove 142*a* to 142*d* formed on the holder 134. The ball member 146*a* to 146*d* is provided rollably along the longitudinal direction of the groove 142*a* to 142*d* of the holder 134, and the displacement range thereof is restricted by the stoppers 144*a*, 144*b*.

A frame (spring member) 148, which is formed to have a substantially ]-shaped cross section, of a material having resilience such as a metal plate, is provided between the trunnion 126*a* to 126*c* and the ceiling section 120. Legs 150*a*, 150*b* of the frame 148 are inserted into gaps formed between the outer circumferential surface of the trunnion 126*a* to 126*c* and the wall surfaces 138*a*, 138*b* of the holder 134. The both legs 150*a*, 150*b* of the frame 148 are formed to be wave-shaped to abut against the outer circumferential surface of the trunnion 126*a* to 126*c* and the wall surfaces 138*a*, 138*b* of the holder 134 so that the both are urged in directions to make mutual separation.

A retainer 152, which is formed of a material such as a metal plate having resilience, is provided between the frame 148 and the ceiling section 120. Side sections 154*a*, 154*b* of the retainer 152 are bent to be inserted between the outer wall sections 140*a*, 140*b* of the holder 134 and the side curved sections 122*a*, 122*b* (see FIGS. 12 and 13). A plurality of circular holes 156*a*, 156*b* are formed through the side section 154*a*. Holes 156*c*, 156*d* are formed through the side section 154*b*.

The diameter of the hole 156*a* to 156*d* is designed to be slightly smaller than the diameter of the ball member 146*a* to 146*d*. Thus, the ball member 146*a* to 146*d* is provided to rollably engage with the hole 156*a* to 156*d*. In this embodiment, as clearly understood from FIG. 13, the spacing distance between the holes 156*a* and 156*b* is selected so that when the one ball member 146*b* abuts against the stopper 144*a*, the other ball member 146*a* is not disengaged from the groove 142*a*. The spacing distance between the holes 156*c* and 156*d* is set in the same manner as described above.

The ball members 146*a* to 146*d* are pressed toward the grooves 142*a* to 142*d* by means of the resilience of the retainer 152. Accordingly, when the constant velocity universal joint 100 is assembled, the ball members 146*a* to 146*d* are always held in a state of engagement with the grooves 142*a* to 142*d*, and the ball members 146*a* to 146*d* are not disengaged from the grooves 142*a* to 142*d*. Therefore, the constant velocity universal joint 100 can be easily assembled as a whole.

The constant velocity universal joint 100 according to the second embodiment of the present invention is basically constructed as described above. Next, its operation will be explained.

When the unillustrated first shaft is rotated, its rotary power is transmitted from any one of the side curved sections 122*a*, 122*b* of the outer cup 112 depending on the direction of rotation through the ball members 146*a*, 146*b* (or 146*c*, 146*d*) and the holder 134 to the trunnions 126*a* to 126*c*. Thus, the spider 130 is rotated, and consequently the second shaft 114 having its one end fitted to the spider 130 is rotated (see FIG. 11).

In this embodiment, when the second shaft 114 is inclined by a predetermined angle with respect to the axis of the outer cup 112 having the unillustrated first shaft, the trunnions 126a to 126c are tilted in accordance with the tilting movement of the second shaft 114.

For example, as shown in FIG. 12, when the trunnion 126a to 126c is tilted about the center of a point C, then the holder 134 which makes line-to-line contact with the outer circumference of the trunnion 126a to 126c is tilted, the ball members 146a to 146d roll on the side curved sections 122a, 122b, and the trunnion 126a to 126c is smoothly tilted. The holder 134 is provided so that it makes follow-up movement always at an identical angle with respect to the trunnion 126a to 126c during this process (see two-dot chain lines in FIG. 12).

Figure 20A:
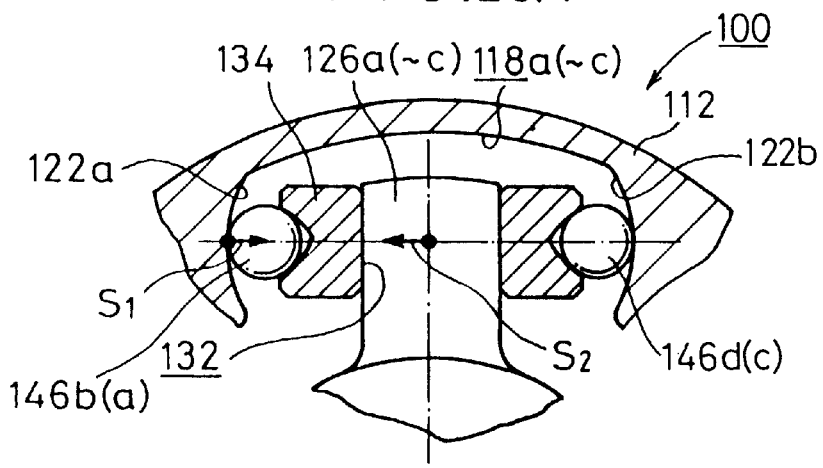
FIGS. 20A to 20C illustrate the operation depicting the state in which the holder makes follow-up displacement with respect to the trunnion in the constant velocity universal joint shown in FIG. 11 respectively.
Figure 20B:
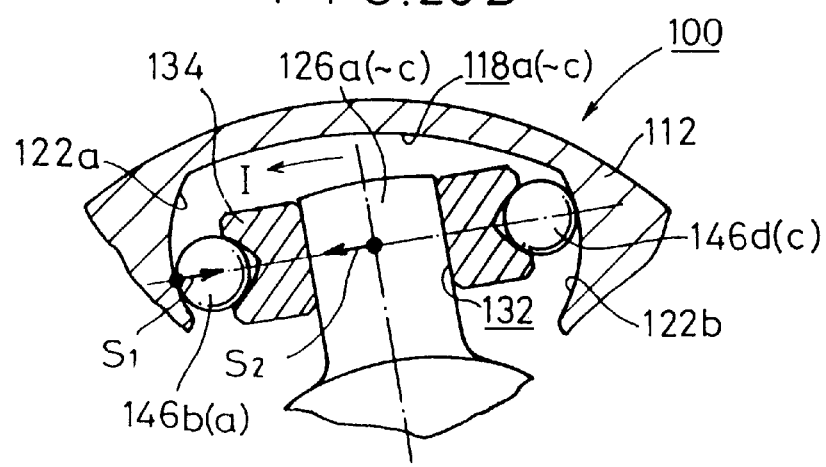
Figure 20C:
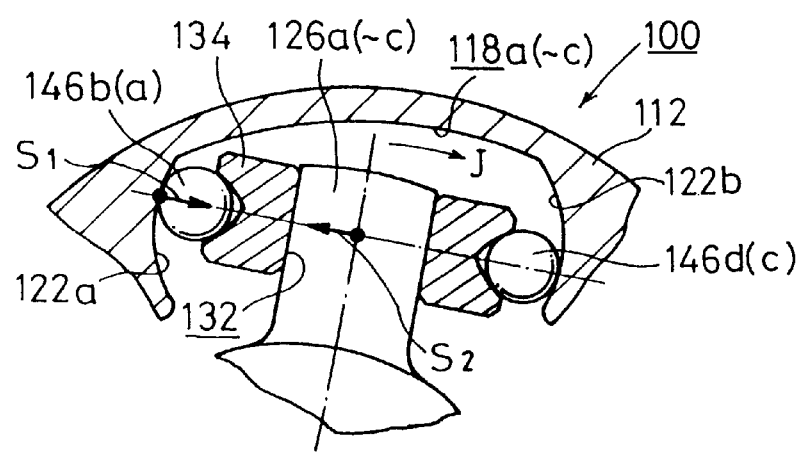

That is, as shown in FIGS. 20A to 20C, the holder 134, which is inserted into the trunnion 126a to 126c through the hole 132, is provided to make integrated displacement in the direction indicated by an arrow I or in the direction indicated by an arrow J while following the displacement of the trunnion 126a to 126c under the rolling action of the ball members 146a to 146d which are provided rollably between the holder 134 and the side curved section 122a, 122b of the guide groove 118a to 118c. As shown in FIGS. 20B and 20C, when the force is transmitted through the ball members 146a to 146d, the holder 134, and the trunnion 126a to 126c, the acting vectors $S_1$, $S_2$ of the force are always on an identical line, even if the trunnion 126a to 126c and the holder 134 are inclined integrally with respect to the outer cup 112. Moreover, the spacing distance (clearance) between the centers of the ball members 146a to 146d and the center of the axis of the trunnion 126a to 126c is set to be always constant.

As described above, in the second embodiment, the acting vectors $S_1$, $S_2$ of the force acting in the direction from the ball members 146a to 146d to the trunnion 126a to 126c (or in the direction from the trunnion 126a to 126c to the ball members 146a to 146d) are always on the identical line, and the spacing distance (clearance) between the centers of the ball members 146a to 146d and the center of the axis of the trunnion 126a to 126c is set to be always constant. Thus, an effect is obtained in that no looseness resulting from backlash is generated on the no-load side, and the force is smoothly transmitted.

Figure 21A:
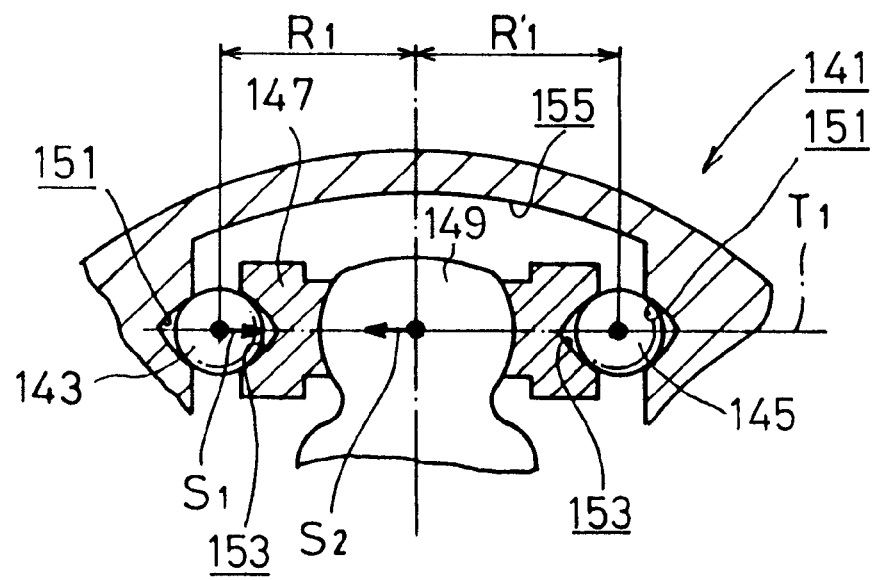
FIGS. 21A and 21B illustrate the operation based on the use of Comparative Example of a constant velocity universal joint respectively.
Figure 21B:
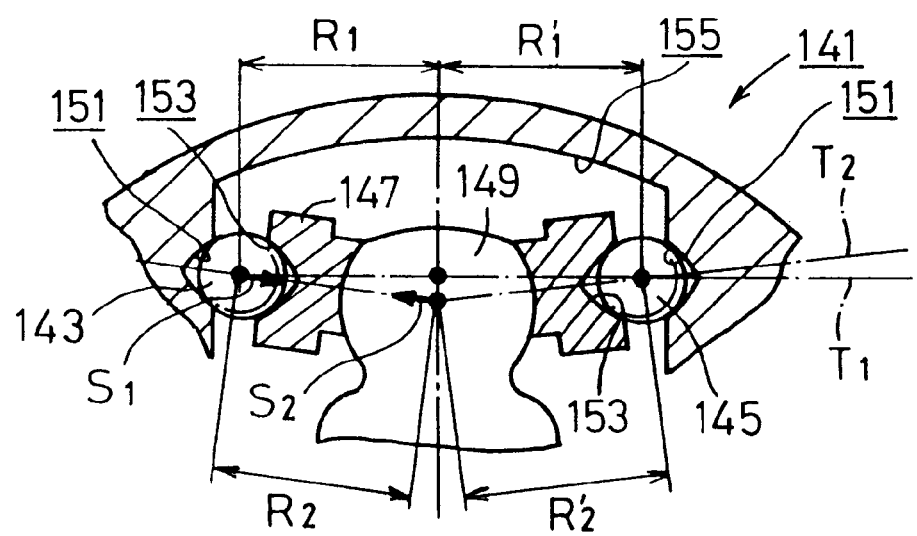

On the contrary, in the case of a constant velocity universal joint 141 concerning Comparative Example shown in FIGS. 21A and 21B, when the force is transmitted through ball members 143 (the ball members 143 are disposed on the load side, while ball members disposed on the no-load side are designated by reference numeral 145), a holder 147, and a trunnion 149, the acting vectors $S_1$, $S_2$ of the force exist on a line $T_1$ in a state shown in FIG. 21A, while the acting vectors $S_1$, $S_2$ of the force exist on a line $T_2$ in a state shown in FIG. 21B.

Therefore, when the trunnion 149 is displaced from the state shown in FIG. 21A to the state shown in FIG. 21B, the acting vectors $S_1$, $S_2$ of the force are on the different lines $T_1$, $T_2$ respectively. Moreover, in the state shown in FIG. 21B, the clearance is generated between the ball members 145 on the no-load side and the guide groove 155 and the grooves 151, 153 formed on the holder 147 respectively. As a result, in FIG. 21B, a relationship of $R_1+R_1' < R_2+R_2'$ is given. An inconvenience arises in that looseness is generated on the no-load side resulting from the clearance between the ball members 145 and the grooves 151, 153. Incidentally, FIG. 21B shows the state in which the trunnion 149 is displaced downwardly by a predetermined amount from the state shown in FIG. 21A.

Therefore, the constant velocity universal joint 141 concerning Comparative Example shown in FIGS. 21A and 21B involves the problem that looseness occurs resulting from backlash when the force is transmitted from the ball members 143 (145) to the trunnion 149 (or from the trunnion 149 to the ball members 143, 145).

With reference to FIG. 12, the one ball member 146b (146a) and the other ball member 146d (146c), which are arranged in a separate manner on the right and left sides with respect to the trunnion 126a to 126c interposed therebetween, are prevented from simultaneous and horizontal rolling displacement in the lower direction in FIG. 12, because the side curved sections 122a, 122b are formed to be circular arc-shaped inwardly.

Figure 15:
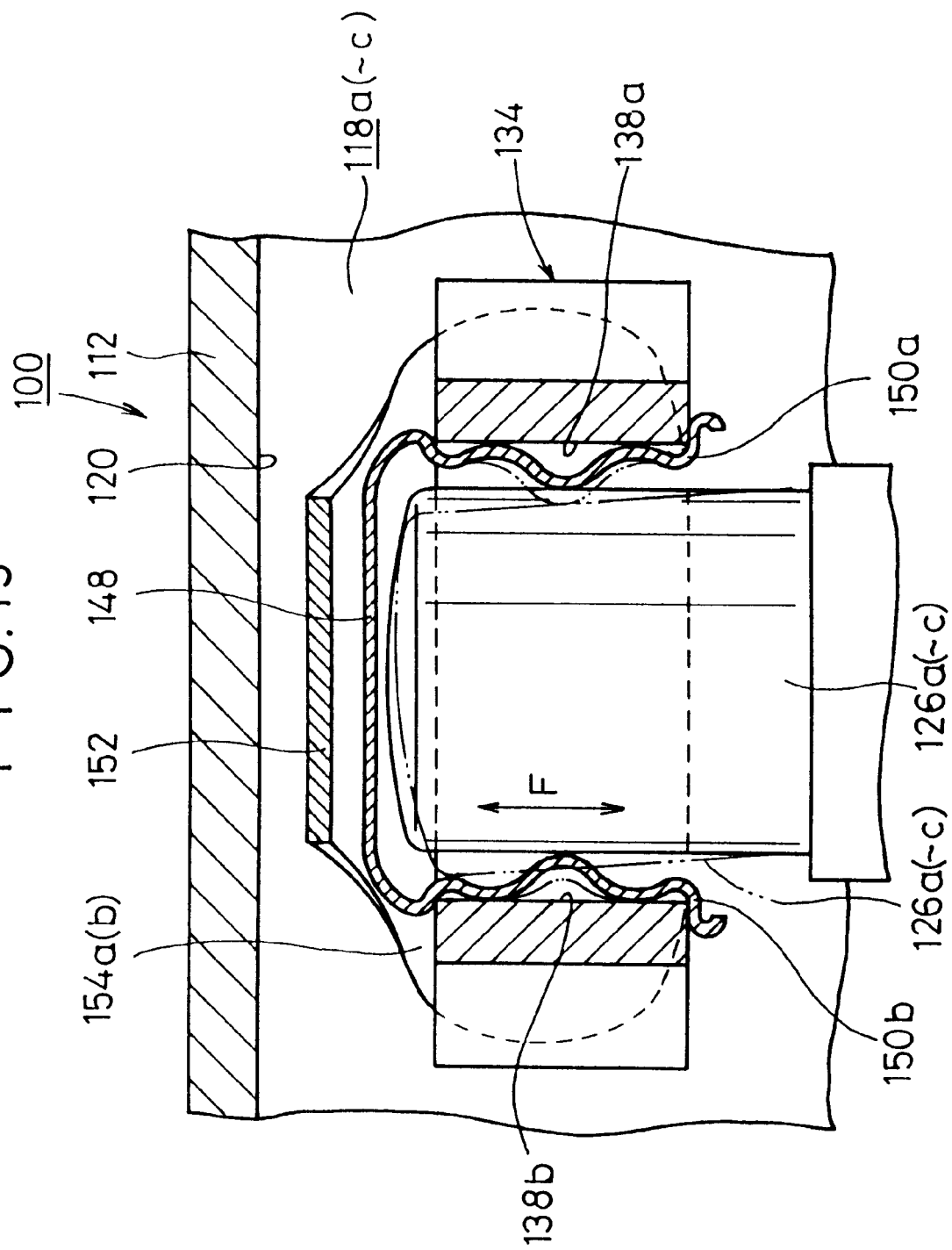
FIG. 15 shows a sectional view taken along a line XV—XV shown in FIG. 12.

As shown in two-dot chain lines in FIG. 15, when the trunnion 126a to 126c is tilted by a predetermined angle toward the one leg 150 of the frame 148, then a part of the outer circumference of the trunnion 126a to 126c compresses the one leg 150b of the frame 148 against the repulsive force exerted by the frame 148 to approach the wall surface 138b of the holder 134, and the other part thereof is separated from the wall surface 138a by means of the repulsive force exerted by the frame 148.

The trunnion 126a to 126c makes slidable line-to-line contact with the abutting surfaces 136a, 136b of the holder 134 (see FIG. 12). Further, the trunnion 126a to 126c slidably engages with the legs 150a, 150b of the frame 148 (see FIG. 15). Therefore, the trunnion 126a to 126c is provided relatively displaceably in the axial direction (direction indicated by an arrow F in FIG. 15) with respect to the holder 134.

As shown in FIG. 13, when the trunnion 126a to 126c is rotated about the center of its axis (point O in FIG. 13), the outer circumference of the trunnion 126a to 126c slides on the abutting surfaces 136a, 136b of the holder 134 and on the legs 150a, 150b of the frame 148. Accordingly, no unreasonable force is applied to the trunnion 126a to 126c, and the trunnion 126a to 126c is smoothly rotated.

As described above, the trunnions 126a to 126c are provided tiltably with respect to the outer cup 112. Thus, the clearance between the constitutive components is not increased even when the operating angle between the first shaft and the second shaft 114 is increased. Therefore, it is possible to avoid the occurrence of the vibration in the direction of rotation and the beat sound resulting from backlash.

When the trunnion 126a to 126c is tilted, if the trunnion 126a to 126c is displaced along the guide groove 118a to 118c, the ball members 146a to 146d roll along the both surfaces of the groove 142a to 142d of the holder 134 and the side curved section 122a, 122b of the guide groove 118a to 118c while being held by the holes 156a to 156d of the retainer 152. Accordingly, the induced thrust force exerted on the trunnion 126a to 126c Includes only the rolling resistance of the ball members 146a to 146d. Thus, the trunnion 126a to 126c can make tilting movement and displacement with less resistance.

In this process, as shown in FIG. 13, the ball members 146b, 146d abut against the stoppers 144a, 144b, and their displacement range is restricted thereby. Each of the ball members 146a to 146d is engaged with the hole 156a to 156d of the retainer 152, and the relative position of each of them is determined. In this arrangement, even when the ball members 146a to 146d are displaced toward one of the sides of the grooves 142a to 142d (for example, in the direction indicated by an arrow E), the force, which is exerted by the trunnion 126a to 126c on the abutting surface 136a, 136b of the holder 134, is always located between the ball members 146a and 146b and between the ball members 146c and 146d. Therefore, the holder 134 is supported by the ball members 146a to 146d in a well balanced manner.

During this process, the ball members 146a, 146c slightly protrude from the end of the holder 134. However, the ball members 146a, 146c are prevented from disengagement from the grooves 142a, 142c, because the ball members 146a, 146c are held by the retainer 152. Therefore, even when the length of the holder 134 is relatively short, the holder 134 is allowed to have a long displacement range with respect to the outer cup 112.

Figure 16:
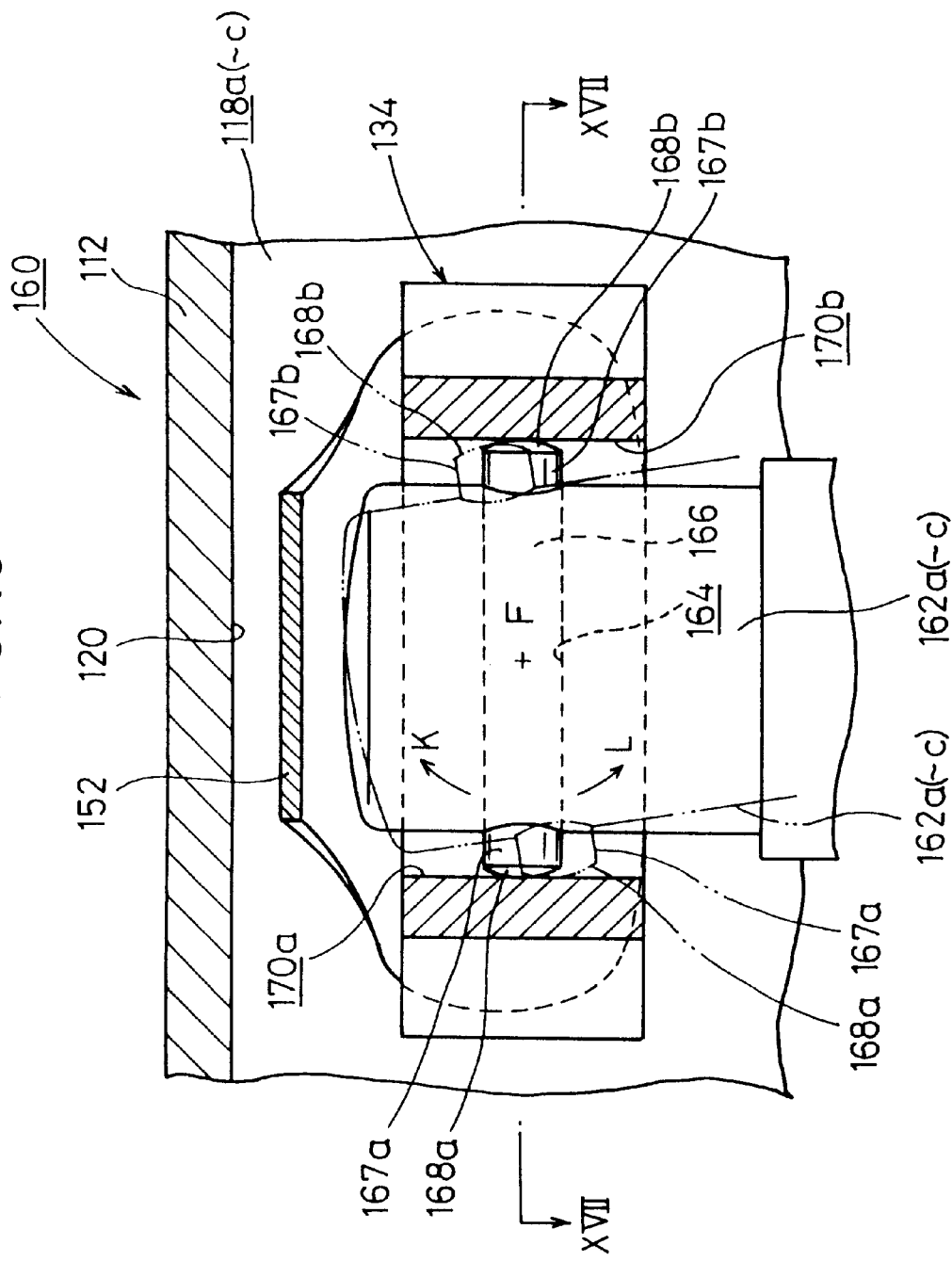
FIG. 16 shows a partial magnified sectional view illustrating a constant velocity universal joint according to a third embodiment of the present invention.
Figure 17:
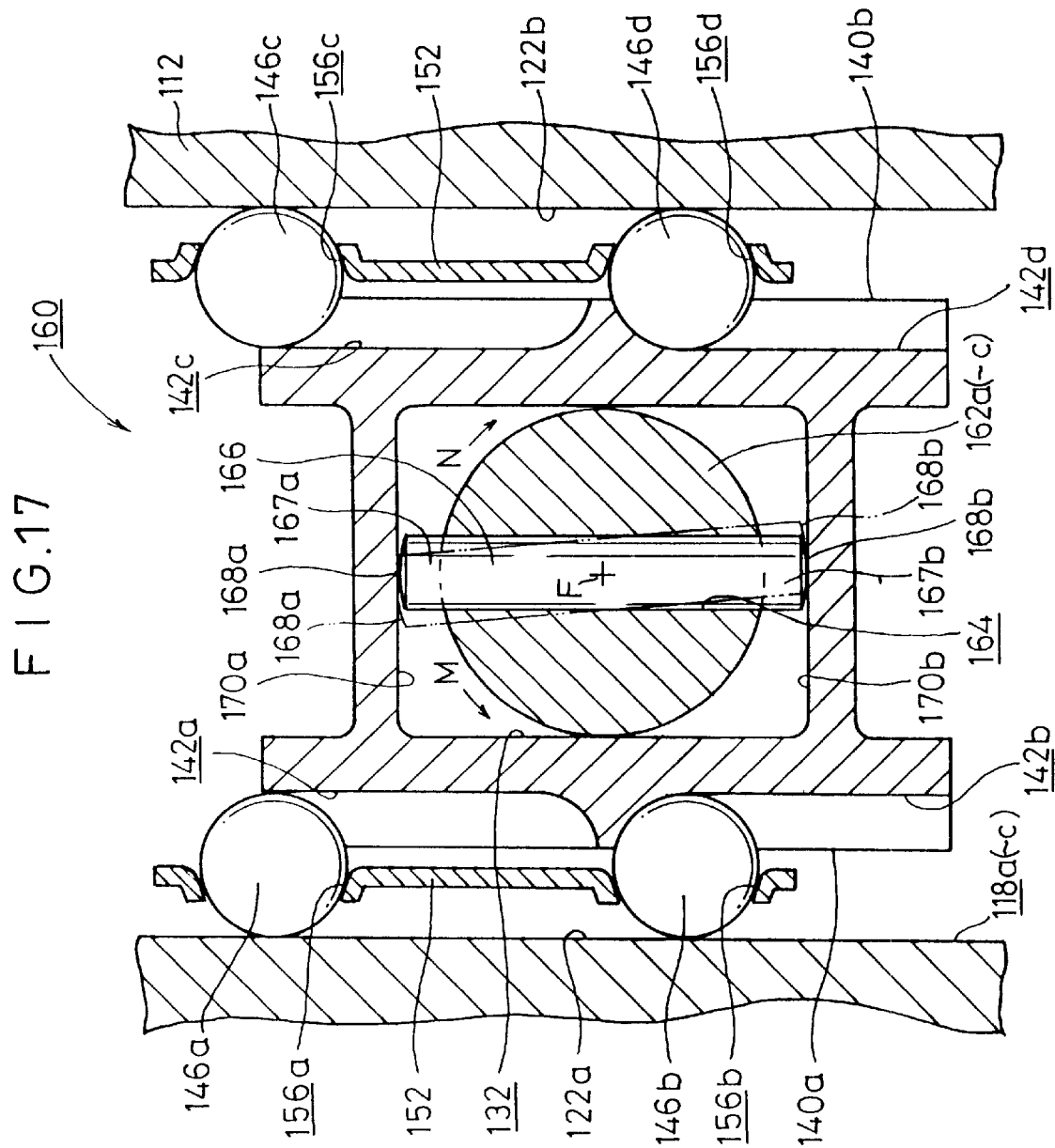
FIG. 17 shows a sectional view taken along a line XVII—XVII shown in FIG. 16.

Next, a constant velocity universal joint 160 according to a third embodiment of the present invention is shown in FIGS. 16 and 17. In the following embodiments, the same constitutive components as those described in the second embodiment are designated by the same reference numerals, detailed explanation of which will be omitted. Only different function and effect will be explained.

The constant velocity universal joint 160 has trunnions 162a to 162c through each of which a hole 164 is formed to extend perpendicularly to the axial direction of the trunnion 162a to 162c. A pin member 166 is inserted into the hole 164. Both end portions of the pin member 166 are formed to serve as projections 167a, 167b protruding from the hole 164. Spherical surfaces 168a, 168b, which are centered about a central point F of the pin member 166, are formed on the projections 167a, 167b. Flat surface sections 170a, 170b, against which the spherical surfaces 168a, 168b of the pin member 166 slidably abut, are formed on wall sections which constitute the hole 132 of the holder 134. The radius of curvature of the spherical surfaces 168a, 168b can be set to be a predetermined value by selecting the diameter of the pin member 166 to have a predetermined value.

As shown by two-dot chain lines in FIG. 16, when the trunnion 162a to 162c is tilted by a predetermined angle with respect to the outer cup 112, the spherical surfaces 168a, 168b of the pin member 166 slide along the flat surface sections 170a, 170b. Accordingly, the trunnion 162a to 162c makes relative rotation about the center of the point F in the direction indicated by an arrow K or an arrow L. As shown by two-dot chain lines in FIG. 17, the spherical surfaces 168a, 168b of the pin member 166 slide along the flat surface sections 170a, 170b, in accordance with which the trunnion 162a to 162c makes rotation about the center of the point F in the direction indicated by an arrow M or an arrow N. In this manner, the trunnions 162a to 162c are tiltable with respect to the outer cup 112, ensuring the degree of freedom thereof.

Figure 18:
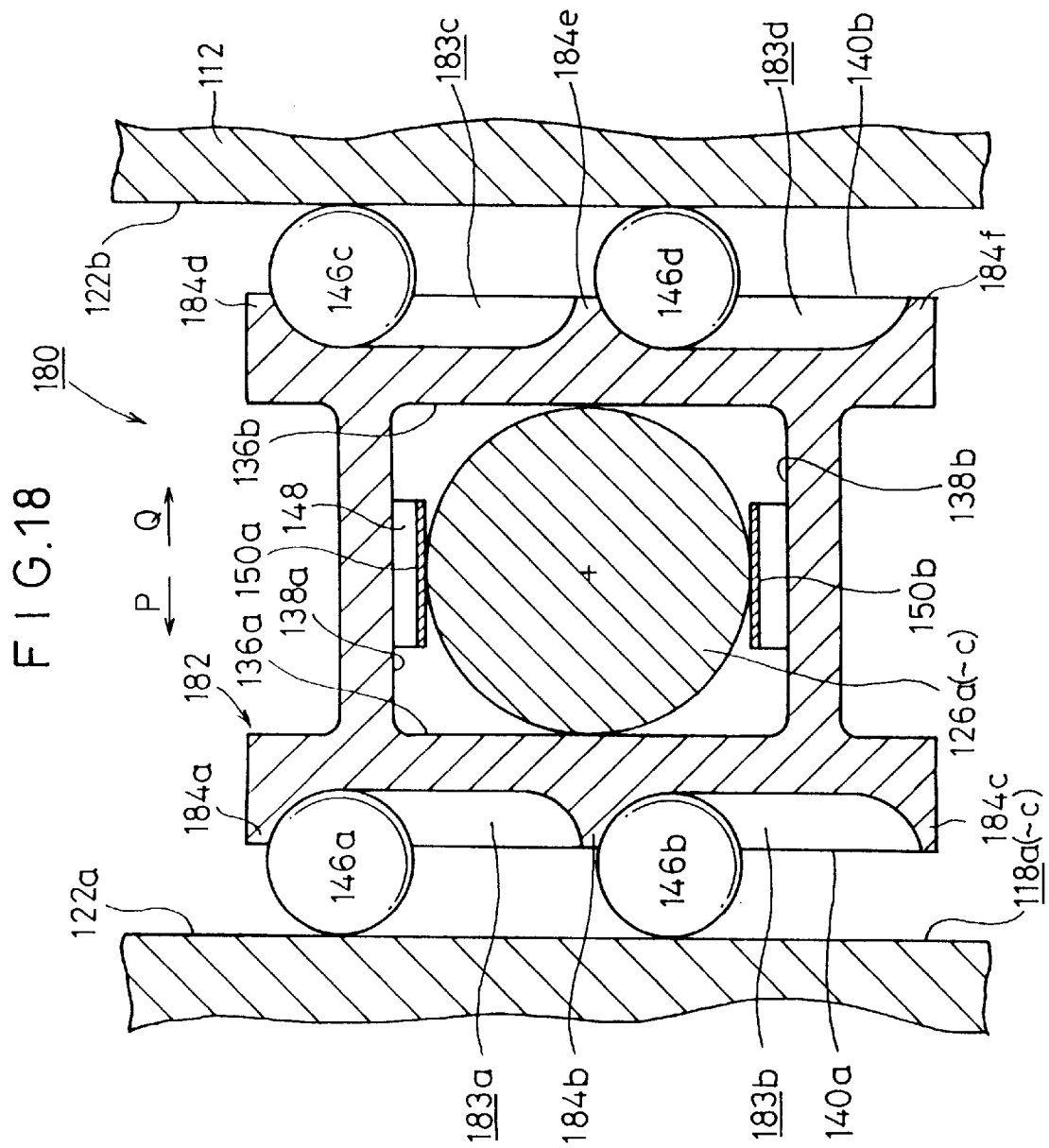
FIG. 18 shows a partial magnified sectional view illustrating a constant velocity universal joint according to a fourth embodiment of the present invention.

Next, a constant velocity universal joint 180 according to a fourth embodiment of the present invention is shown in FIG. 18.

Grooves 183a, 183b are formed on one outer wall section 140a of a holder 182 of the constant velocity universal joint 180, and grooves 183c, 183d are formed on the other outer wall section 140 thereof. Both end portions and central portions of the outer wall sections 140a, 140b are formed as stoppers 184a to 184f. Therefore, the grooves 183a and 183b, and the grooves 183c and 183d are separated from each other by the stoppers 184b, 184e respectively. One ball member 146a to 146d is provided rollably in each of the grooves 183a to 183d.

As clearly understood from FIG. 18, when the force in the circumferential direction of the outer cup 112 (in the direction indicated by an arrow P or Q in FIG. 18) is applied to the trunnion 126a to 126c, the force, which is exerted by the trunnion 126a to 126c on the abutting surface 136a, 136b of the holder 182, is always located between the ball members 146a and 146b and between the ball members 146c and 146d. Therefore, the holder 182 is supported by the ball members 146a to 146d in a well balanced manner. As a result, with reference to FIG. 18, the holder 182 is held so that its unillustrated axis is always substantially parallel to the side curved sections 122a, 122b, and the holder 182 is prevented from inclination in the direction of the arrow P or the arrow Q, which would be otherwise caused on the basis of, for example, the clearance around the ball members 146a to 146d or the deformation of the holder 182.

Figure 19:
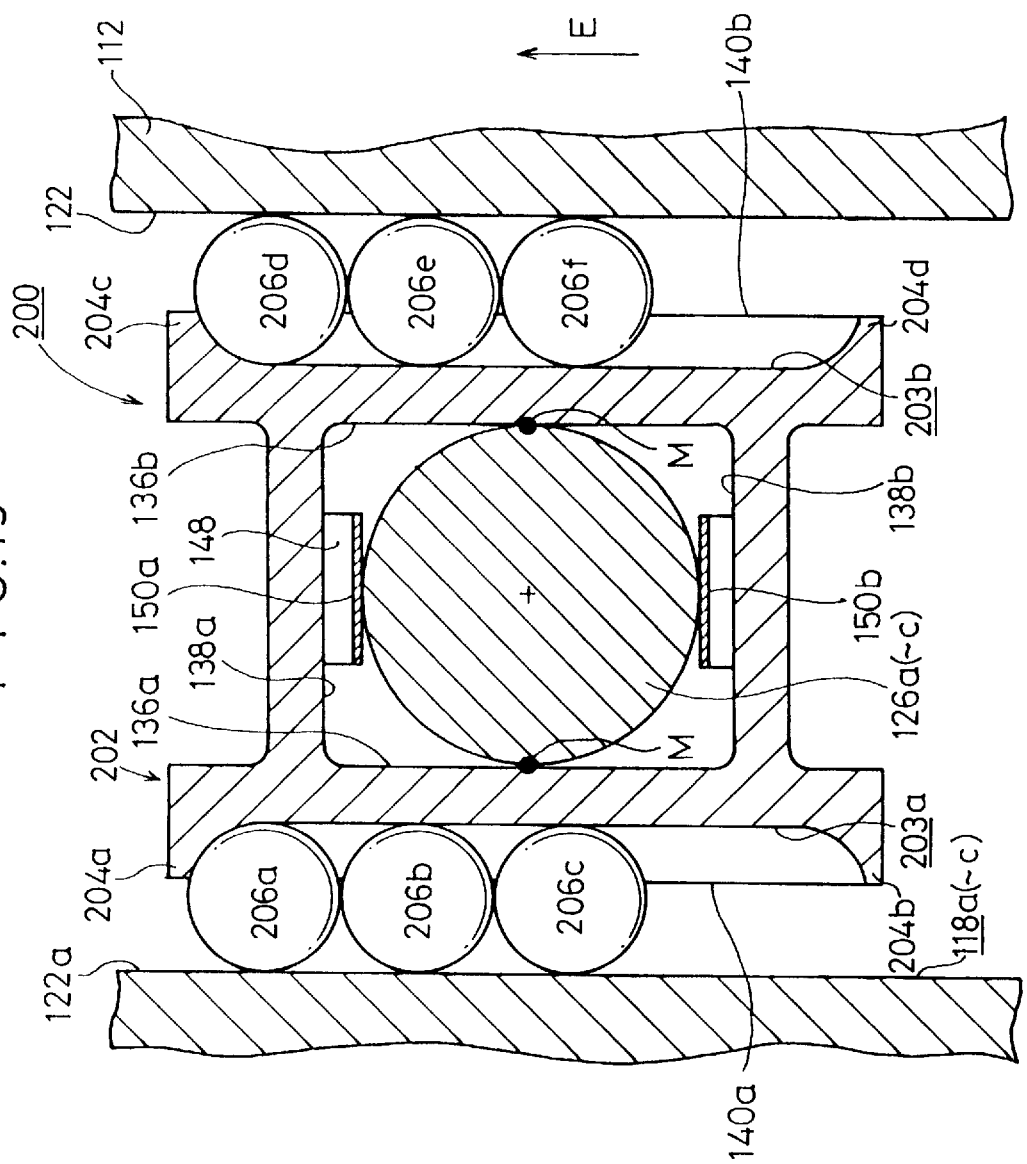
FIG. 19 shows a partial magnified sectional view illustrating a constant velocity universal joint according to a fifth embodiment of the present invention.

Next, a constant velocity universal joint 300 according to a fifth embodiment is shown in FIG. 19.

Grooves 203a, 203b are formed on outer wall sections 140a, 140b of a holder 202 of the constant velocity universal joint 300 respectively. A plurality of ball members 206a to 206f are engaged with the grooves 203a, 203b respectively. Stoppers 204a to 204d are formed at both ends of the wall sections which constitute the grooves 203a, 203b. Accordingly, the displacement of the ball members 206 to 206f is restricted by the stoppers 204a to 204d, and hence the ball members 206a to 206f are not disengaged from the grooves 203a, 203b. The number of the ball members 206a to 206c (206d to 206f) which are provided for one groove 203a (203b) is not limited to three. The ball members may be provided as a plurality of individuals of two or more.

Explanation will be made with reference to FIG. 19, for example, for a case in which the number of ball members 296a to 206f provided in the grooves 203a, 203b is set to be six (three are provided on one side in parallel). In the constant velocity universal joint 300, when the force in the circumferential direction of the outer cup 112 is applied to the trunnion 126a to 126c, the trunnion 126a to 126c presses points M on the abutting surfaces 136a, 136b of the holder 202.

During this process, when the ball members 206a to 206f are displaced toward the ends of the grooves 203a, 203b, for example, in the direction indicated by an arrow E, and the ball members 206a, 206d abut against one stoppers 204a, 204c, then the centers of the ball members 206c, 206f are located on the sides of the other stoppers 204b, 204d with respect to the points M.

Therefore, even when the pressing force of the trunnion 126a to 126c acts on the holder 202, the holder 202 is supported in a well balanced manner by the aid of the six ball members 206a to 206f. As a result, with reference to FIG. 19, the unillustrated axis of the holder 202 and the side curved sections 122a, 122b are held to be always substantially parallel to one another.

For example, concerning the arrangement shown in FIG. 19, even when the holder 202 is supported by using four ball members 206a, 206b, 206d, 206e in total two of which are disposed on one side, and the load is applied to the holder 202 from the inside of the holder 202, then the angular moment (not shown), which is applied to the holder 202 by the reaction force of the ball member 206b (206a) disposed on one side of the holder 202, is counteracted by the reaction force (not shown) on the ball member 206d (206e) disposed on the other side of the holder 202. Accordingly, the holder 202 is not inclined.

In the second to fifth embodiments described above, explanation has been made by using the tripod type constant velocity universal joints 100, 160, 180, 200 each of which is provided with the three trunnions 126a to 126c. However, the present invention is not limited thereto. It is a matter of course that the present invention is also applicable, for example, to a bipod type constant velocity universal joint 100a which is provided with two trunnions 126a, 126b as shown in FIG. 22.

Figure 23:
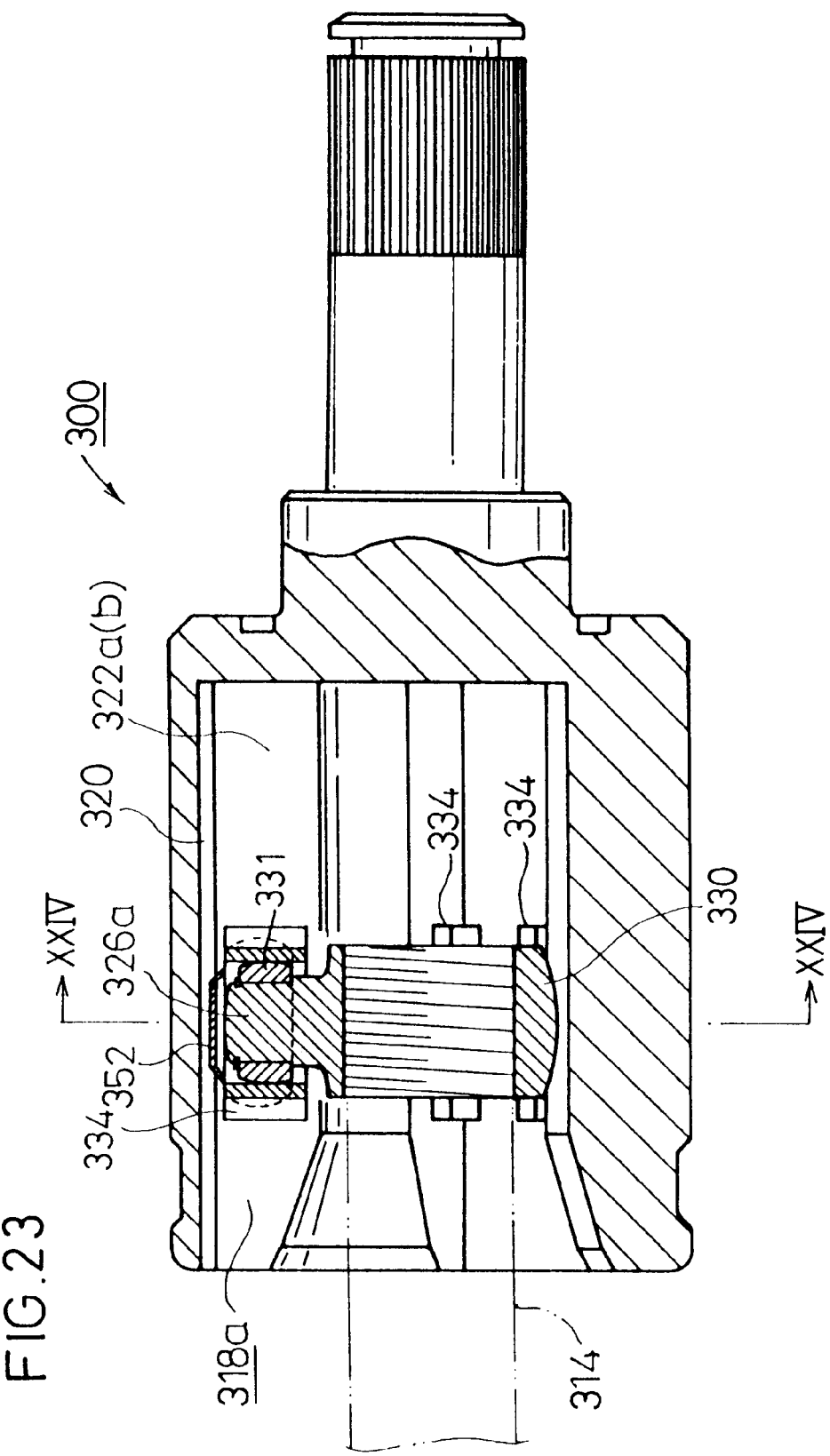
FIG. 23 shows a longitudinal sectional view taken along an axial direction of a constant velocity universal joint according to a sixth embodiment of the present invention.

Next, a constant velocity universal joint according to a sixth embodiment of the present invention is shown in FIG. 23.

The constant velocity universal joint 300 comprises a cylindrical outer cup (outer member) 312 having an opening and integrally coupled to one end of an unillustrated first shaft, and an inner member 316 fixedly secured to one end of a second shaft 314 and accommodated in a hole of the outer cup 312.

Figure 24:
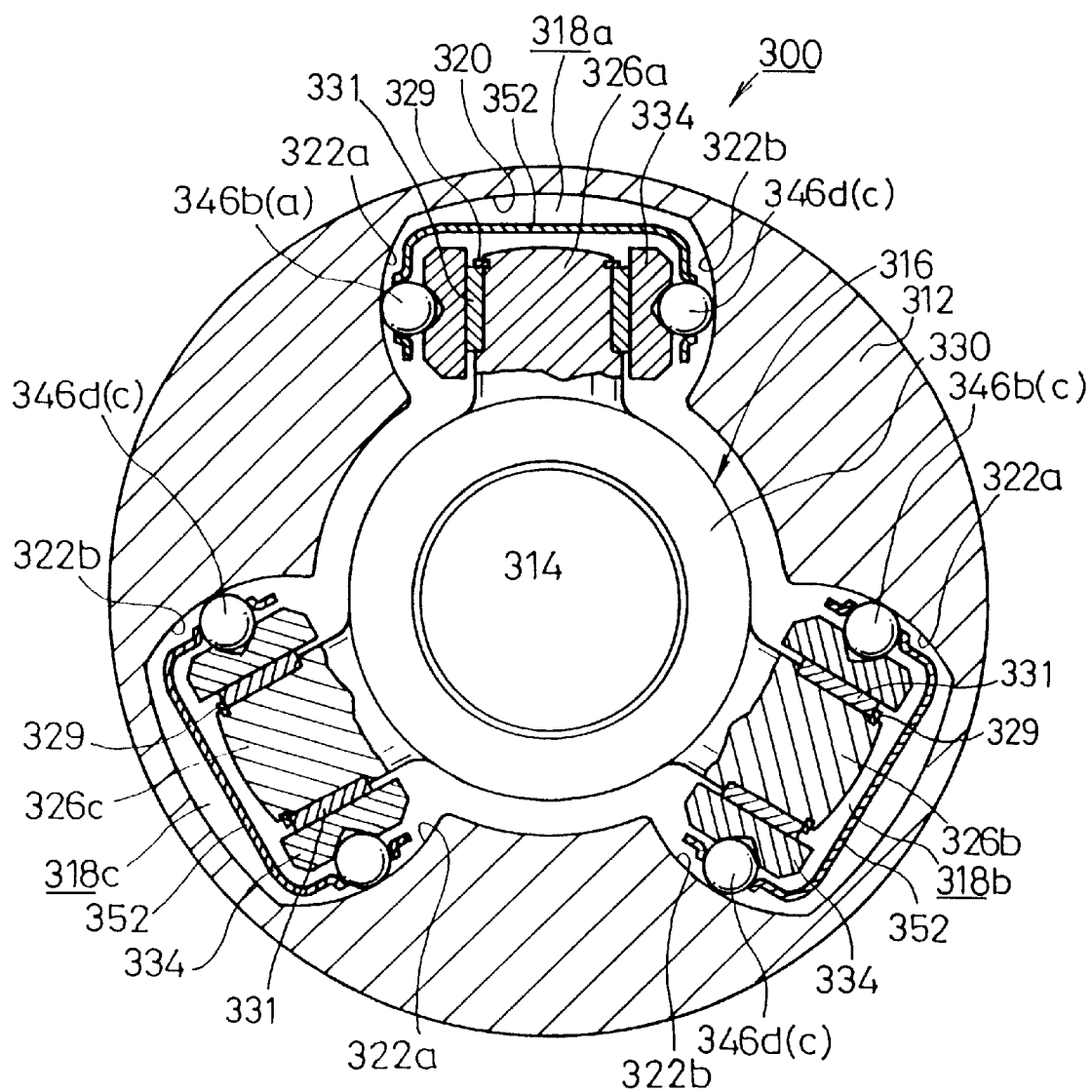
FIG. 24 shows a sectional view taken along a line XXIV—XXIV shown in FIG. 23.

Three guide grooves 318a to 318c, which extend in the axial direction and which are spaced apart from each other by 120 degrees about the center of the axis respectively, are formed on an inner circumferential surface of the outer cup 312. As shown in FIG. 24, the guide groove 318a to 318c is composed of a ceiling section 320 which is curved along the outer circumference of the outer cup 312, and side curved sections 322a, 322b which are formed mutually opposingly on both sides of the ceiling section 320 and which are centered about a point O (see FIG. 25) in each of the guide grooves 318a to 318c.

As shown in FIG. 24, a spider 330 is integrally formed on the second shaft 314. Three trunnions 326a to 326c, which extend toward the guide grooves 318a to 318c respectively and which are spaced apart from each other by 120 degrees about the center of the axis of the second shaft 314, are formed to protrude on the outer circumferential surface of the spider 330. An annular step section 327 is formed on the outer circumference of each of the trunnions 326a to 326c formed to have a column-shaped configuration. The axis of each of the trunnions 326a to 326c is directed while being radially deviated by 120 degrees with each other with respect to the axis of the outer cup 312 which constitutes the constant velocity universal joint 300.

Figure 25:
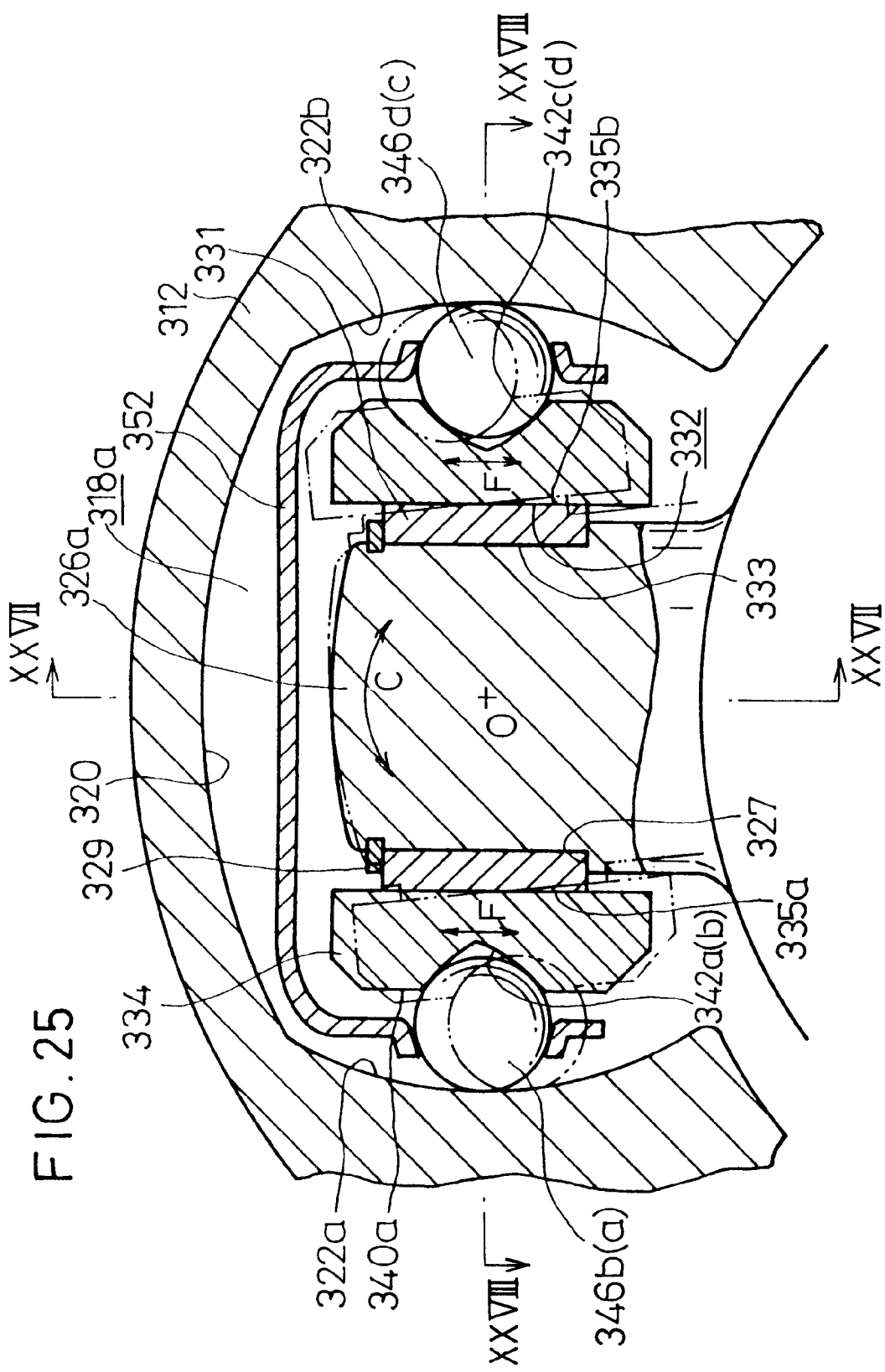
FIG. 25 shows a partial magnified view illustrating the constant velocity universal joint shown in FIG. 24.
Figure 26:
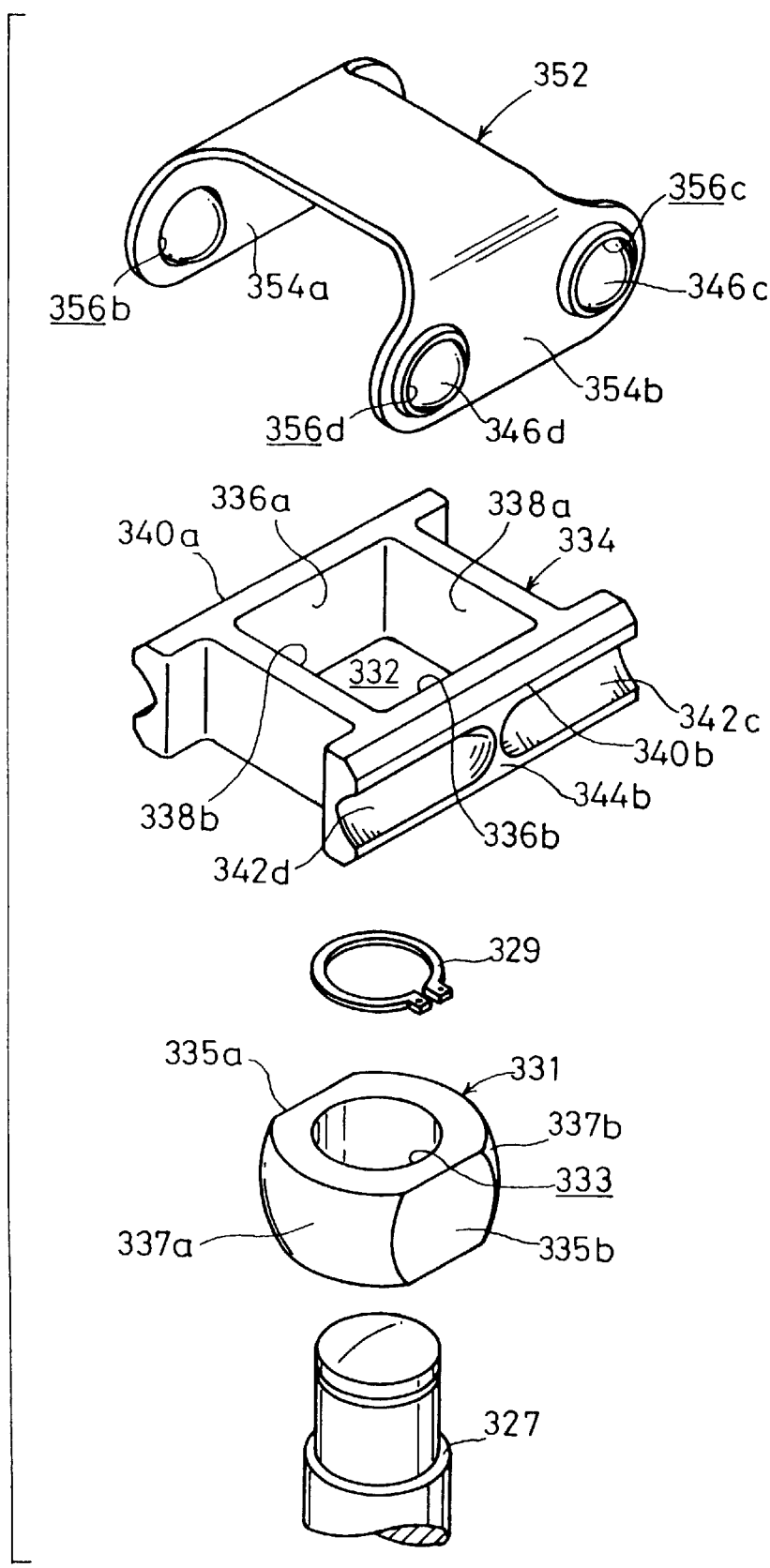
FIG. 26 shows a partial magnified exploded perspective view illustrating the constant velocity universal joint shown in FIG. 24.

As shown in FIGS. 25 and 26, a ring-shaped slipper member (gliding member) 331, which is fastened by the aid of a clip member 329, is externally fitted to the outer circumference of the trunnion 326a to 326c. A through-hole 333, which has a diameter corresponding to the diameter of the trunnion 326a to 326c, is formed at a central portion of the slipper member 331. A pair of flat surface sections 335a, 335b and a pair of spherical surface sections 337a, 337b are formed mutually opposingly on the outer circumference of the slipper member 331.

Figure 31C:
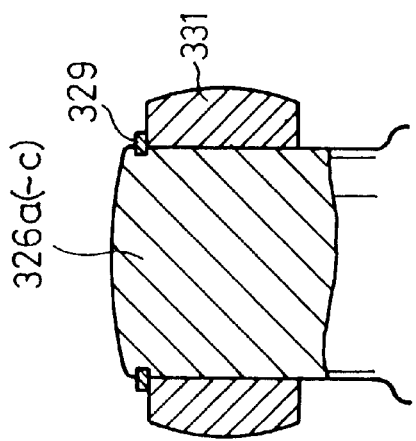
FIGS. 31A to 31C illustrate methods for fastening the slipper member for constructing the constant velocity universal joint shown in FIG. 23.
Figure 31B:
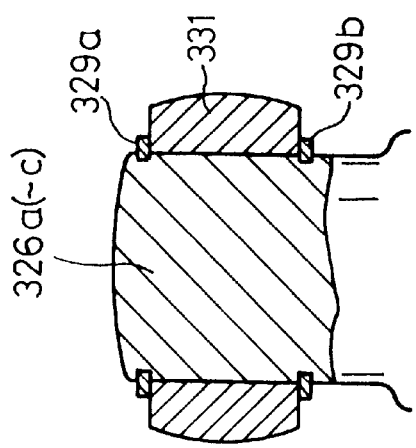
Figure 31A:
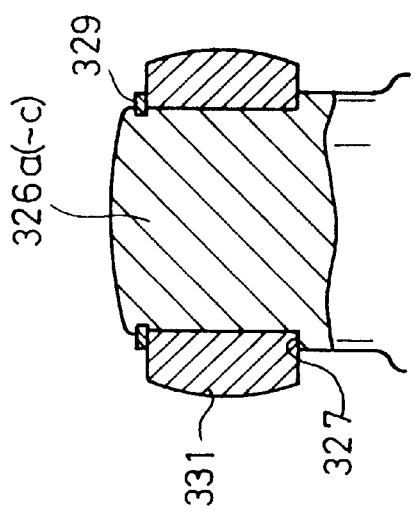

As shown in FIG. 31A, the slipper member 331 may be provided such that it is held by the clip member 329 for fastening the upper and the annular step 327 for fastening the lower end to make integrated displacement together with the trunnion 326 (326a, 326c). Alternatively, as shown in FIG. 31B, the slipper member 331 may be held by a pair of clip members 329a, 329b provided at upper and lower ends respectively to make integrated displacement together with the trunnion 326 (326a, 326c). Further alternatively, as shown in FIG. 31C, the clip member 329 may be provided only at the upper end, and the slipper member 331 may be slidable on the lower end side along the axis of the trunnion 326a (326b, 326c).

As shown in FIGS. 25 and 26, a holder 334 having a configuration comprising two pairs of parallel planes crossing perpendicularly with each other so that a substantially rectangular parallel-piped open hollow space (a hole 332) is defined therein is externally fitted to the outer circumference of the slipper member 331. The hole 332 is formed to be parallel to the axial direction of the outer cup 312, and it is provided with a pair of abutting surfaces 336a, 336b for allowing a pair of flat surface sections 335a 335b of the slipper member 331 to slide thereon in a state of surface-to-surface contact therewith respectively, and a pair of wall surfaces 338a, 338b for making point-to-point contact with the pair of spherical surface sections 337a, 337b of the slipper member 331 respectively.

The holder 334 has a pair of outer wall sections 340a, 340b. Grooves 342a, 342b, which are parallel to the abutting surface 336a, 336b, are formed on one of the outer wall sections 340a. Grooves 342c, 342d, which are parallel to the abutting surface 336a, 336b, are formed on the other outer wall section 340b. Each of the grooves 342a to 342d is formed to have a V-shaped cross section. However, the groove surface thereof is formed to be slightly curved in order to reduce the surface pressure on ball members as described later on (see FIG. 25). The sectional configuration of the groove 342a to 342d is not limited to the V-shaped configuration. The groove 342a to 342d may be formed to have an elliptic configuration or a composite curve constructed by a plurality of curves having different radii of curvature.

Stoppers 344a, 344b for making separation between the grooves 342a and 342b and between the grooves 342c and 342d are formed at approximately central portions of the outer wall sections 340a, 340b. Ball members (rolling members) 346a, 346b are interposed between the grooves 342a, 342b and one of the side curved sections 322a. Ball members (rolling members) 346c, 346d are interposed rollably between the grooves 342c, 342d and the other side curved section 322b.

The ball member 346a to 346d is supported at two points on the curved wall section of the groove 342a to 342d formed on the holder 334. The ball member 346a to 346d is provided rollably along the longitudinal direction of the groove 342a to 342d of the holder 334, and the displacement range thereof is restricted by the stopper 344a, 344b.

As shown in FIG. 26, a retainer (holding member) 352, which is formed of a material such as a metal plate having resilience, is provided between the holder 334 and the ceiling section 320. Side sections 354a, 354b of the retainer 352 are bent to be inserted between the outer wall sections 340a, 340b of the holder 334 and the side curved sections 322a, 322b (see FIGS. 24 and 25).

Two holes 356a, 356b are formed through one of the side sections 354a of the retainer 352. Holes 356c, 356d are formed through the other side section 354b. The ball members 346a to 346d are fitted to the respective holes 356a to 356d. In this embodiment, the spacing distance between the holes 356a and 356b is selected so that when one of the balls 346b abuts against the stopper 344a, the other ball 346a is not disengaged from the groove 342b. The spacing distance between the holes 356c and 356d is set in the same manner as described above.

The ball members 346a to 346d are pressed toward the grooves 342a to 342d by means of the resilience of the retainer 352. Accordingly, when the constant velocity universal joint 300 is assembled, the ball members 346a to 346d are always held in a state of engagement with the grooves 342a to 342d, and hence the ball members 346a to 346d are not disengaged from the grooves 342a to 342d. Therefore, the constant velocity universal joint 300 can be easily assembled as a whole.

The constant velocity universal joint 300 according to the sixth embodiment of the present invention is basically constructed as described above. Next, its operation will be explained.

When the unillustrated first shaft is rotated, its rotary power is transmitted from any one of the side curved sections 322a, 322b of the outer cup 312 depending on the direction of rotation through the ball members 346a, 346b or 346c, 346d and the holder 334 to the trunnions 326a to 326c. Thus, the spider 330 is rotated, and consequently the second shaft 314 having its one end fitted to the spider 330 is rotated (see FIG. 23).

In this embodiment, when the second shaft 314 is inclined by a predetermined angle with respect to the axial direction of the outer cup 312 having the unillustrated first shaft, the trunnions 326a to 326c are tilted in accordance with the tilting movement of the second shaft 314.

For example, as shown by two-dot chain lines in FIG. 25, when the trunnion 326a to 326c is tilted by a predetermined angle about the center of a point O, the holder 334, which makes surface-to-surface contact with the flat surface sections 335a, 335b of the slipper member 331 externally fitted to the trunnion 326a to 326c, is tilted by a predetermined angle.

In this process, the holder 334 and the trunnion 326a to 326c make relative sliding displacement in the axial direction (direction indicated by an arrow F) by the aid of the flat surface sections 335a, 335b. Simultaneously, the ball members 346a to 346d roll on the side curved sections 322a, 322b. Thus, the trunnion 326a to 326c and the holder 334 are tilted integrally by a predetermined angle in the direction indicated by an arrow C. The holder 334 is provided so that it makes follow-up movement always at an identical angle with respect to the trunnion 326a to 326c during this process (see two-dot chain lines in FIG. 25).

Figure 32A:
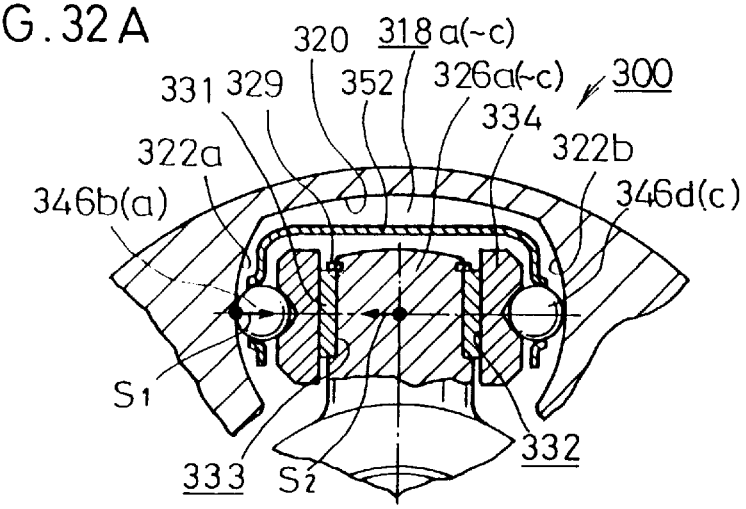
FIGS. 32A to 32C illustrate the operation depicting the state in which the holder makes follow-up displacement with respect to the trunnion in the constant velocity universal joint shown in FIG. 23 respectively.
Figure 32B:
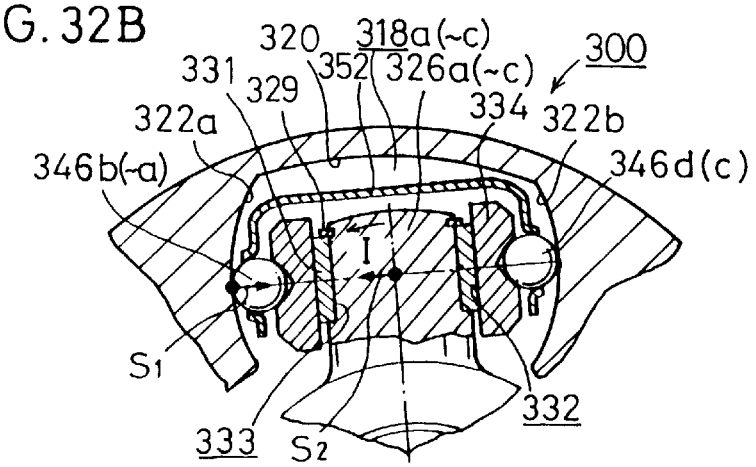
Figure 32C:
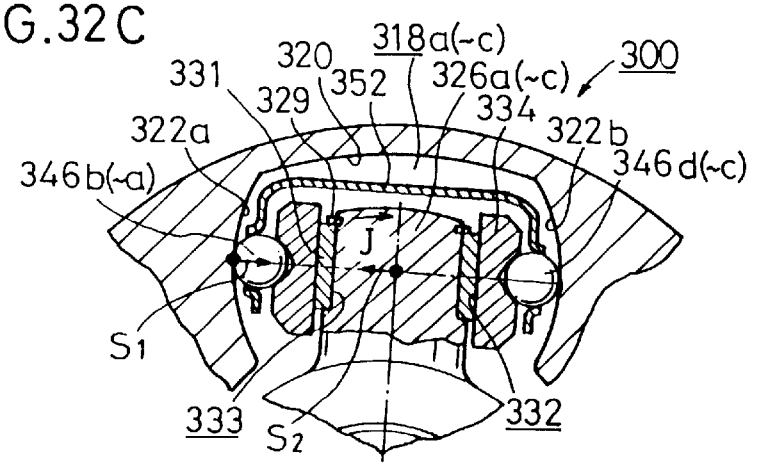

That is, as shown in FIGS. 32A to 32C, the holder 334, which is inserted into the trunnion 326a to 326c through the slipper member 331, is provided to make integrated displacement in the direction indicated by an arrow I or in the direction indicated by an arrow J while following the displacement of the trunnion 326a to 326c under the rolling action of the ball members 346a to 346d which are provided rollably between the holder 334 and the side curved section 322a, 322b of the guide groove 318a to 318c. As shown in FIGS. 32B and 32C, when the force is transmitted through the ball members 346a to 346d, the holder 334, the slipper member 331, and the trunnion 326a to 326c, the acting vectors $S_1$, $S_2$ of the force are always on an identical line, even if the trunnion 326a to 326c, the slipper member 331, and the holder 334 are inclined integrally with respect to the outer cup 312. Moreover, the spacing distance (clearance) between the centers of the ball members 346a to 346d and the center of the axis of the trunnion 326a to 326c is set to be always constant.

As described above, in the sixth embodiment, the acting vectors $S_1$, $S_2$ of the force acting in the direction from the ball members 346a to 346d to the trunnion 326a to 326c (or in the direction from the trunnion 326a to 326c to the ball members 346a to 346d) are always on the identical line, and the spacing distance (clearance) between the centers of the ball members 346a to 346d and the center of the axis of the trunnion 326a to 326c is set to be always constant. Thus, an effect is obtained in that no looseness resulting from backlash is generated on the no-load side, and the force is smoothly transmitted.

Figure 33A:
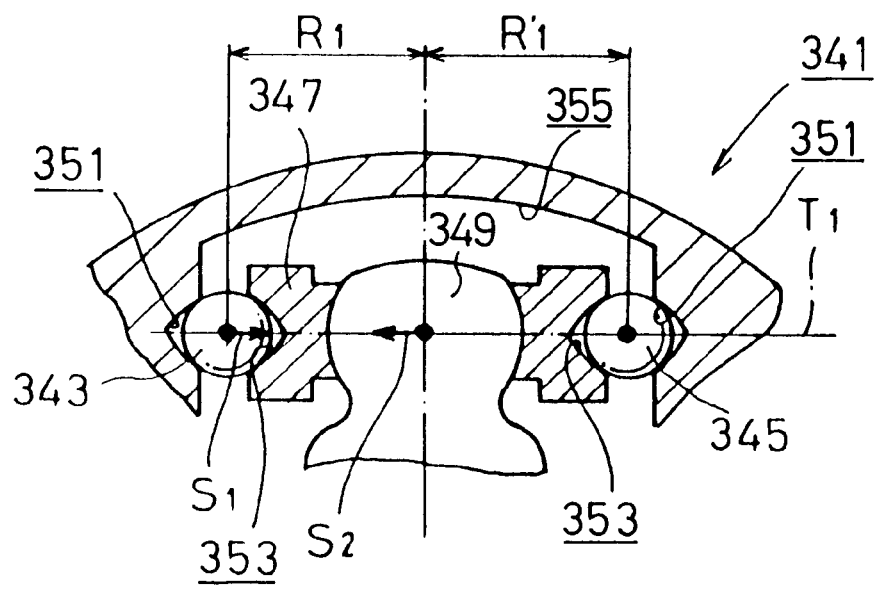
FIGS. 33A and 33B illustrate the operation based on the use of Comparative Example of a constant velocity universal joint respectively.
Figure 33B:
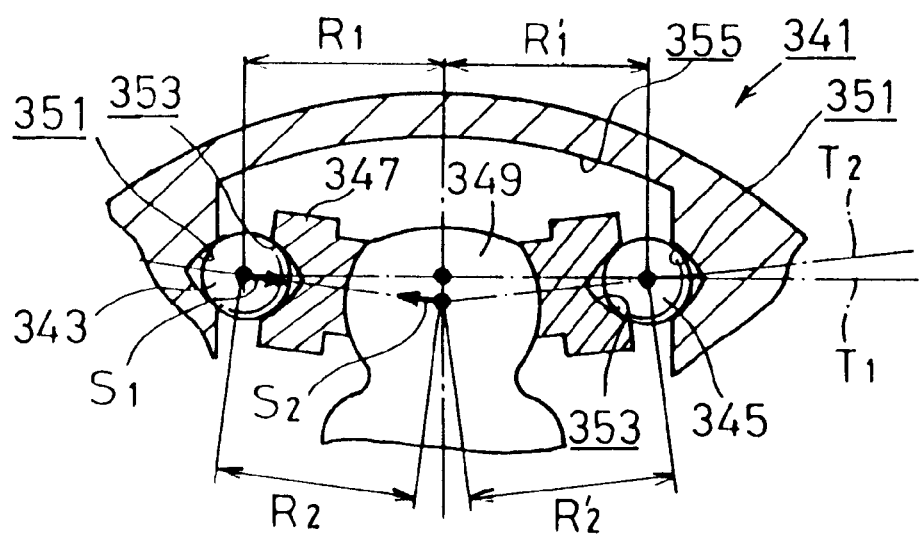

On the contrary, In the case of a constant velocity universal joint 341 concerning Comparative Example as shown in FIGS. 33A and 33B, when the force is transmitted through ball members 343 (the ball members 343 are disposed on the load side, while ball members disposed on the no-load side are designated by reference numeral 345), a holder 347, and a trunnion 349, the acting vectors $S_1$, $S_2$ of the force exist on a line $T_1$ in a state shown in FIG. 33A, while the acting vectors $S_1$, $S_2$ of the force exist on a line $T_2$ in a state shown in FIG. 33B.

Therefore, when the trunnion 349 is displaced from the state shown in FIG. 33A to the state shown in FIG. 33B, the acting vectors $S_1$, $S_2$ of the force are on the different lines $T_1$, $T_2$ respectively. Moreover, in the state shown in FIG. 33B, the clearance is generated between the ball members 345 on the no-load side and the guide groove 355 and the grooves 351, 353 formed on the holder 347 respectively. As a result, in FIG. 33B, a relationship of $R_1+R_1' < R_2+R_2'$ is given. An inconvenience arises in that looseness is generated on the no-load side resulting from the clearance between the ball members 345 and the grooves 351, 353. Incidentally, FIG. 33B shows the state in which the trunnion 349 is displaced downwardly by a predetermined amount from the state shown in FIG. 33A.

Therefore, the constant velocity universal joint 341 concerning Comparative Example shown in FIGS. 33A and 33B involves the problem that looseness occurs resulting from backlash when the force is transmitted from the ball members 343 (345) to the trunnion 349 (or from the trunnion 349 to the ball members 343, 345).

With reference to FIG. 25, the one ball member 346b (346a) and the other ball member 346d (346c), which are arranged separately on the right and left sides with respect to the trunnion 326a to 326c interposed therebetween, are prevented from simultaneous and horizontal rolling displacement in the lower direction in FIG. 25, because the side curved sections 322a, 322b are formed to be circular arc-shaped inwardly.

Figure 27:
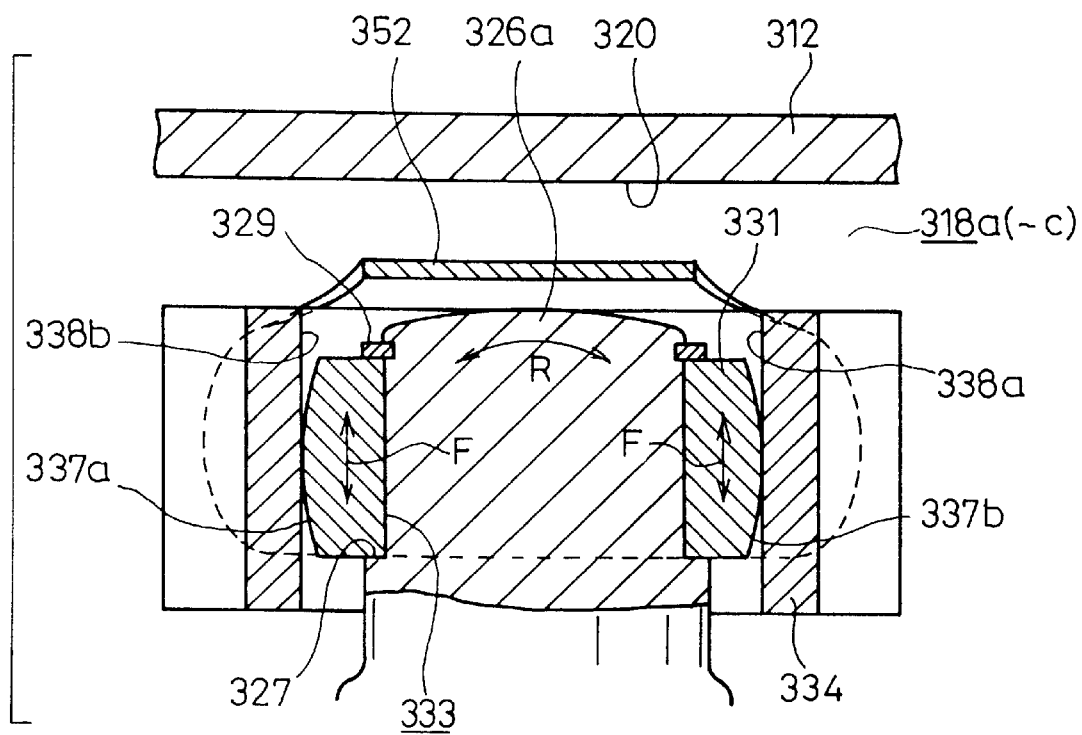
FIG. 27 shows a sectional view taken along a line XXVII—XXVII shown in FIG. 25.

With reference to FIG. 27, when the trunnion 326a to 326c is tilted by a predetermined angle in the axial direction of the outer cup 312, the spherical surface sections 337a, 337b of the slipper member 331 externally fitted to the trunnion 326a to 326c are in the state of point-to-point contact with the wall surfaces 338a, 338b of the hole 332 of the holder 334. Accordingly, the trunnion 326a to 326c is tilted in the direction indicated by an arrow R relatively with respect to the holder 334, and the trunnion 326a to 326c slides in the direction indicated by an arrow F relatively with respect to the holder 334.

As shown in FIG. 28, when the trunnion 326a to 326c is rotated about the center of its axis (point O in FIG. 28), the trunnion 326a to 326c and the holder 334 make relative sliding displacement in the direction indicated by an arrow D by using the sliding surfaces of the outer circumferential surface of the trunnion 326a to 326c formed to have the circular cross section and the inner wall surfaces of the through-hole of the holder 334. Therefore, no unreasonable force is applied to the trunnion 326a to 326c, and the trunnion 326a to 326c is smoothly rotated.

As described above, the trunnions 326a to 326c are provided tiltably with respect to the outer cup 312. Thus, the clearance between the constitutive components is not increased even when the operating angle between the first shaft and the second shaft 314 is increased. Therefore, it is possible to avoid the occurrence of the vibration in the direction of rotation and the beat sound resulting from backlash.

When the trunnion 326a to 326c is tilted, if the trunnion 326a to 326c is displaced along the guide groove 318a to 318c, the ball members 346a to 346d roll along the both surfaces of the groove 342a to 342d of the holder 334 and the side curved section 322a, 322b of the guide groove 318a to 318c while being held by the holes 356a to 356d of the retainer 352. Accordingly, the induced thrust force exerted on the trunnion 326a to 326c includes only the rolling resistance of the ball members 346a to 346d. Thus, the trunnion 326a to 326c can make tilting movement and displacement with less resistance.

In this process, as shown in FIG. 28, the ball members 346b, 346d abut against the stoppers 344a, 344b, and their displacement range is restricted thereby. Each of the ball members 346a to 346d is engaged with the hole 356a to 356d of the retainer 352, and the relative position of each of them is determined. In this arrangement, even when the ball members 346a to 346d are displaced toward one of the sides of the grooves 342a to 342d (for example, in the direction indicated by an arrow D), the force, which is exerted by the trunnion 326a to 326c on the abutting surface 336a, 336b of the holder 334 when the trunnion 326a to 326c is tilted in the circumferential direction of the constant velocity universal joint 300, is always located between the ball members 346a and 346b and between the ball members 346c and 346d. Therefore, the holder 334 is supported by the ball members 346a to 346d in a well balanced manner.

During this process, the ball members 346a, 346c slightly protrude from the end of the holder 334. However, the ball members 346a, 346c are prevented from disengagement from the grooves 342a, 342c, because the ball members 346a, 346c are held by the retainer 352. Therefore, even when the length of the holder 334 is relatively short, the holder 334 is allowed to have a long displacement range with respect to the outer cup 312.

Next, a constant velocity universal joint 380 according to a seventh embodiment of the present invention Is shown in FIG. 29. In the following description, the same constitutive components as those described in the sixth embodiment are designated by the same reference numerals, detailed explanation of which will be omitted. The function and the effect in the sixth embodiment are similar to those in the seventh embodiment. Therefore, only different function and effect will be explained below, and detailed explanation thereof will be omitted.

The constant velocity universal joint 380 is different from the constant velocity universal joint 300 according to the sixth embodiment in that no retainer is used, and a plurality of ball members 346a to 346d are rollably held by side curved sections 322a, 322b which constitute the guide groove 318a to 318c and grooves 383a to 383d of a holder 382.

That is, the grooves 383a, 383b are formed on one outer wall section 340a of the holder 382, and the grooves 383c, 383d are formed on the other outer wall section 340b. Both end portions and central portions of the outer wall sections 340a, 340b are formed as stoppers 384a to 384f. Therefore, the grooves 383a and 383b and the grooves 383c and 383d are separated by the stoppers 384b, 384e respectively. One ball member 346a to 346d is provided for each of the grooves 383a to 383d.

As clearly understood from FIG. 29, when the force in the circumferential direction of the outer cup 312 (direction indicated by arrows P, Q in FIG. 29) is applied to the trunnion 326a to 326c, the force, which is exerted by the trunnion 326a to 326c on the abutting surface 336a, 336b of the holder 382, is always located between the ball members 346a and 346b and between the ball members 346c and 346d. Therefore, the holder 382 is supported by the ball members 346a to 346d in a well balanced manner. As a result, with reference to FIG. 29, the holder 382 is held so that its unillustrated axis is always substantially parallel to the side curved sections 322a, 322b, and the holder 382 is prevented from inclination in the direction of the arrow P or the arrow Q, which would be otherwise caused on the basis of, for example, the clearance around the ball members 346a to 346d or the deformation of the holder 382.

Next, a constant velocity universal joint 400 according to an eighth embodiment will be explained with reference to FIG. 30. The joint shown in FIG. 30 is the same as the joint shown in FIG. 29 in that no retainer is used, and a plurality of ball members are rollably held by the side curved sections which constitute the guide groove and the grooves of the holder.

Grooves 403a, 403b are formed on outer wall sections 340a, 340b of the holder 402 of the constant velocity universal joint 400 respectively. Three ball members 406a to 406f are engaged with the grooves 403a, 403b respectively. Stoppers 404a to 404d are formed at both ends of the wall sections which constitute the grooves 403a, 403b. Accordingly, the displacement of the ball members 406 to 406f is restricted by the stoppers 404a to 404d, and hence the ball members 406a to 406f are not disengaged from the grooves 403a, 403b. The number of the ball members 406a to 406c (406d to 406f) which are provided for one groove 403a (403b) is not limited to three. The ball members may be provided as a plurality of individuals of two or more.

Explanation will now be made with reference to FIG. 30, for example, for a case in which the number of ball members 496a to 406f provided in the grooves 403a, 403b is set to be six (three are provided on one side in parallel). In the constant velocity universal joint 400, when the force in the circumferential direction of the outer cup 312 is applied to the trunnion 326a to 326c, the trunnion 326a to 326c presses points M on the abutting surfaces 336a, 336b of the holder 402.

However, when the ball members 406a to 406f are displaced toward the ends of the grooves 403a, 403b, for example, in the direction indicated by an arrow E, and the ball members 406a, 406d abut against one stoppers 404a, 404c, then the centers of the ball members 406c, 406f are located on the sides of the other stoppers 404b, 404d with respect to the points M.

Therefore, even when the pressing force of the trunnion 326a to 326c acts on the holder 402, the holder 402 is supported in a well balanced manner by the aid of the six ball members 406a to 406f. As a result, with reference to FIG. 30, the unillustrated axis of the holder 402 and the side curved sections 322a, 322b are held to be always substantially parallel to one another.

For example, concerning the arrangement shown in FIG. 30, even when the holder 402 is supported by using four ball members 406a, 406b, 406d, 406e in total two of which are disposed on one side, and the load is applied to the holder 402 from the inside of the holder 402, then the angular moment (not shown), which is applied to the holder 402 by the reaction force of the ball member 406b (406a) disposed on one side of the holder 402, is counteracted by the reaction force (not shown) on the ball member 406d (406e) disposed on the other side of the holder 402. Accordingly, the holder 402 is not inclined.

In the embodiments shown in FIGS. 29 and 30, it is unnecessary to use the retainer for holding the ball members 346a to 346d, 406a to 406f. Accordingly, the number of parts is reduced, and it is possible to achieve further reduction of production cost.

In the embodiments described above, explanation has been made by using the tripod type constant velocity universal joints 300, 380, 400 each of which is provided with the three trunnions 326a to 326c. However, the present invention is not limited thereto. It is a matter of course that the present invention is also applicable, for example, to a bipod type constant velocity universal joint 300a which is provided with two trunnions 326a, 326b as shown in FIG. 34.

Next, a constant velocity universal joint 500 according to a ninth embodiment of the present invention is shown in FIG. 35.

The constant velocity universal joint 500 comprises a cylindrical outer cup (outer member) 512 having an opening and integrally coupled to one end of an unillustrated first shaft, and an inner member 516 fixedly secured to one end of a second shaft 514 and accommodated In a hole of the outer cup 512.

Figure 37:
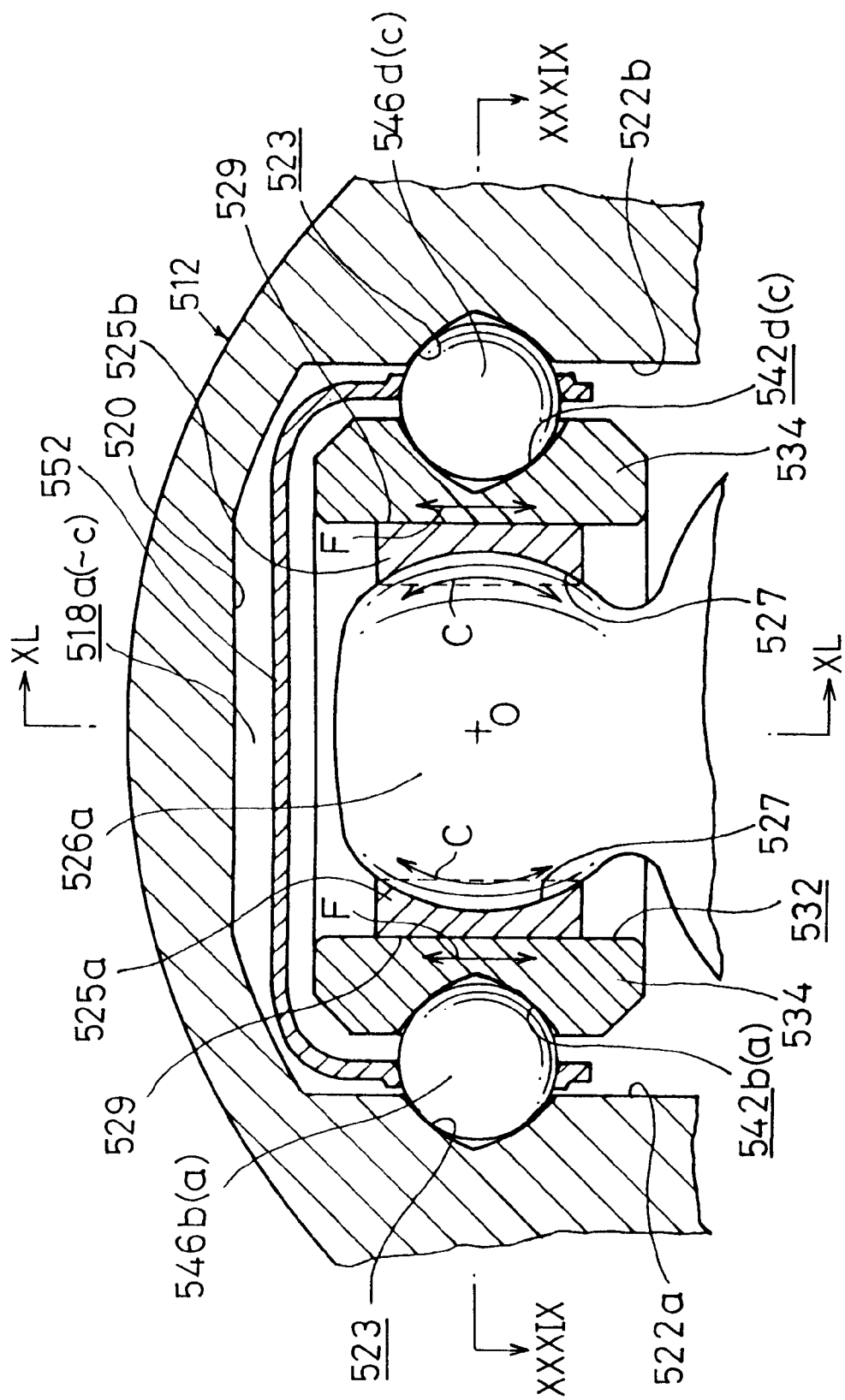
FIG. 37 shows a partial magnified view illustrating the constant velocity universal joint shown in FIG. 36.

Three guide grooves 518a to 518c, which extend in the axial direction and which are spaced apart from each other by 120° about the center of the axis respectively, are formed on an inner circumferential surface of the outer cup 512. As shown in FIG. 37, the guide groove 518a to 518c is composed of a ceiling section 520 which is formed to have a flat surface configuration, and side surface sections 522a, 522b which are formed perpendicularly and mutually opposingly on both sides of the ceiling section 520. The configurations of the ceiling section 520 and the side surface sections 522a, 522b are not limited to the flat configurations as shown in FIG. 37. They may be curved surfaces having predetermined radii of curvature (not shown).

Grooves 523, which extend substantially in parallel to the axis of the guide grooves 518a to 518c and which are formed to have a V-shaped cross section, are formed on the side surface sections 522a, 522b respectively. In this embodiment, the sectional configuration of the groove 523 is not limited to the V-shaped configuration. The groove 523 may be formed to have an elliptic configuration or a composite curve constructed by a plurality of curves having different radii of curvature.

Figure 36:
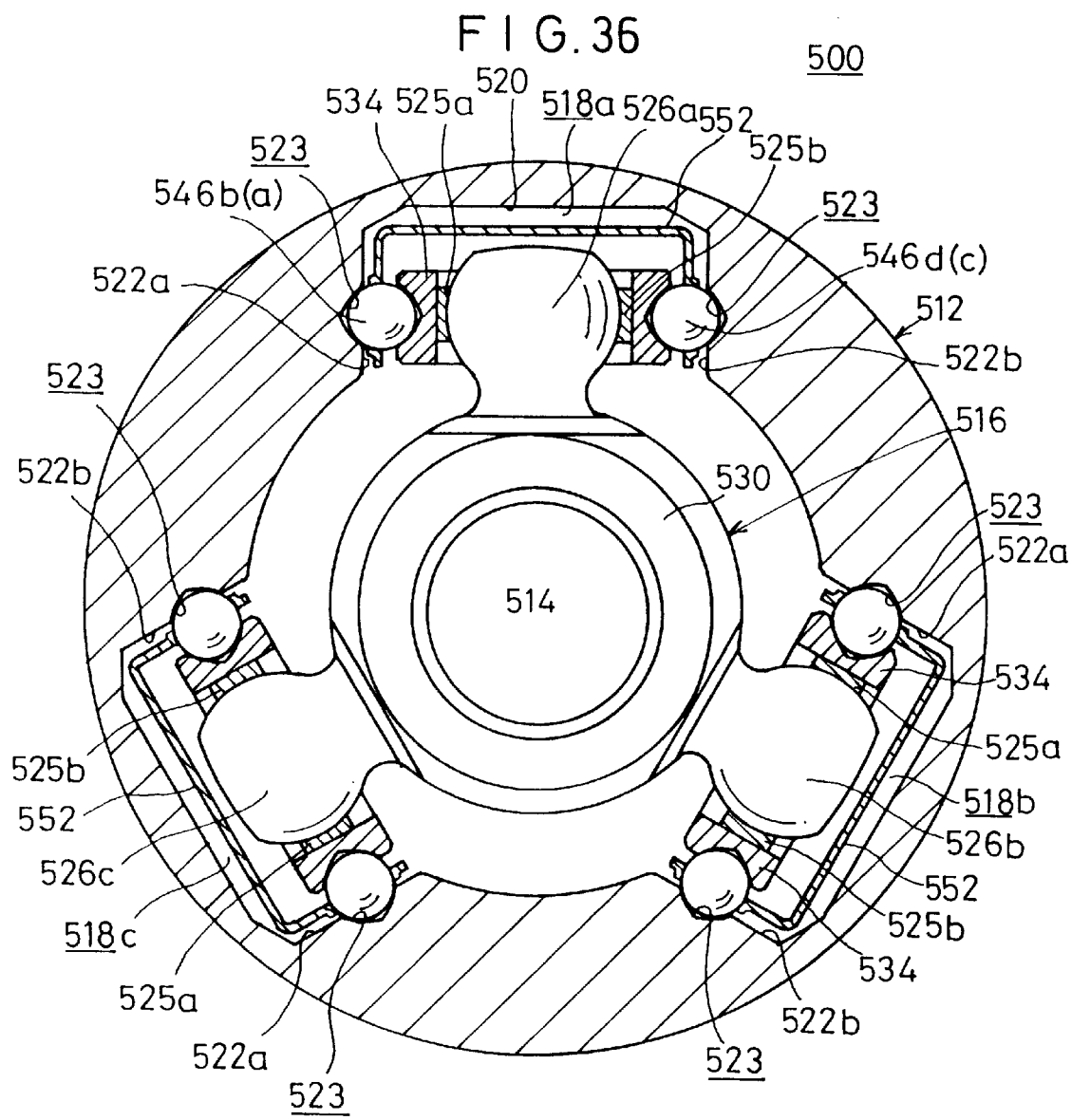
FIG. 36 shows a sectional view taken along a line XXXVI—XXXVI shown in FIG. 35.

As shown in FIG. 36, a spider 530 is integrally formed on the second shaft 514. Three trunnions 526a to 526c, which extend toward the guide grooves 518a to 518c respectively and which are spaced apart from each other by 120° about the center of the axis of the second shaft 514, are formed to protrude on the outer circumferential surface of the spider 530. The axis of each of the trunnions 526a to 526c is directed while being radially deviated by 120° with each other with respect to the axis of the outer cup 512. The outer surface of each of the trunnions 526a to 526c, which faces with the side surface section 522a, 522b, is formed to be spherical.

As shown in FIGS. 37 and 38, a holder 534, which is integrally formed to have a configuration comprising two pairs of parallel planes crossing perpendicularly with each other so that a substantially rectangular parallel-piped open hollow space (a hole 532) is defined therein, is externally fitted to the trunnion 526a to 526c via a pair of slipper members (gliding members) 525a, 525b which are formed separately and which have an identical configuration. The pair of slipper members 525a, 525b are not limited to have the identical configuration. They may be formed to have different configurations respectively.

The holder 534 is provided with the hole 532 which has a rectangular cross section (see FIG. 38). The hole 532 is constructed by a pair of mutually opposing abutting surfaces 536a, 536b and a pair of inner wall surfaces 583a, 538b. In this embodiment, the pair of slipper members 525a, 525b are formed to make surface-to-surface contact with the spherical surface of the trunnion 526a to 526c and the hole 532 of the holder respectively. Thus, the pair of slipper members 525a, 525b.are always held between the trunnion 526a to 526c and the holder 534.

That is, one side surface of the slipper member 525a, 525b is composed of a recess 527 having its wall surface which is formed to have a spherical configuration corresponding to the spherical surface of the trunnion 526a to 526c. The other side surface, which makes surface-to-surface contact with the abutting surface 536a, 536b of the holder 534, is formed to be a flat surface 529 corresponding to the abutting surface 536a, 536c. Preferably, the pair of slipper members 525a, 525b are formed of a material made of metal or resin.

Figure 41A:
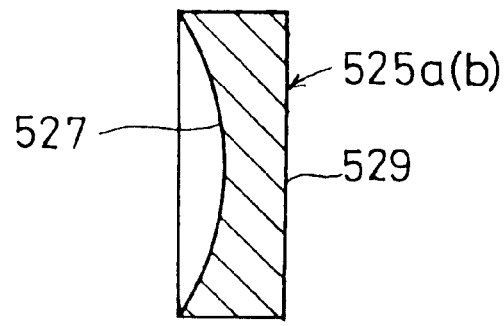
FIGS. 41A to 41C show longitudinal sectional views illustrating modified embodiments of the slipper member for constructing the constant velocity universal joint shown in FIG. 35.
Figure 41B:
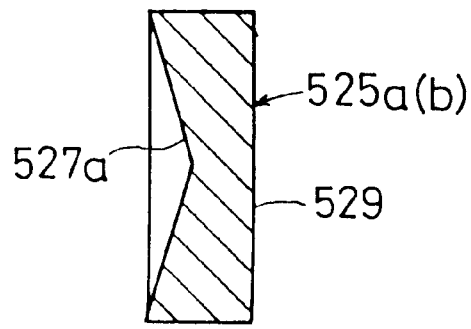
Figure 41C:
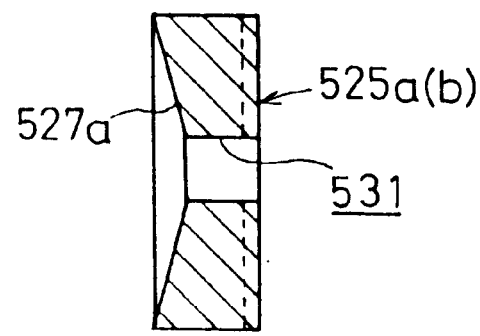

The shape of the recess 527 of each of the pair of slipper member 525a, 525b contacting with the trunnion 526a to 526c is not limited to the spherical surface formed to have a circular arc-shaped cross section (see FIG. 41A). It is allowable to form a recess 527a having a substantially v-shaped cross section to make line-to-line contact with the trunnion 526a to 526c (see FIG. 41B). Alternatively, a hole 531, which penetrates through the center of the recess 527a having the substantially v-shaped cross section as described above, may be formed (see FIG. 41C). The provision of the hole 531 is advantageous in that the concentration of stress is avoided, lubricating oil can be easily poured and applied to the sliding surface of the trunnion 526a to 526c and the slipper member 525a, 525b, and the lubricating performance is improved.

The holder 534 has outer wall sections 540a, 540b which are parallel to the abutting surfaces 536a, 536b. Grooves 542a, 543b, which extend in parallel to the axial direction of the constant velocity universal joint 500, are formed on one of the outer wall sections 540a. Grooves 542c, 542d are formed on the other outer wall section 540b. The sectional configuration of the grooves 542a to 542d is not limited to the V-shaped configuration. The grooves 542a to 542d may be formed to have a sectional configuration similar to those of the grooves 523 as described above. Approximately central portions of the outer wall sections 540a, 540b are formed as stoppers 544a, 544b for separating the grooves 542a and 542b and the grooves 542c and 542d.

As shown in FIG. 37, a plurality of ball members (rolling members) 546a to 546d are rollably interposed between the grooves 542a to 542d and the grooves 523. The ball members 546a to 546d are rollable along the longitudinal direction of the grooves 542a to 542d of the holder 534, and their displacement range is restricted by the stoppers 544a, 544b.

A retainer (holding member) 552, which is formed of a material such as a metal plate having resilience, is provided between the holder 534 and the ceiling section 520. Side sections 554a, 554b of the retainer 552 are bent to be inserted between the outer wall sections 540a, 540b of the holder 534 and the side surface sections 522a, 522b (see FIGS. 36 and 37).

Two holes 556a, 556b are formed through one of the side sections 554a of the retainer 552. Holes 556c, 556d are formed through the other side section 554b. The ball members 546a to 546d are fitted to the respective holes 556a to 556d. In this embodiment, the spacing distance between the holes 556a and 556b is selected so that when the one ball member 546b abuts against the stopper 544a, the other ball member 546a is not disengaged from the groove 542b. The spacing distance between the holes 556c and 556d is set in the same manner as described above.

The ball members 546a to 546d are pressed toward the grooves 542a to 542d by means of the resilience of the retainer 552. Accordingly, when the constant velocity universal joint 500 is assembled, the ball members 546a to 546d are always held in a state of engagement with the grooves 542a to 542d, and hence the ball members 546a to 546d are not disengaged from the grooves 542a to 542d. Therefore, the assembling operation for the constant velocity universal joint 500 is easy as a whole.

Figure 42A:
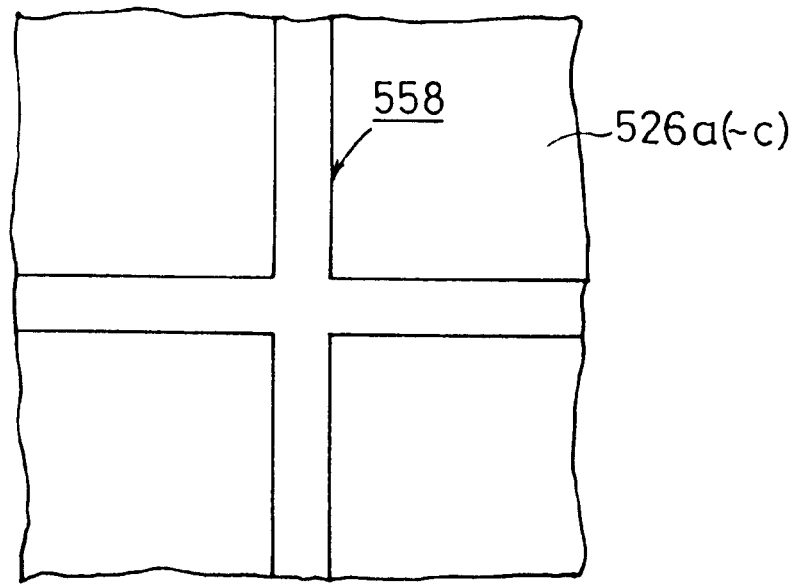
FIGS. 42A and 42B illustrate lubricating grooves formed on the trunnion for constructing the constant velocity universal joint shown in FIG. 35 respectively.
Figure 42B:
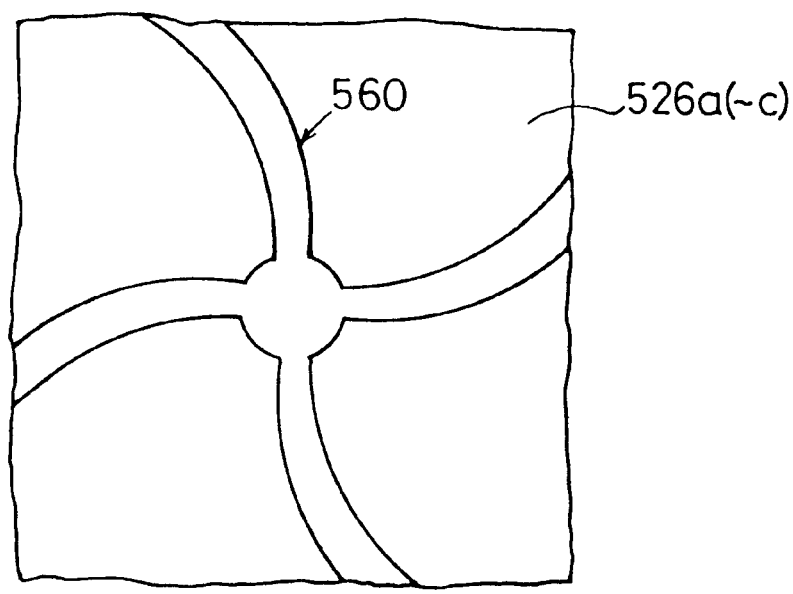

A plurality of lubricating grooves 558, which are arranged longitudinally and latitudinally, are formed to make intersection (see FIG. 42A), or a plurality of lubricating grooves 560, which extend outwardly in a curved configuration, are formed, for example, in four directions (see FIG. 42B) on outer surfaces of the trunnions 526a to 526c which make surface-to-surface contact with the pair of slipper members 525a, 525b. Thus, it is possible to further improve the lubricating performance at the sliding section between the trunnions 526a to 526c and the slipper members 525a, 525b.

In this embodiment, the location of the lubricating grooves 558, 560 is not limited to the outer surfaces of the trunnions 526a to 526c. The lubricating grooves 558, 560 may be formed on the recesses 27 of the slipper members 525a, 525b and the flat surfaces 29 respectively.

The constant velocity universal joint 500 according to the ninth embodiment of the present invention is basically constructed as described above. Next, its operation will be explained.

When the unillustrated first shaft is rotated, its rotary power is transmitted from any one of the side surface sections 522a, 522b of the outer cup 512 depending on the direction of rotation through the ball members 546a, 546b or 546c, 546d, the holder 534, and the slipper members 525a (525b) to the trunnions 526a to 526c. Thus, the spider 530 is rotated, and consequently the second shaft 514 having its one end fitted to the spider 530 is rotated (see FIG. 35).

In this embodiment, when the second shaft 514 is inclined by a predetermined angle with respect to the axial direction of the outer cup 512 having the unillustrated first shaft, the trunnions 526a to 526c are tilted in accordance with the tilting movement of the second shaft 514.

For example, with reference to FIG. 37, when the trunnion 526a to 256c is tilted by a predetermined angle about the center of a point O, the trunnion 526a to 526c formed to be spherical makes sliding displacement by a predetermined angle in the direction indicated by an arrow C along the spherical recesses 527 of the slipper members 525a, 525b while maintaining the state in which the spherical surface of the trunnion 526a to 526c makes surface-to-surface contact with the spherical recesses 527 of the slipper members 525a, 525b. Simultaneously, the trunnion 526a to 526c makes sliding displacement along the axial direction (direction indicated by an arrow F) of the trunnion 526a to 526c by using the sliding surfaces of the abutting surfaces 536a, 536b of the holder 534 which make surface-to-surface contact with the flat surfaces 529 of the pair of slipper members 525a, 525b.

Figure 39:
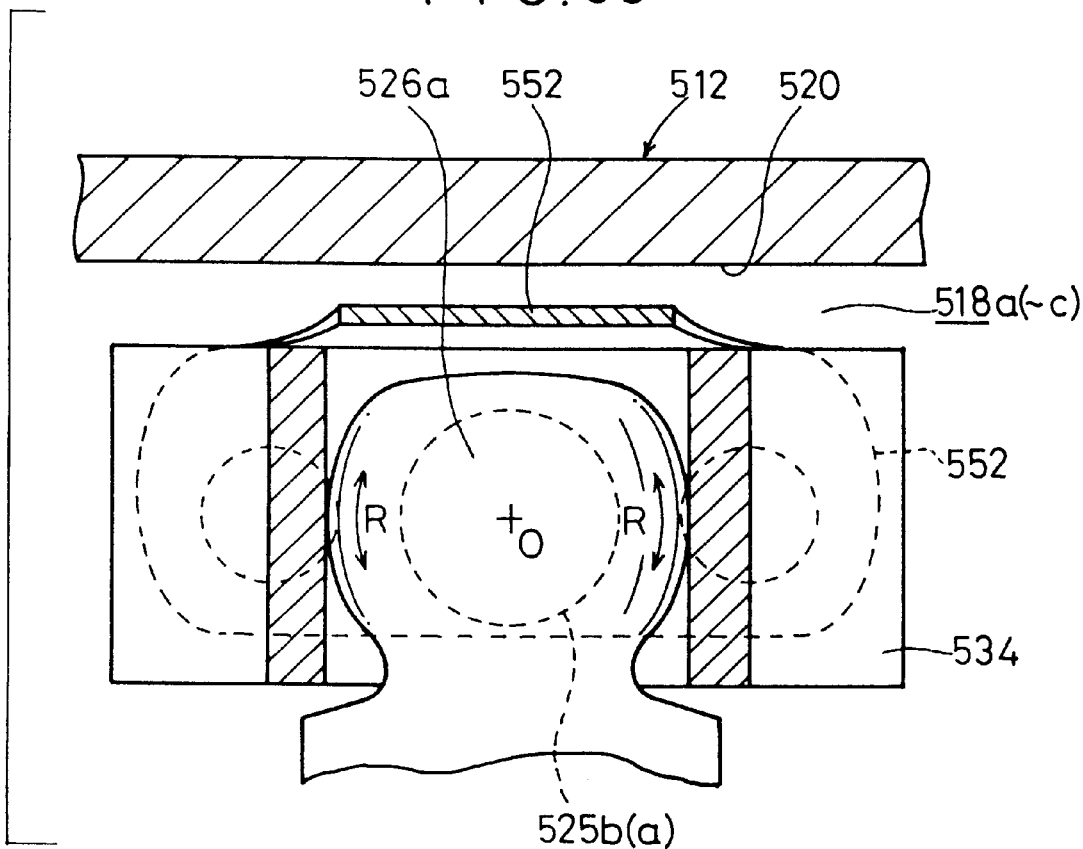
FIG. 39 shows a sectional view taken along a line XXXIX—XXXIX shown in FIG. 37.

With reference to FIG. 39, when the trunnion 526a to 526c is tilted by a predetermined angle in the axial direction of the outer cup 152, the spherical surface of the trunnion 526a to 526c is in the state of point-to-point contact with the inner wall surfaces 538a, 538b of the hole 532 of the holder 534. Accordingly, the trunnion 526a to 526c is tilted by a predetermined angle in the direction indicated by an arrow R about the center of a point O with respect to the holder 534.

Figure 40:
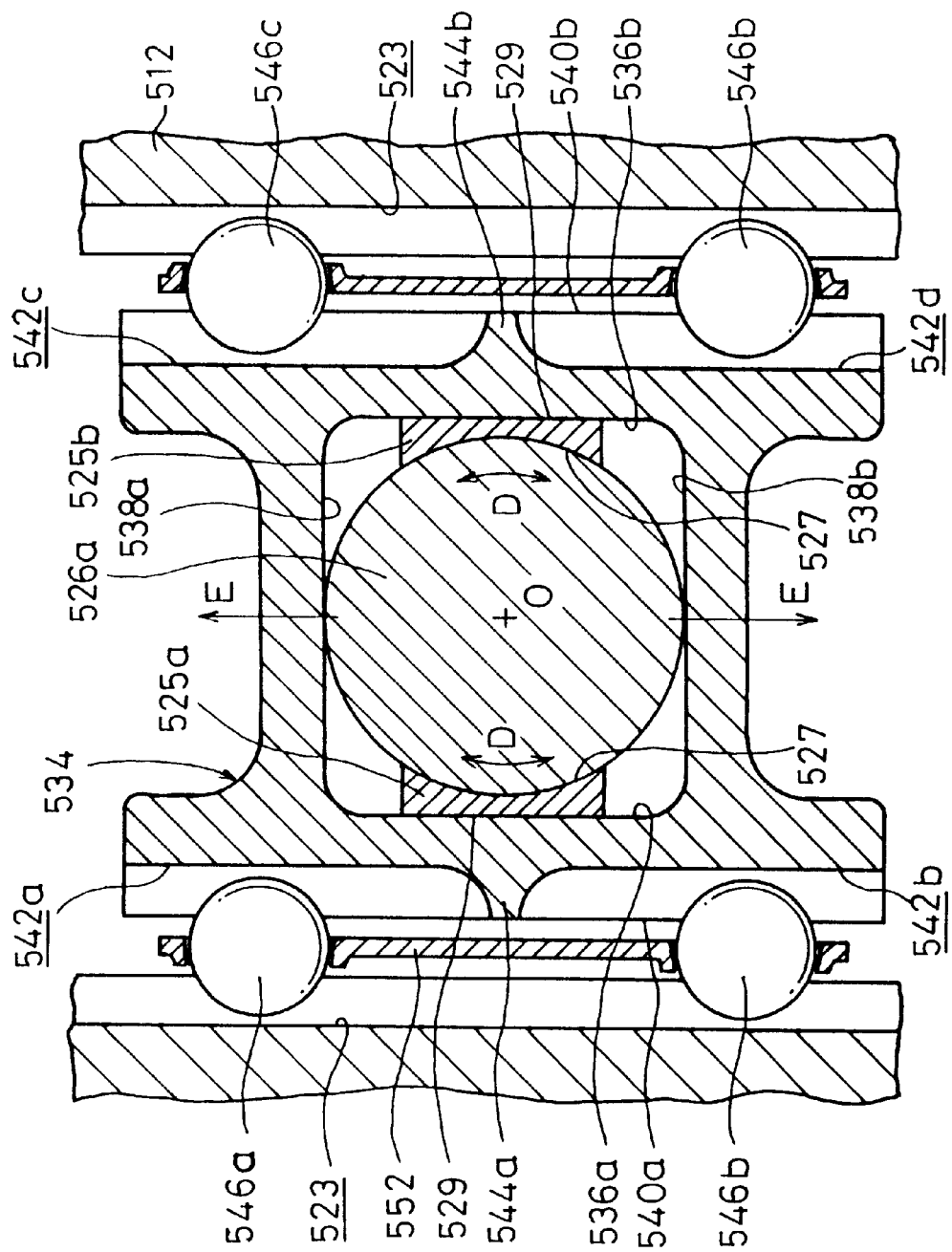
FIG. 40 shows a sectional view taken along a line XL—XL shown in FIG. 37.

As shown in FIG. 40, when the trunnion 526a to 526c is rotated by a predetermined angle about the center of its center of the axis (point O in FIG. 40), the trunnion 526a to 526c makes rotational displacement by a predetermined angle in the direction indicated by an arrow D about the center of the point O by using the sliding surfaces of the outer circumferential surface of the trunnion 526a to 526c formed to have the circular cross section, the inner wall surfaces 538a, 538b of the holder 534, and the spherical recesses 527 of the slipper members 525a, 525b. Therefore, no unreasonable force is applied to the trunnion 526a to 526c, and the trunnion 526a to 526c is smoothly rotated. As described above, the trunnion 526a to 526c is tiltable with respect to the outer cup 512.

The trunnion 526a to 526c is provided to be tiltable with respect to the outer cup 512 as described above. Thus, the clearance between the constitutive components is not increased even when the operating angle between the first shaft and the second shaft 514 is increased. Therefore, it is possible to avoid the occurrence of the vibration in the direction of rotation and the beat sound resulting from backlash.

When the trunnion 526a to 526c is tilted, if the trunnion 526a to 526c is displaced along the guide groove 518a to 518c, then the ball members 546a to 546d roll along the mutually opposing both surfaces of the groove 542a to 542d disposed on the side of the holder 534 and the grooves 523 disposed on the side of the outer cup 512 while being held by the holes 556a to 556d of the retainer 552. Accordingly, the induced thrust force exerted on the trunnion 526a to 526c includes only the rolling resistance of the ball members 546a to 546d. Thus, the trunnion 526a to 526c can make tilting movement and sliding displacement with less resistance.

In this process, as shown in FIG. 40, any one of the plurality of ball members 546b, 546d abuts against the stopper 544a, 544b, and its displacement range is restricted thereby. Each of the ball members 546a to 546d is engaged with the hole 556a to 556d of the retainer 552, and the relative position of each of them is determined.

In this arrangement, even when the ball members 546a to 546d are displaced toward one of the sides of the grooves 542a to 542d (for example, in the direction indicated by an arrow E), the force, which is exerted by the trunnion 526a to 526c on the abutting surface 536a, 536b of the holder 534, is always located between the ball members 546a and 546b and between the ball members 546c and 546d. Therefore, the holder 534 is supported by the ball members 546a to 546d in a well balanced manner.

During this process, the ball members 546a, 546c slightly protrude from the end of the holder 534. However, the ball members 546a, 546c are prevented from disengagement from the grooves 542a, 542c, because the ball members 546a, 546c are held by the retainer 552. Therefore, even when the length of the holder 534 is relatively short, the holder 534 is allowed to have a long displacement range with respect to the outer cup 512.

Next, a constant velocity universal joint 580 according to a tenth embodiment of the present invention is shown in FIG. 43. In the following description and drawings, the same constitutive components as those described in the ninth embodiment are designated by the same reference numerals, detailed explanation of which will be omitted. The function and the effect in the ninth embodiment are similar to those described in the tenth embodiment. Therefore, only different function and effect will be explained below, and detailed explanation thereof will be omitted.

The constant velocity universal joint 580 is different from the constant velocity universal joint 500 according to the ninth embodiment in that no retainer 552 is used, and a plurality of ball members 546a to 546d are rollably held by grooves 523 having a V-shaped cross section provided on the guide groove 518a to 518c and grooves 583a to 583d of a holder 582.

That is, the grooves 583a, 583b are formed on one outer wall section 540a of the holder 582, and the grooves 583c, 583d are formed on the other outer wall section 540b. Both end portions and central portions of the outer wall sections 540a, 540b are formed as stoppers 584a to 584f. Therefore, the grooves 583a and 583b and the grooves 583c and 583d are separated by the stoppers 584b, 584e respectively. One ball member 546a to 546d is provided rollably for each of the grooves 583a to 583d.

As clearly understood from FIG. 43, when the force in the circumferential direction of the outer cup 512 (direction indicated by arrows P, Q in FIG. 43) is applied to the trunnion 526a to 526c, the force, which is exerted by the trunnion 526a to 526c on the abutting surface 536a, 536b of the holder 582, is always located between the ball members 546a and 546b and between the ball members 546c and 546d. Therefore, the holder 582 is supported by the ball members 546a to 546d in a well balanced manner. As a result, with reference to FIG. 43, the holder 582 is held so that its unillustrated axis is always substantially parallel to the side surface sections 522a, 522b, and the holder 582 is prevented from inclination in the direction of the arrow P or the arrow Q, which would be otherwise caused on the basis of, for example, the clearance around the ball members 546a to 546d or the deformation of the holder 582.

Next, a constant velocity universal joint 600 according to an eleventh embodiment of the present invention will be explained with reference to FIG. 44. The eleventh embodiment is substantially the same as the embodiment shown in FIG. 43 in that no retainer 552 is used, and a plurality of ball members 546a to 546d are rollably held by the grooves 523 having the V-shaped cross section provided on the guide groove 518a to 518c and the grooves 603a to 603b of the holder 602.

Grooves 603a, 603b are formed on outer wall sections 540a, 540b of the holder 602 of the constant velocity universal joint 600 respectively. Three ball members (six ball members in total) 606a to 606f are engaged with the grooves 603a, 603b respectively. Stoppers 604a to 604d are formed at both ends of the wall sections which constitute the grooves 603a, 603b. Accordingly, the displacement of the ball members 606 to 606f is restricted by the stoppers 604a to 604d, and hence the ball members 606a to 606f are not disengaged from the grooves 603a, 603b. The number of the ball members 606a to 606c (606d to 606f) which are provided for the groove 603a (603b) disposed on one side is not limited to three. The ball members may be provided as a plurality of individuals of two or more.

Explanation will now be made with reference to FIG. 44, for example, for a case in which the number of ball members 696a to 606f provided in the grooves 603a, 603b is set to be six (three are provided on one side in parallel).

In the constant velocity universal joint 600, when the force in the circumferential direction of the outer cup 512 is applied to the trunnion 526a to 526c, the trunnion 526a to 526c presses points M on the abutting surfaces 536a, 536b of the holder 602.

However, when the ball members 606a to 606f are displaced toward the ends of the grooves 603a, 603b, for example, in the direction indicated by an arrow E, and the ball members 606a, 606d abut against one stoppers 604a, 604c, then the centers of the ball members 606c, 606f are located on the sides of the other stoppers 604b, 604d with respect to the points M.

Therefore, even when the pressing force of the trunnion 626a to 626c acts on the holder 602, the holder 602 is supported in a well balanced manner by the aid of the six ball members 606a to 606f. As a result, with reference to FIG. 44, the unillustrated axis of the holder 602 and the side surface sections 522a, 522b are held to be always substantially parallel to one another.

Figure 44:
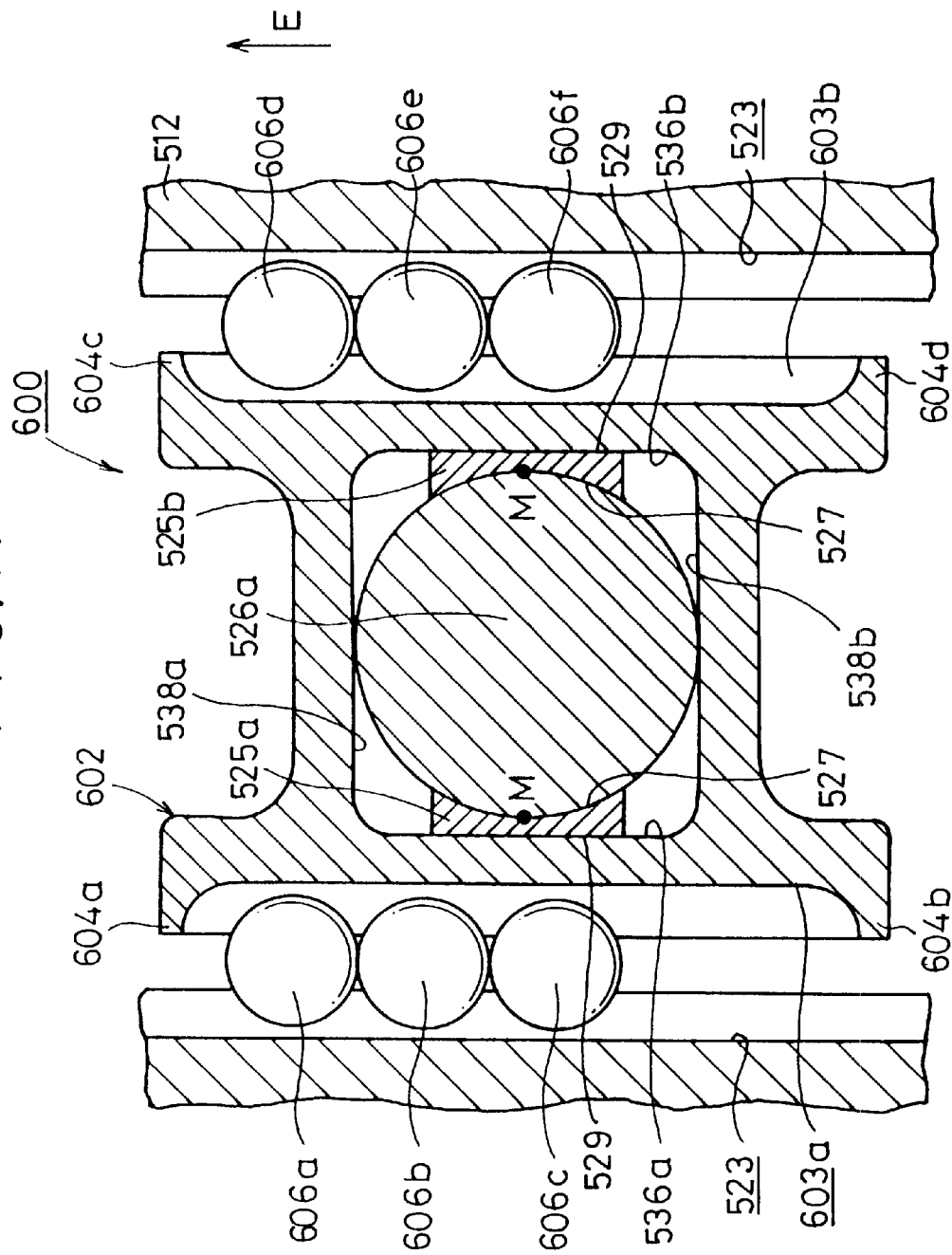
FIG. 44 shows a sectional view illustrating a constant velocity universal joint according to an eleventh embodiment of the present invention.

For example, concerning the arrangement shown in FIG. 44, even when the holder 602 is supported by using four ball members 606a to 606d in total two of which are disposed on one side, and the load is applied to the holder 602 from the inside of the holder 602, then the angular moment (not shown), which is applied to the holder 602 by the reaction force of the ball member 606b (606a) disposed on one side of the holder 602, is counteracted by the reaction force (not shown) on the ball member 606d (606e) disposed on the other side of the holder 602. Accordingly, the holder 602 is not inclined.

In the alternative embodiments shown in FIGS. 43 and 44, it is unnecessary to use the retainer 552 for holding the ball members 546a to 546d, 606a to 606f. Accordingly, the number of parts is reduced, and it is possible to achieve further reduction of production cost.

Figure 45:
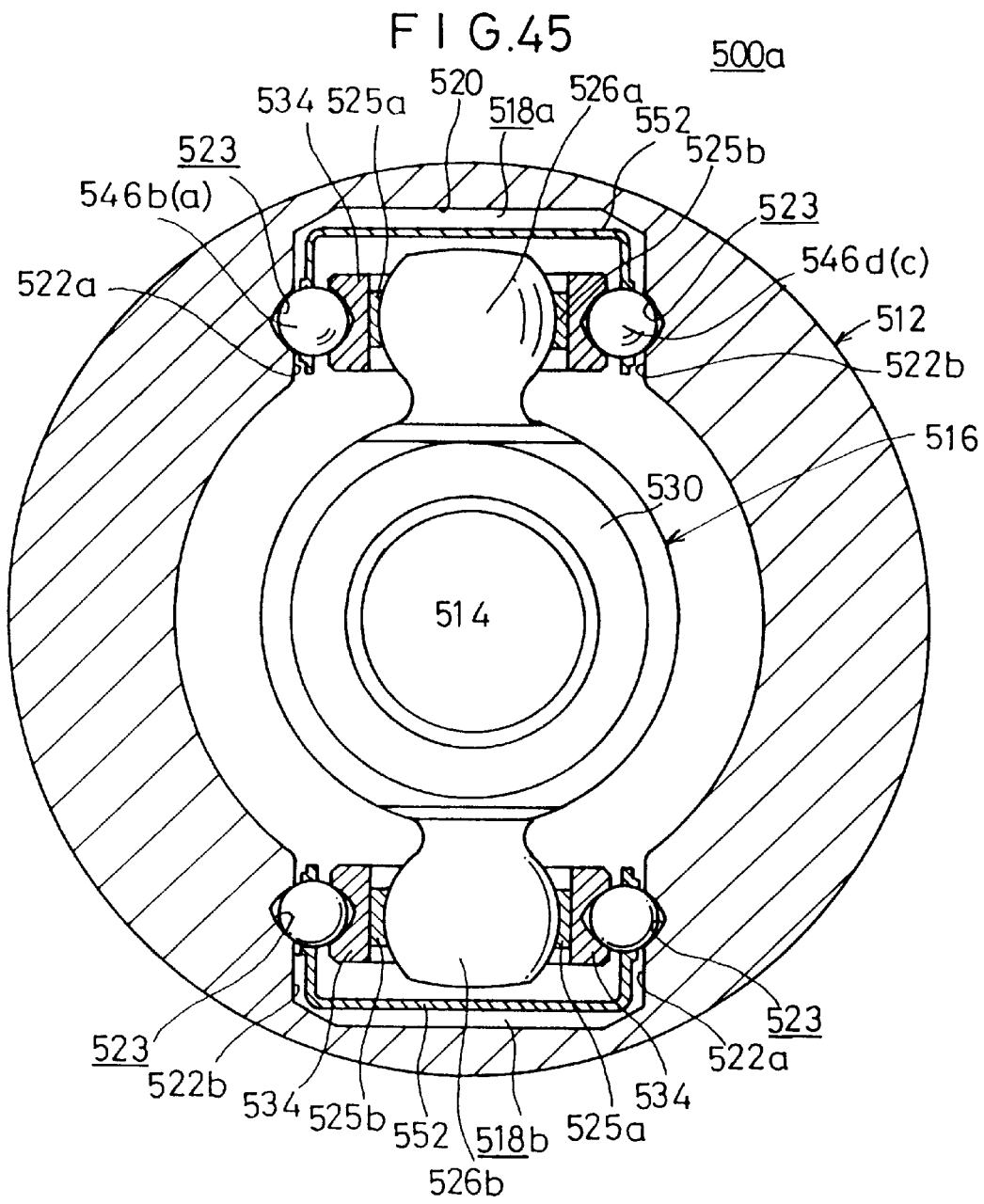
FIG. 45 shows a longitudinal sectional view illustrating application of the constant velocity universal joint shown in FIG. 36 to a bipod type.

In the embodiments described above, explanation has been made by using the tripod type constant velocity universal Joints 500, 580, 600 each of which is provided with the three trunnions 526a to 526c. However, the present invention is not limited thereto. It is a matter of course that the present invention is also applicable, for example, to a bipod type constant velocity universal joint 500a which is provided with two trunnions 526a, 526b as shown in FIG. 45.

Figure 46:
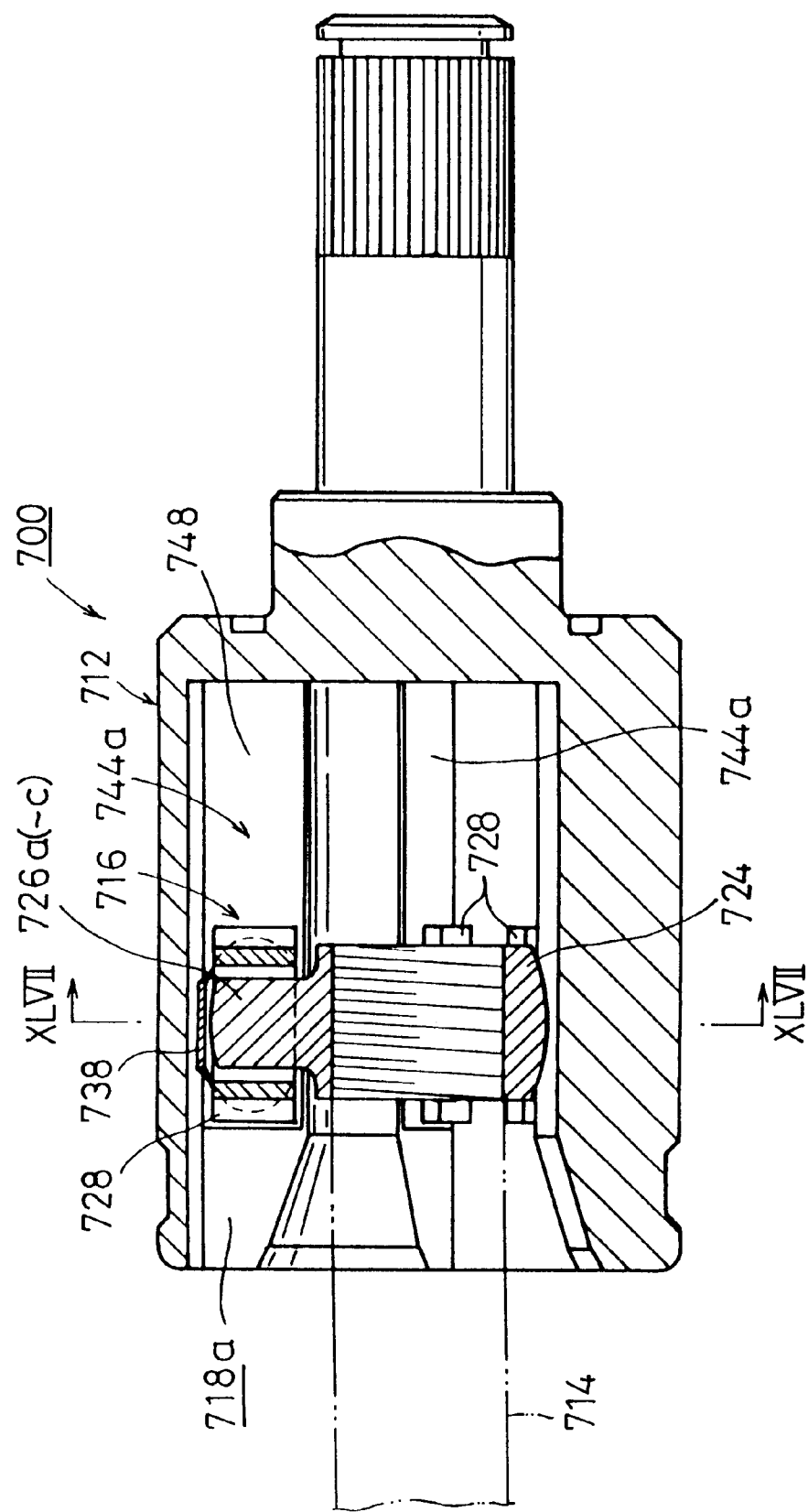
FIG. 46 shows a longitudinal sectional view illustrating a constant velocity universal joint according to a twelfth embodiment of the present invention.

Next, a constant velocity universal joint 700 according to a twelfth embodiment of the present invention is shown in FIG. 46.

The constant velocity universal joint 700 comprises a cylindrical outer cup (outer member) 712 having an opening and integrally coupled to one end of an unillustrated first shaft, and an inner member 716 fixedly secured to one end of a second shaft 714 and accommodated in a hole of the outer cup 712.

Figure 47:
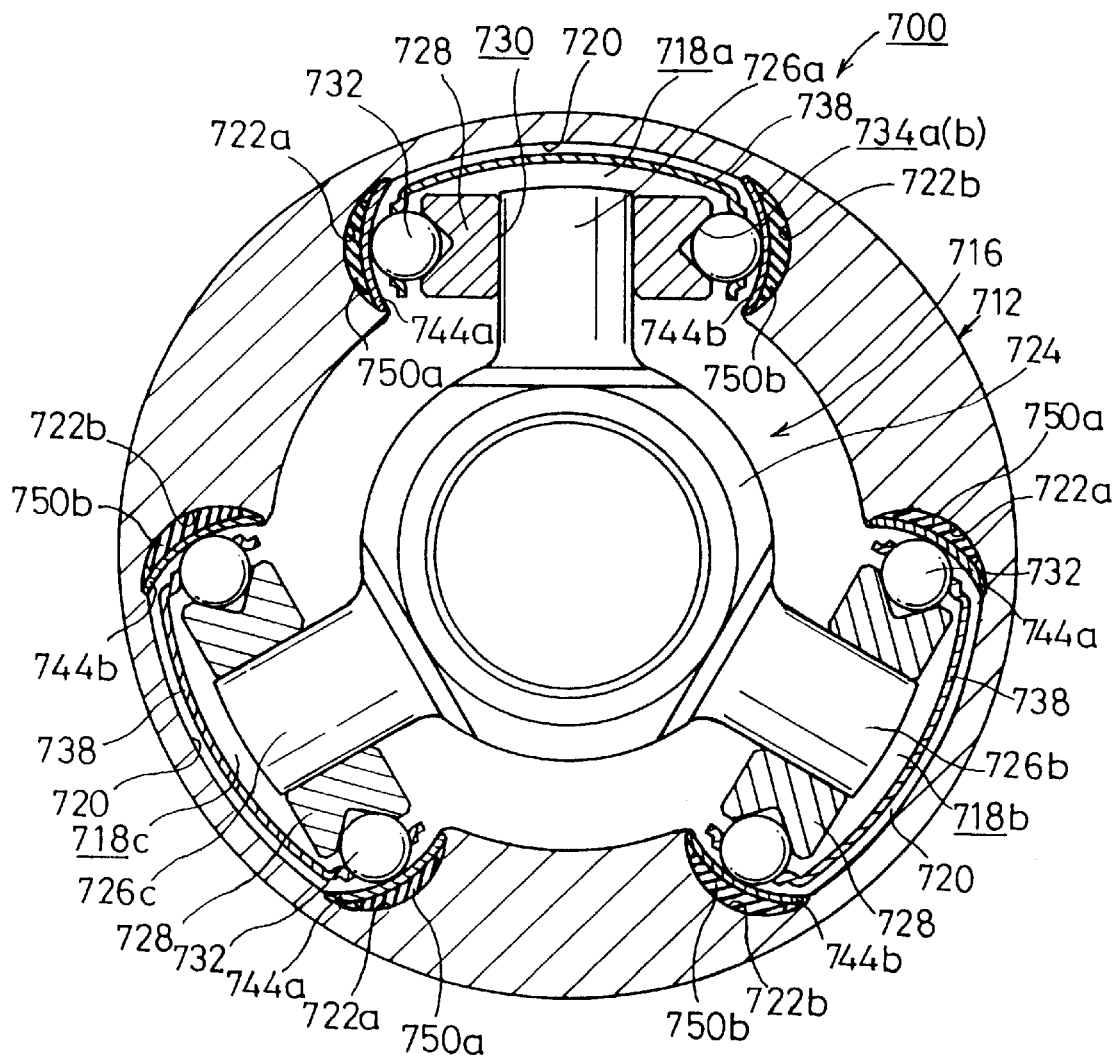
FIGS. 47 shows a sectional view taken along a line XLVII—XLVII shown in FIG. 46.

As shown in FIG. 47, three guide grooves 718a to 718c, which extend in the axial direction and which are spaced apart from each other by 120 degrees about the center of the axis respectively, are formed on an inner circumferential surface of the outer cup 712. The guide groove 718a to 718c comprises a first curved surface 720 which is provided in the axial direction of a trunnion as described later on, and a pair of second curved surfaces 722a, 722b which are formed on both sides of the first curved surface 720 and which are provided mutually opposingly in a direction substantially perpendicular to the axis of the trunnion. Each of the second curved surfaces 722a, 722b has its cross section which is formed to be circular arc-shaped having a predetermined radius of curvature.

A ring-shaped spider 724 is externally fitted to the second shaft 714. Three trunnions 726a (726b, 726c), which expand toward the guide grooves 718a (718b, 718c) respectively and which are spaced apart from each other by 120 degrees about the center of the axis, are formed integrally on an outer circumferential surface of the spider 724. Each of the trunnions 726*a* (726*b*, 726*c*) is formed to have a column-shaped configuration.

Figure 49:
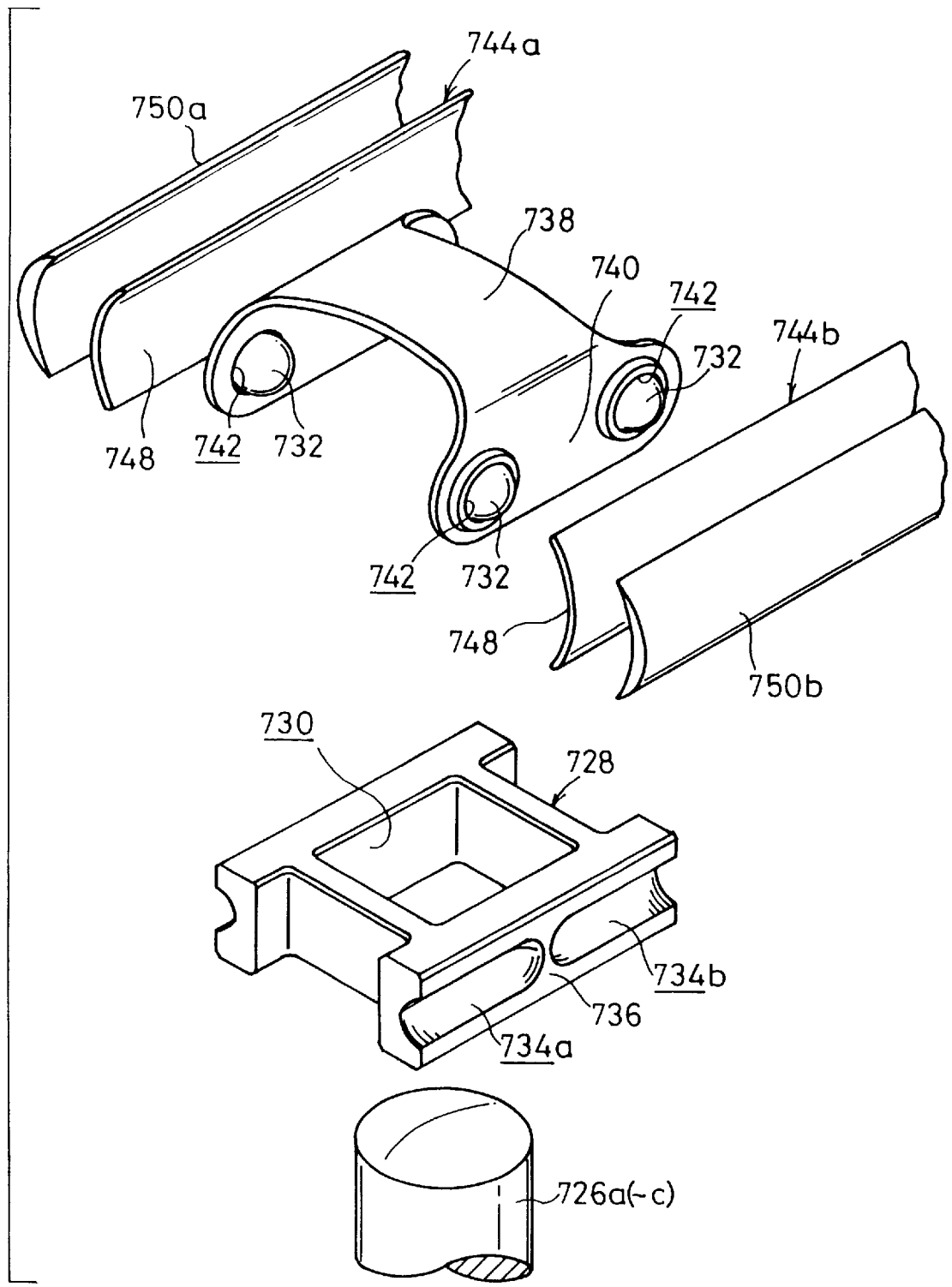
FIG. 49 shows a partial exploded perspective view of FIG. 48.

As shown in FIG. 49, a quadrilateral holder (sliding member) 728 for surrounding the outer circumferential surface of the trunnion 726*a* (726*b*, 726*c*) is provided for the trunnion 726*a* (726*b*, 726*c*). A hole 730, which has a rectangular cross section and which makes line-to-line contact with the outer circumferential surface of the trunnion 726*a* (726*b*, 726*c*), is formed at a central portion of the holder 728. A pair of elongated grooves 734*a*, 734*b*, which function as rolling surfaces for a plurality of ball members, are formed on mutually opposing both side surfaces of the holder 728 while being separated by a predetermined spacing distance. The elongated groove 734*a*, 734*b* has a v-shaped cross section, which is formed to extend substantially in parallel to the axis of the guide groove 718*a* to 718*c*. Stoppers 736, which restrict the rolling displacement of the ball members 732, are formed at one ends of the elongated grooves 734*a*, 734*b*.

A retainer (holding member) 738, which is bent to have a ]-shaped bent cross section, is provided over the holder 728. The plurality of ball members 732 are rotatably held by the elongated grooves 734*a*, 734*b* of the holder 728 and circular holes 742 each of which is formed through a bent section 740 of the retainer 738 and which has a diameter smaller than that of the ball member 732.

Figure 48:
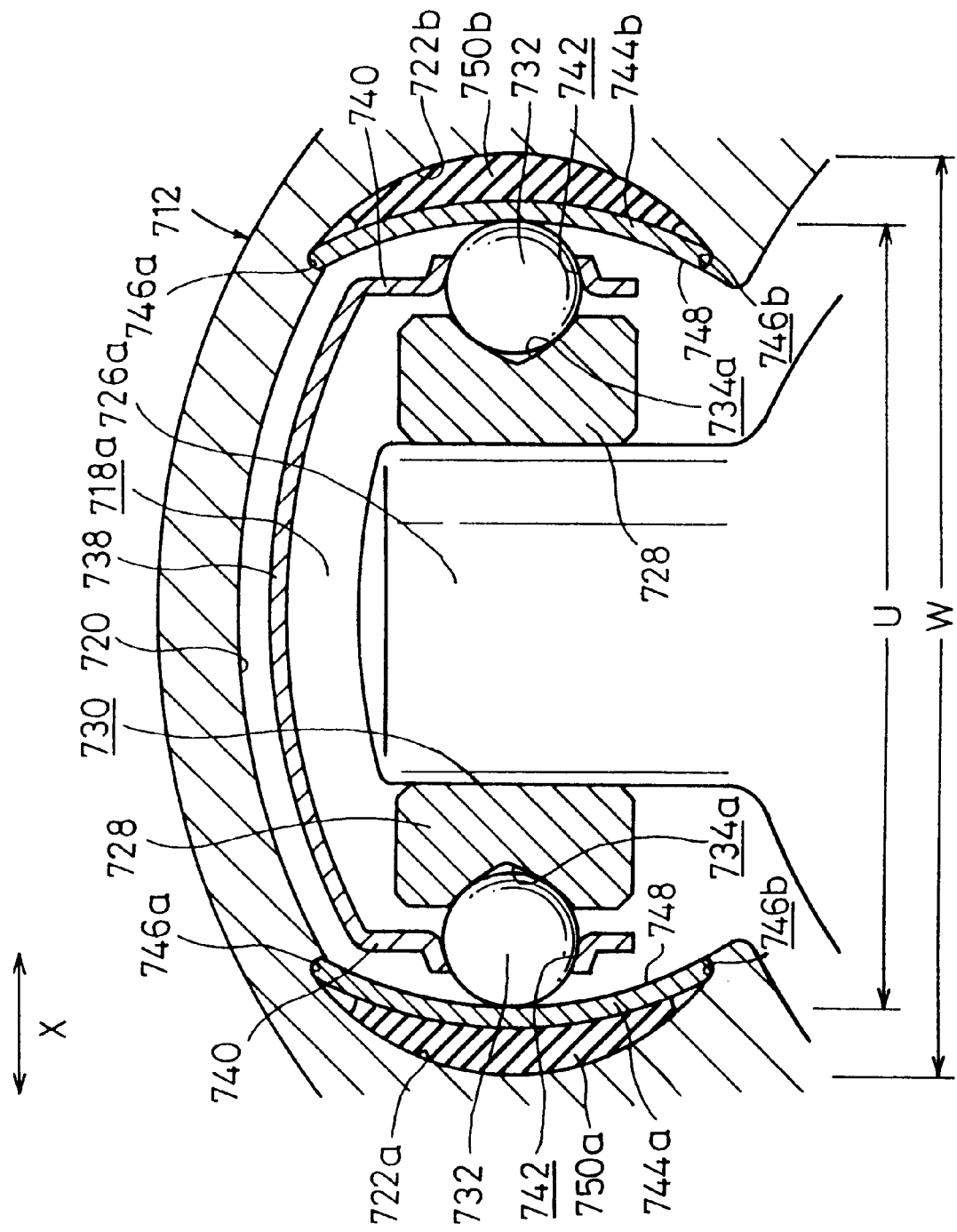
FIG. 48 shows a partial magnified view of FIG. 47.

A pair of plate springs (adjusting members) 744*a*, 744*b*, which engage with the ball members 732 exposed from the holes 742 of the retainer 738, are installed to the mutually opposing second curved surfaces 722*a*, 722*b* of the outer cup 712. Each of the plate springs 744*a*, 744*b* is formed to have a predetermined length along the guide groove 718*a* to 718*c*, and its cross section is formed to be a circular arc-shaped configuration having a predetermined radius of curvature. The plate spring 744*a*, 744*b* is fastened by a pair of engaging grooves 746*a*, 746*b* (see FIG. 48) which are formed at upper and lower ends of the second curved surface 722*a*, 722*b*. In this embodiment, the curved inner wall surface 748 of the plate spring 744*a*, 744*b* functions as a rolling surface for the ball member 732.

Rubber members 750*a*, 750*b*, each of which has a crescent-shaped cross section, are interposed between the plate springs 744*a*, 744*b* and the second curved surfaces 722*a*, 722*b*. The resilient force of the rubber member 750*a*, 750*b* is added to the plate spring 744*a*, 744*b* by forming and integrating the plate spring 744*a*, 744*b* and the rubber member 750*a*, 750*b* into one unit. The rubber member 750*a*, 750*b* is formed of a resilient material including, for example, natural rubber and synthetic rubber.

Figure 50:
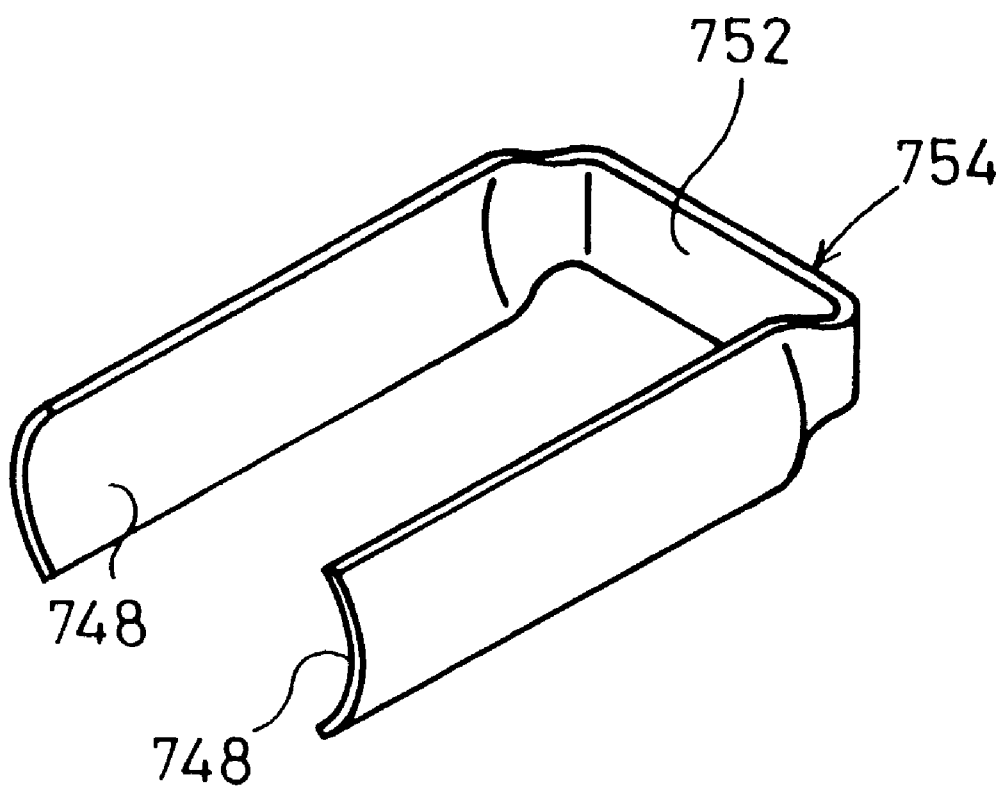
FIG. 50 shows a perspective view illustrating a modified embodiment of a plate spring for constructing the constant velocity universal joint shown in FIG. 46.

As shown in FIG. 49, the pair of plate springs 744*a*, 744*b* may be formed as separate bodies corresponding to the mutually opposing right and left second curved surfaces 722*a*, 722*b*. Alternatively, as shown in FIG. 50, it is allowable to use a plate spring 754 which is formed in an integrated manner by providing a coupling section 752 which connects one end portions to one another. The use of the integrally formed plate spring 754 is advantageous in that assembling is conveniently performed.

The constant velocity universal joint 700 according to the twelfth embodiment of the present invention is basically constructed as described above. Next, its operation, function, and effect will be explained.

At first, the assembling step for the constant velocity universal joint 700 will be explained.

The rubber members 750*a*, 750*b* are inserted along the right and left second curved surfaces 722*a*, 722*b* formed on the guide grooves of the outer cup 712. After that, the plate springs 744*a*, 744*b* are installed along the axial direction of the guide grooves 718*a* to 718*c*. The ball members 732 held by the retainers 738 and the trunnions 726*a* to 726*c* installed with the holders 728 are inserted along the guide grooves 718*a* to 718*c*. During this process, even when the spacing distance W between the mutually opposing second curved surfaces 722*a*, 722*b* (see FIG. 48) is not set to be a predetermined value with any dimensional error, the spacing distance U between the pair of plate springs 744*a*, 744*b* which function as the rolling surfaces for the ball members 732 is adjusted to be a predetermined value by the aid of the resilient force of the rubber members 750*a*, 750*b* and the plate springs 744*a*, 744*b* which are flexible along the direction of an arrow X shown in FIG. 48.

Figure 51:
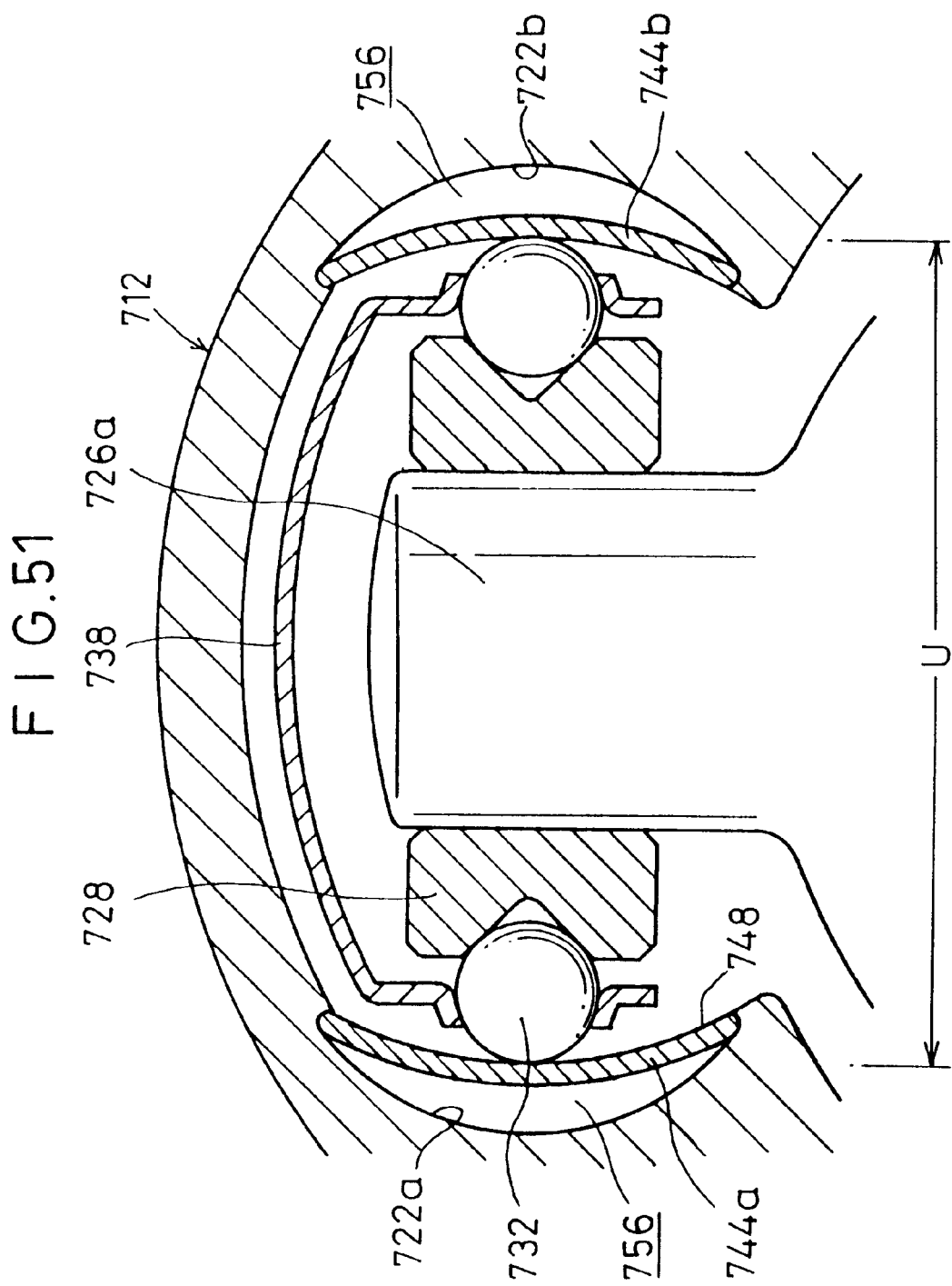
FIG. 51 shows a sectional view illustrating a modified embodiment of the constant velocity universal joint shown in FIG. 48.

Alternatively, as shown in FIG. 51, the arrangement may be made such that the rubber members 750*a*, 750*b* are omitted to provide spaces 756 between the plate springs 744*a*, 744*b* and the second curved surfaces 722*a*, 722*b* so that the spacing distance U therebetween is adjusted by using only the resilient force of the plate springs 744*a*, 744*b*.

Next, the outline of the operation of the constant velocity universal joint 700 according to the twelfth embodiment will be explained.

When the unillustrated first shaft is rotated, the rotary power is transmitted through the outer cup 712 to the inner member 716. Accordingly, the second shaft 714 is rotated in a predetermined direction by the aid of the trunnions 726*a* to 726*c*.

That is, the rotary power of the outer cup 712 is transmitted to the ball members 732 which make point-to-point contact with the plate springs 744*a*, 744*b* which are displaceable along the guide groove 718*a* (718*b*, 718*c*). The rotary power is further transmitted to the trunnion 726*a* (716*b*, 726*c*) through the holder 728 which makes point-to-point contact with the ball members 732. Thus, the second shaft 714, which is engaged with the trunnions 726*a* (726*b*, 726*c*), Is rotated.

As described above, in the twelfth embodiment, the ball members 732 do not make direct contact with the second curved surfaces 722*a*, 722*b* which are formed on the inner wall surface of the outer cup 712. The curved inner wall surfaces of the plate springs 744*a*, 744*b* function as the rolling surfaces for the ball members 732. Accordingly, even when the spacing distance W between the second curved surfaces 722*a*, 722*b* involves any dimensional error depending on machining accuracy for the outer cup 712, the spacing distance U between the plate springs 744*a*, 744*b*, namely the spacing distance U between the rolling surfaces for the ball members 732 is adjusted to be a predetermined value by the aid of the resilient force of the plate springs 744*a*, 744*b* and the rubber members 750*a*, 750*b*.

Therefore, in the twelfth embodiment it is possible to avoid various inconveniences, for example, application of a large load on the ball members 732 and occurrence of looseness which would be otherwise caused by the dimensional error in the spacing distance between the rolling surfaces of the outer cup 712. As a result, it Is possible to smoothly transmit the rotary power of the first shaft to the side of the second shaft 714.

Further, in the twelfth embodiment, the plate spring 744*a*, 744*b* has a sufficient hardness not to be plasticized by the contact surface pressure generated between the plate spring 744*a*, 744*b* and the ball members 732. Therefore, it is possible to reduce the production cost as compared with the conventional technique in which it is necessary to perform a heat treatment for the rolling surface on the inner wall surface of the outer cup 712.

Figure 52:
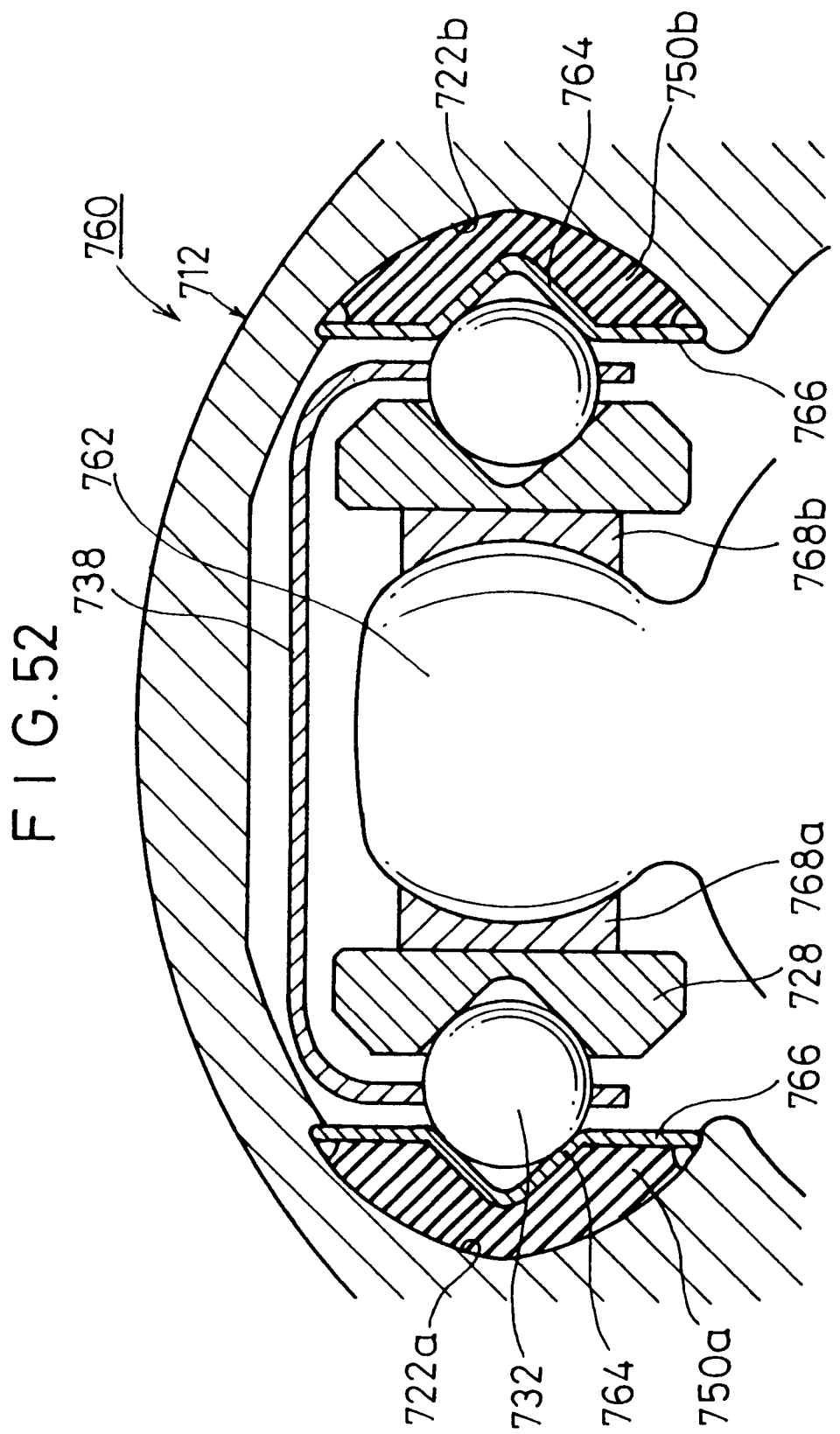
FIG. 52 shows a sectional view illustrating a constant velocity universal joint according to a thirteenth embodiment of the present invention.

Next, a constant velocity universal joint 760 according to a thirteenth embodiment of the present invention is shown in FIGS. 52 and 53. The same constitutive components as those explained in the twelfth embodiment described above are designated by the same reference numerals, detailed explanation of which will be omitted.

The constant velocity universal joint 760 is different from the constant velocity universal joint 700 according to the twelfth embodiment described above in that the trunnion 762 is formed to be spherical, the spring member 766 is provided with-a curved section 764 with its sectional configuration having various radii of curvature, and the curved section 764 is formed to serve as a rolling surface for the ball members 732. Reference numerals 768*a*, 768*b* indicate a pair of slipper members each having its inner wall surface on which a spherical recess is formed corresponding to the trunnion 762 and having its outer wall section which is formed to have a flat surface configuration.

Figure 54:
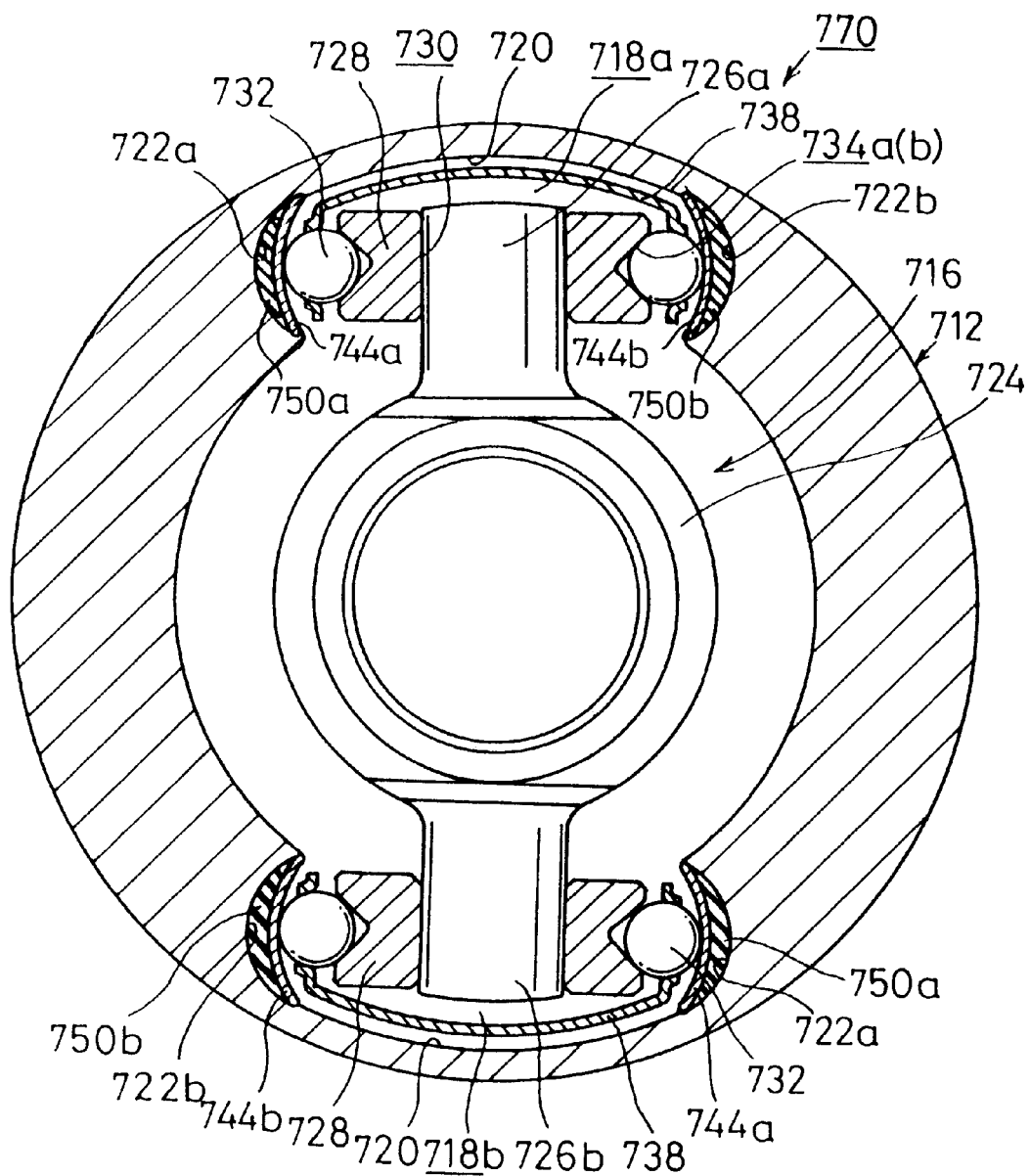
FIG. 54 shows a cross-sectional view illustrating a constant velocity universal joint according to a fourteenth embodiment of the present invention.
Figure 55:
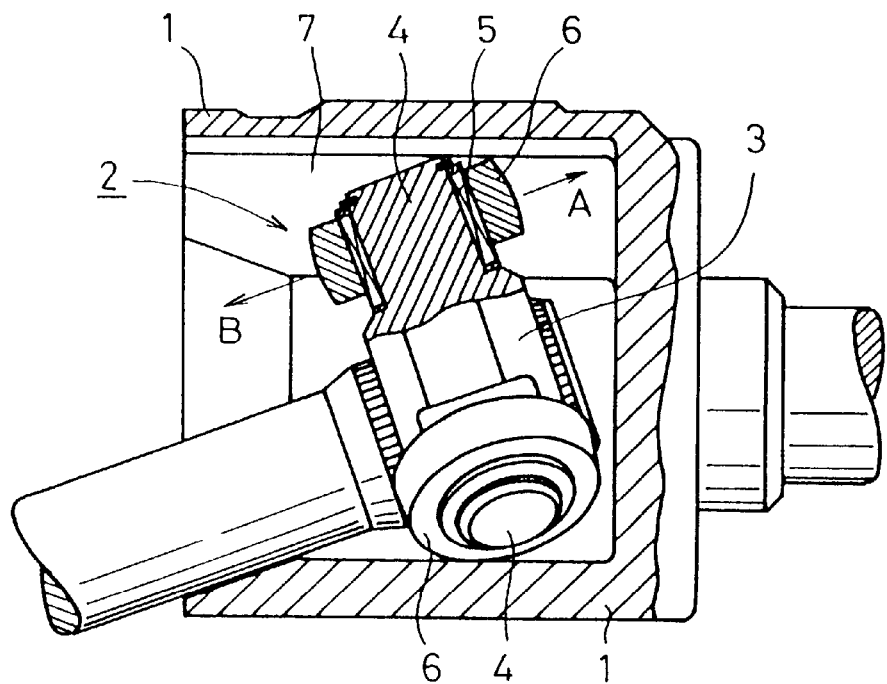
FIG. 55 shows a partial sectional side view illustrating a constant velocity universal joint concerning the conventional technique.
Figure 56:
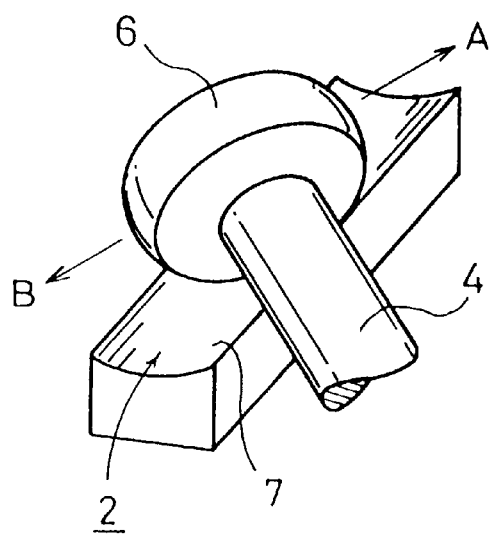
FIG. 56 shows a magnified perspective view illustrating a state in which a spherical roller used for the constant velocity universal joint shown in FIG. 55 is inclined by a predetermined angle with respect to a roller guide groove.
Figure 57:
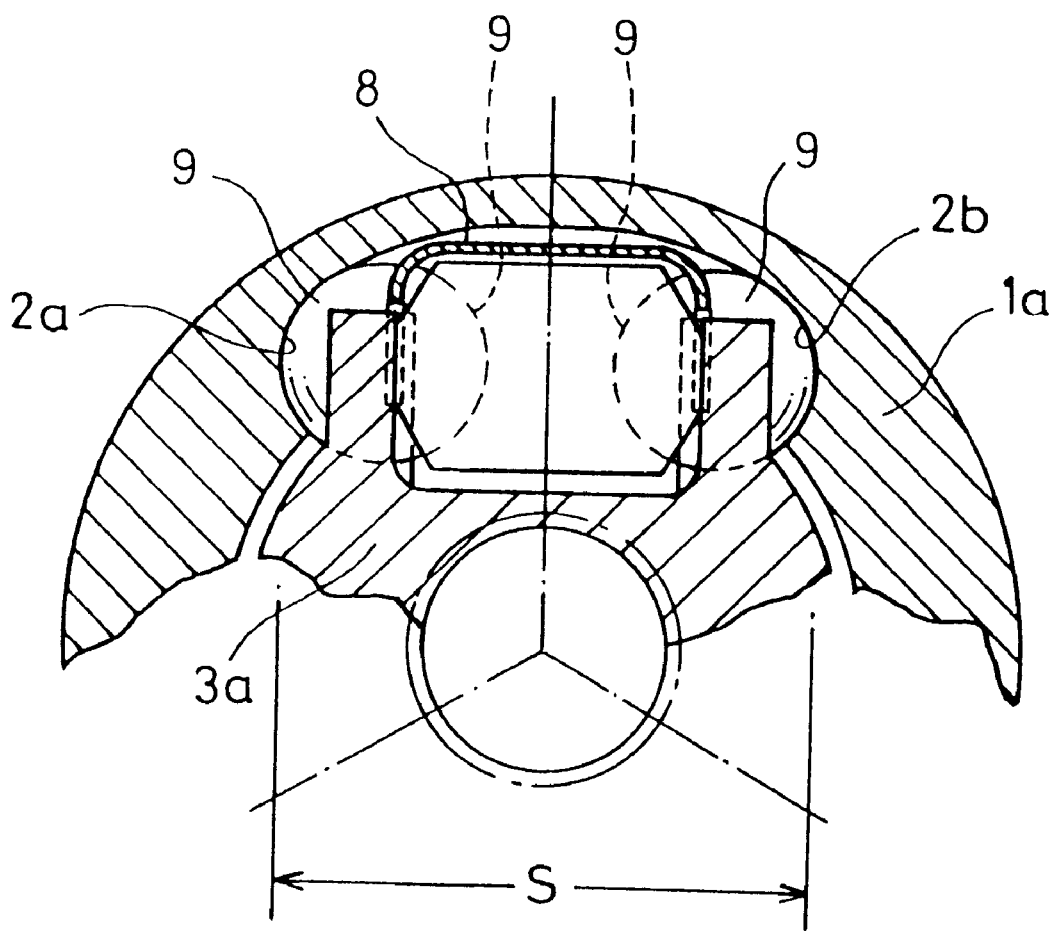
FIG. 57 shows a partial sectional view illustrating a constant velocity universal joint concerning the conventional technique

The constant velocity universal joints 700, 760 according to the twelfth and thirteenth embodiment described above have been explained by using those of the tripod type provided with the three trunnions 726*a* (762*b*, 726*c*). However, the present invention is not limited thereto. It is a matter of course that the present invention is also applicable to a blood type constant velocity universal joint 770 as shown in FIG. 54.

What is claimed is:

1. A constant velocity universal joint having a cylindrical outer member which is provided, on an inner circumferential surface of said cylindrical outer member, with a plurality of guide grooves spaced apart from each other by a predetermined spacing distance and extending along an axial direction and which is coupled to one transmission shaft, and an inner member which is inserted into an open internal hollow space of said outer member and which is coupled to another transmission shaft, said constant velocity joint comprising:

a plurality of trunnions each of which are formed to be spherical and which expand toward said guide grooves;

flat surface sections which are formed on mutaully opposing surfaces of said guide grooves and which extend in a flat surface configuration along said axial direction of said outer member; and a pair of gliding members having an identical shape, provided for each trunnion each of said gliding members being interposed between one of said flat surface sections and said trunnion, each of said gliding members having one side surface formed with a recess which makes contact with a spherical surface of said trunnion and having another side surface formed with a flat surface which makes contact with one of said flat surface sections, wherein each of said pairs of gliding members are slidable in the axial direction and in a radial direction with respect to said flat surface sections of said guide grooves and with respect to said spherical surfaces of said trunnions.

2. The constant velocity universal joint according to claim 1, wherein said recess of said gliding member has a sectional shape formed to be a curved configuration having a predetermined radius of curvature corresponding to said spherical surface of said trunnion.

3. The constant velocity universal joint according to claim 1, wherein said recess of said gliding member has a sectional shape formed to be a substantially v-shaped sectional configuration involving linear inclination at a predetermined angle from ends to a center.

4. The constant velocity universal joint according to claim 3, wherein a penetrating hole is formed through a central portion of said recess of said gliding member.

5. The constant velocity universal joint according to claim 1, wherein lubricating grooves are formed on said spherical surface of said trunnion or on said recess of said gliding member contacting with said spherical surface.

6. The constant velocity universal joint according to claim 1, wherein lubricating grooves are formed on said flat surface of said gliding member contacting with said flat surface section of said guide groove.

7. The constant velocity universal joint according to claim 1, wherein at least one or more stripes of lubricating grooves are formed on said flat surface section of said guide groove substantially in parallel to said axial direction of said outer member.

* * * * *